(12) United States Patent
Rhoads

(10) Patent No.: US 8,023,117 B2
(45) Date of Patent: Sep. 20, 2011

(54) ESTABLISHING AND MAINTAINING FOCUS IN SEGMENTED-OPTIC TELESCOPES

(75) Inventor: Geoffrey B. Rhoads, West Linn, OR (US)

(73) Assignee: Venture Ad Astra, LLC, Anchorage, AK (US)

( * ) Notice: Subject to any disclaimer, the term of this patent is extended or adjusted under 35 U.S.C. 154(b) by 507 days.

(21) Appl. No.: 12/251,077

(22) Filed: Oct. 14, 2008

(65) Prior Publication Data

US 2009/0051772 A1  Feb. 26, 2009

Related U.S. Application Data

(63) Continuation-in-part of application No. 11/029,222, filed on Jan. 4, 2005, now abandoned, which is a continuation of application No. 10/601,343, filed on Jun. 20, 2003, now Pat. No. 6,837,586, which is a continuation-in-part of application No. 10/178,047, filed on Jun. 21, 2002, now Pat. No. 6,726,339, which is a continuation-in-part of application No. 10/179,478, filed on Jun. 24, 2002, now abandoned.

(60) Provisional application No. 60/347,384, filed on Jan. 9, 2002.

(51) Int. Cl.
*G01B 9/02* (2006.01)
*G01B 11/02* (2006.01)

(52) U.S. Cl. ......................................... 356/450; 356/508

(58) Field of Classification Search .................. 356/450, 356/508, 521; 359/577, 838, 850, 851, 856, 359/857, 861, 862, 872, 873
See application file for complete search history.

(56) References Cited

U.S. PATENT DOCUMENTS

| | | | |
|---|---|---|---|
| 4,172,443 A | 10/1979 | Sommer | |
| 4,424,802 A | 1/1984 | Winders | |
| 4,535,961 A | 8/1985 | Sobczak et al. | |
| 4,639,586 A | 1/1987 | Fender et al. | |
| 4,776,684 A | 10/1988 | Schmidt-Kaler | |
| 4,856,884 A | 8/1989 | Fender et al. | |
| 4,950,063 A | 8/1990 | Pohle et al. | |
| 4,981,354 A | 1/1991 | DeHainaut et al. | |
| 5,108,168 A | 4/1992 | Norbert et al. | |
| 5,120,128 A | 6/1992 | Ulich et al. | |
| 5,229,889 A | 7/1993 | Kittell | |
| 5,730,117 A | 3/1998 | Berger | |
| 5,905,591 A | 5/1999 | Duncan et al. | |
| 6,084,227 A | 7/2000 | Rhoads | |
| 6,726,339 B2 | 4/2004 | Rhoads | |
| 6,837,586 B2 | 1/2005 | Rhoads | |
| 6,880,942 B2 * | 4/2005 | Hazelton et al. ............... 359/849 |
| 2002/0103439 A1 | 8/2002 | Zeng et al. | |
| 2002/0161289 A1 | 10/2002 | Hopkins et al. | |
| 2003/0128445 A1 | 7/2003 | Rhoads | |
| 2003/0147162 A1 * | 8/2003 | Bennett et al. ................ 359/849 |
| 2003/0227696 A1 | 12/2003 | Maker | |
| 2004/0056174 A1 | 3/2004 | Specht et al. | |
| 2004/0080841 A1 | 4/2004 | Tagirov | |
| 2005/0237644 A1 * | 10/2005 | Rhoads ......................... 359/872 |

* cited by examiner

*Primary Examiner* — Michael A Lyons
(74) *Attorney, Agent, or Firm* — Stoel Rives LLP

(57) ABSTRACT

A multi-aperture interferometric optical system collects light propagating from a source of light and develops overlapping diffraction patterns on an optical detector that produces output signals for processing to automatically focus the optical system and form an image corresponding to the diffraction patterns. A preferred embodiment of the invention is a large aperture orbiting, earth-watching ring interferometric optical system configured such that there is no macro-structure pointing. Four mirror-ring structures direct incoming light to a multi-spectral primary optical detector that acquires light-pattern information to focus the optical system and derive an image.

27 Claims, 52 Drawing Sheets

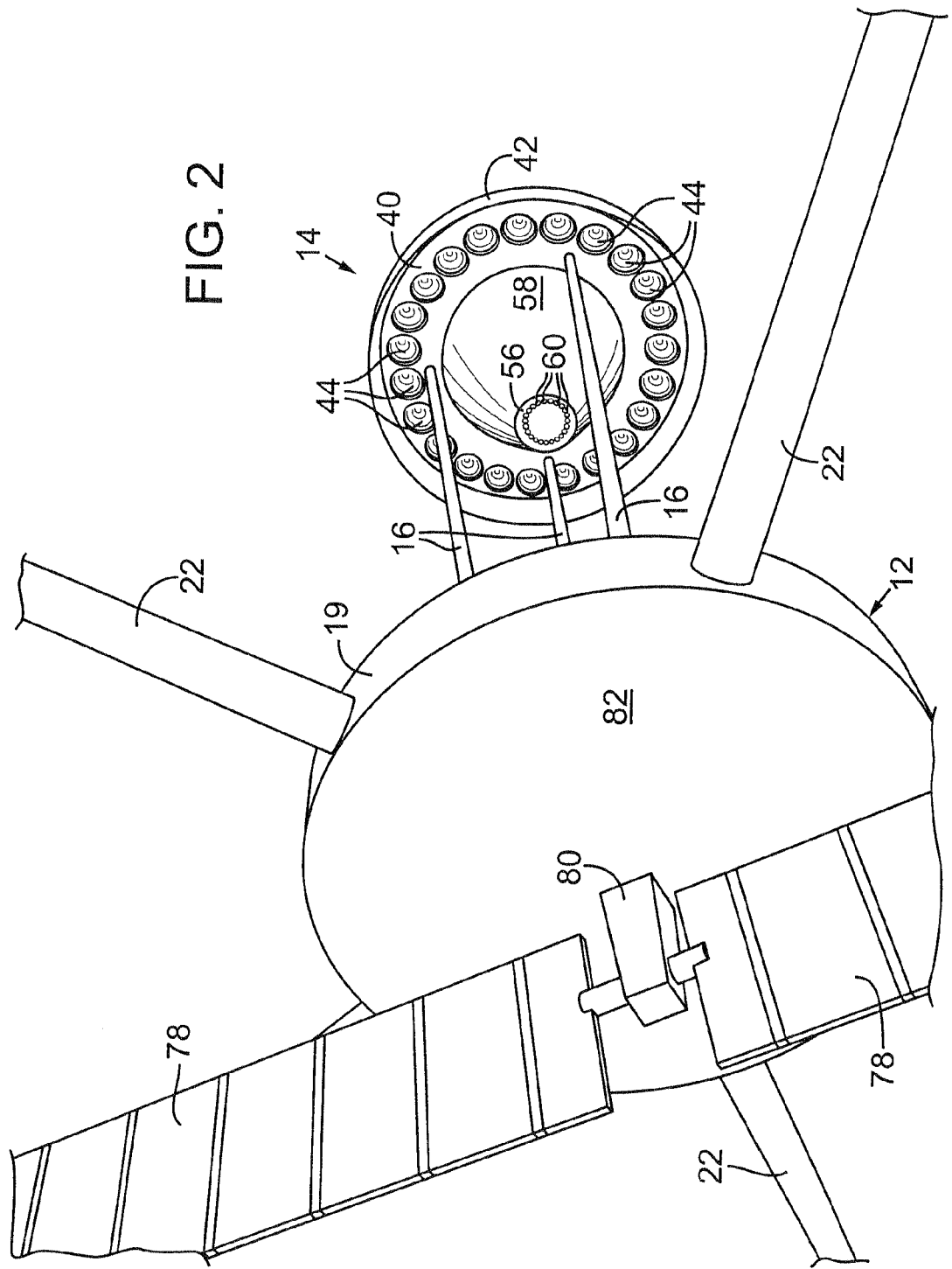

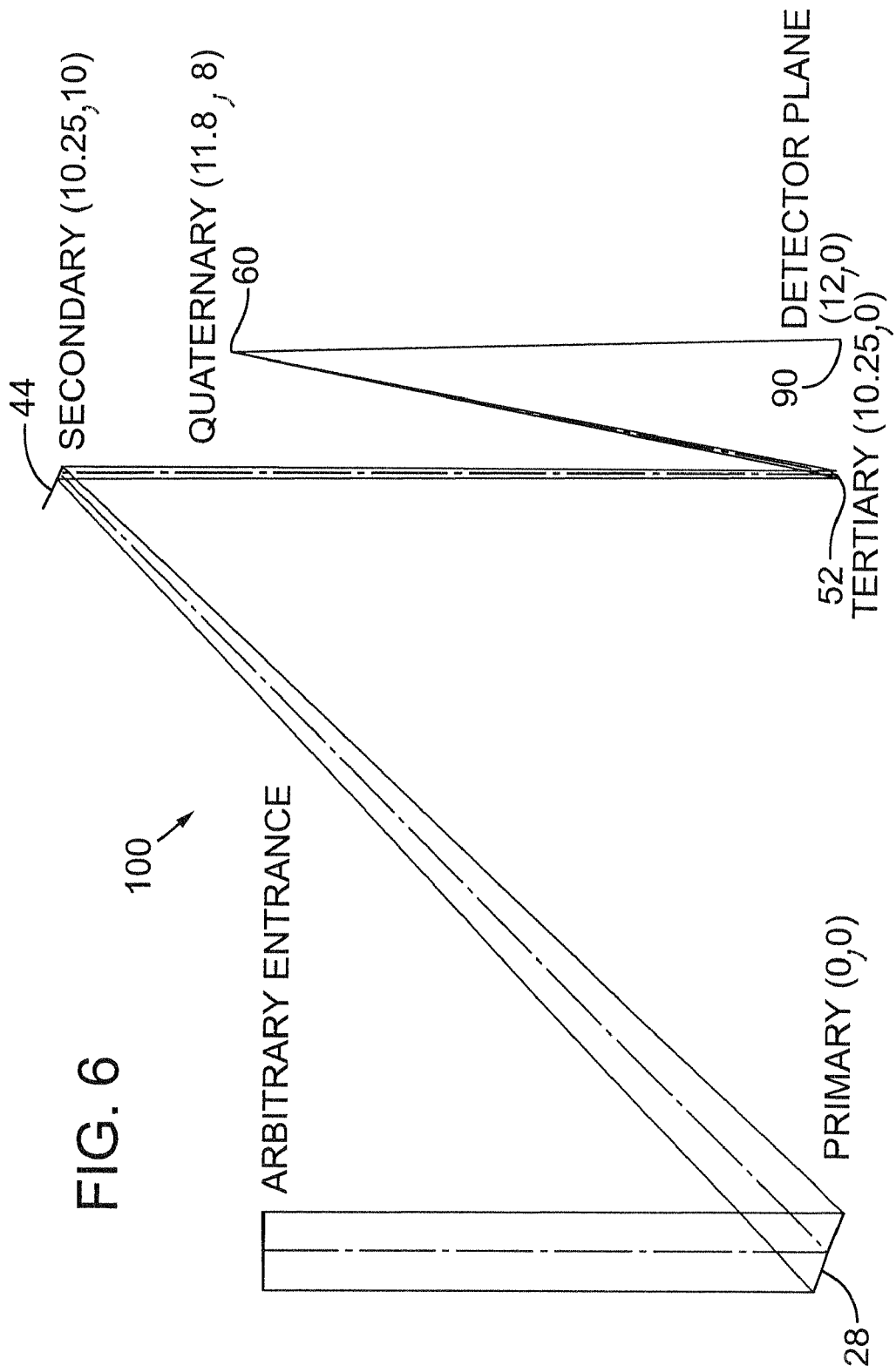

ESTABLISHING AND MAINTAINING FOCUS IN SEGMENTED-OPTIC TELESCOPES

RELATED APPLICATIONS

This is a continuation-in-part of U.S. patent application Ser. No. 11/029,222, filed Jan. 4, 2005, which is a continuation of U.S. patent application Ser. No. 10/601,343, filed Jun. 20, 2003, now U.S. Pat. No. 6,837,586, which is a continuation-in-part of U.S. patent application Ser. No. 10/179,478, filed Jun. 24, 2002, abandoned, and U.S. patent application Ser. No. 10/178,047, filed Jun. 21, 2002, now U.S. Pat. No. 6,726,339, the last two of which claim benefit of U.S. Provisional Patent Application No. 60/347,384, filed Jan. 9, 2002, all of which are hereby incorporated by reference in their entireties.

TECHNICAL FIELD

This disclosure relates to large aperture optical systems adapted to form high resolution images of distant extended scenes and, in particular, to a multi-aperture interferometric optical system that collects light propagating from a source of light and develops a diffraction pattern on an optical detector that produces output signals for processing to focus the optical system and form an image corresponding to the diffraction pattern.

BACKGROUND INFORMATION

The theoretical advantages of placing telescopes above the distorting atmosphere have been well known and practically pursued for about four or more decades. Briefly stated, these advantages include sharper images and accessibility to a broader range of wavelengths. The Hubble Space Telescope and NASA's upcoming NGST (Next Generation Space Telescope) are particularly well known examples of spaceborne telescopes. Remote sensing satellites beginning with Landsat and Spot, and more recently systems launched and operated by Space Imaging, Digital Globe, and Orbimage, represent earth-pointing examples of telescopes, known to skilled persons as "large aperture cameras." There are, likewise, but slightly less well known, similar advantages to placing optical interferometers into space. Examples of such systems include NASA's SIM (Space Interferometry System) and SIRTF (Space Infrared Telescope Facility).

In many respects, telescopes and optical interferometers are designed with the same result in mind, namely, to measure the optical energy distribution of a spatial "scene" or of some "object." Telescopes do so by forming a single image of an object or a scene, whereas optical interferometers explicitly measure the amplitude and phase of specific spatial frequencies of an object or a scene. Both devices can do so across a range of bands in the spectral dimension. By post-processing images derived from telescopes, one can readily obtain interferometer-like spatial frequency measurements; and by post-processing data from an optical interferometer, one can readily obtain telescope-like images, especially if a complete set of spatial frequencies has been measured.

A form of telescope implemented with non-full apertures was introduced and practically pursued before, but achieved popularity during, the 1980s. Such telescopes are referred to as "sparse array," "phased array," or "multi-aperture" telescopes. The basic notion of sparse array telescope design is to "coherently combine" several smaller telescopes, or sub-apertures, to achieve the resolving capabilities of a much larger telescope. An example of a multi-aperture imaging system is described in U.S. Pat. No. 5,905,591 for Multi-Aperture Imaging System. The premise underlying the operation of sparse array telescopes is that the spatial autocorrelation function of any given mirror configuration containing no drop-out points ("nulls" in spatial frequency space) achieves telescopic "imaging" or "full-coverage spatial frequency" optical interferometry in the absence of monolithic (or pseudo-monolithic, segmented) mirrors. Such a mirror configuration reduces cost and complexity. The accepted cost of implementing this relatively inexpensive approach is a reduction in light gathering capability, hence resulting in higher effective f/numbers and longer exposure times. The intended result is that much larger telescopes could be contemplated and built, thereby increasing the resolution of state of the art systems within acceptable cost budgets dictated by public security concerns and scientific endeavor priorities.

The cost virtues of sparse array telescopes have been and are now duly extolled and elucidated. At the same time, a number of various specific designs that attend to the unique design challenges presented by very large, space-based structures have been presented and sometimes implemented, at least in simulations. Noteworthy among these challenges is the need to position many optical mirrors to accuracies initially approaching and usually much finer than the wavelengths of visible light. This challenge has been referred to as "phasing" or what most people would call "maintaining focus." Moreover, the long-established optical interferometric principle of pointing only the sub-apertures (i.e., not the whole structure) and allowing delay lines to maintain coherence is a clear design requirement for most, if not all, realistic approaches to 10-meter and larger outside-aperture class systems. In addition to the generic and given requirements for a sparse array telescope, various provisions have been envisioned, built, and tested in structures that are to be initially compactly stowed in a given structure for launch and later deployed into an operational configuration.

All of the foregoing basic requirements were well described in the 1980s, and a wide variety of specific design implementations approaching these requirements have ensued. With only a few exceptions, which tend to be classic optical interferometers in character, the sheer cost and complexity of actually building, testing, launching, and operating sparse array telescopes have, to date, permitted production of no known operational system. It has generally been found that actual structural implementation of these conceptual designs is far more difficult than simply describing the now well-understood theoretical requirements that the work of the 1980s and 1990s outlined.

SUMMARY OF THE DISCLOSURE

The present disclosure embodies an overall functional approach to the design and construction of very large sparse array telescopes in the form of a multi-aperture interferometric optical system. The disclosure implements an approach that explicitly negates the classic telescope design notion of forming a singular image through coherent beam combination, which works well in a laboratory at smaller scales. The disclosure implements a field-variant object-space sampling approach much more akin to wide-field wavefront-estimate-assisted speckle imaging through a turbulent atmosphere, as described in U.S. Pat. No. 6,084,227 for Method and Apparatus for Wide Field Distortion Compensated Imaging ('227 patent), on which applicant is named as inventor. This technique treats a very large structure as though it were just another kind of atmosphere, albeit an "atmosphere" that is in general a little better behaved than the one earth-bound astronomers have been considering for centuries.

Stated in simpler terms, the disclosure does not implement an attempt to beam-combine a singular image onto an electronic sensor or light sensitive film under the expensive assumption that one has physically forced a large structure to maintain nanometer-scale intra-positional accuracies. The disclosure instead expects and accepts major perturbations in the large physical structure that collects optical energy from an object or a scene and interprets the electronically sensed data (what classic telescope principles might term "gross distortions," and what classic optical interferometry might term "very complicated biasing in time, space, spatial amplitude and phase") with reference to its known errors (or knowable biases). The price for this approach is the same as that paid to examine sparse array designs, namely, exposure time and the time-efficiency of imaging static and dynamic objects. The objective of this approach is also the same, which is the design of a large system that is practicable and operable within acceptable budgets.

A preferred embodiment is a large aperture orbiting, earth-watching ring interferometric optical system using 23 nominally identical commercial-off-the-shelf (COTS)-grade concave primary mirrors. The nominal orbit of the optical is geo-synchronous, with designed ground resolution of approximately 0.8 meter at 500 nanometers. The optical system is configured such that there is no macro-structure pointing; the primary mirrors are responsible for gross target pointing. Secondary, tertiary, and quaternary mirror ring structures receive light reflected by the primary mirrors and steer the reflected light to a detector plane, where a multi-spectral primary optical detector is positioned. There are 23 mirror arms defined by a primary mirror and corresponding secondary, tertiary, and quaternary mirrors that direct the incoming light along a path to the primary optical detector. The design approach of the preferred embodiment described uses a linear piston system in association with the tertiary mirrors to perform most of the optical path length (OPL) equalization and tip/tilt devices in association with the secondary and quaternary mirrors to perform most of the equalization to make common the effective focal lengths and focal planes of each of the mirror arms of the optical system. An alternative embodiment uses a single quaternary mirror in association with tip/tilt and linear piston positioning systems as a trade-off for more complicated positioning systems for the secondary and tertiary ring structures.

Initial and ongoing phasing is achieved through optical detector feedback loops into either the secondary mirrors, tertiary mirrors, quaternary mirrors, or a combination thereof. The multi-spectral primary optical detector includes four detector elements, each viewing a 20 nanometer-50 nanometer bandpass image, tunable over the visible through near-IR spectrum. The overall "instantaneous but rapidly changing" wavefront error budget is on the order of one wavelength (or even worse), rather than the more traditional one-tenth wavelength.

Additional objects and advantages will be apparent from the following detailed description of a preferred embodiment of the interferometric optical system, which proceeds with reference to the accompanying drawings.

BRIEF DESCRIPTION OF THE DRAWINGS

FIG. 2 is an enlarged, fragmentary rearward view of the optical system of FIG. 1.

FIG. 6 shows an optical path associated with corresponding mirrors in four sets of mirrors arranging in ring configurations for directing incoming light to an optical detector.

DETAILED DESCRIPTION OF A PREFERRED EMBODIMENT

Figure 1:
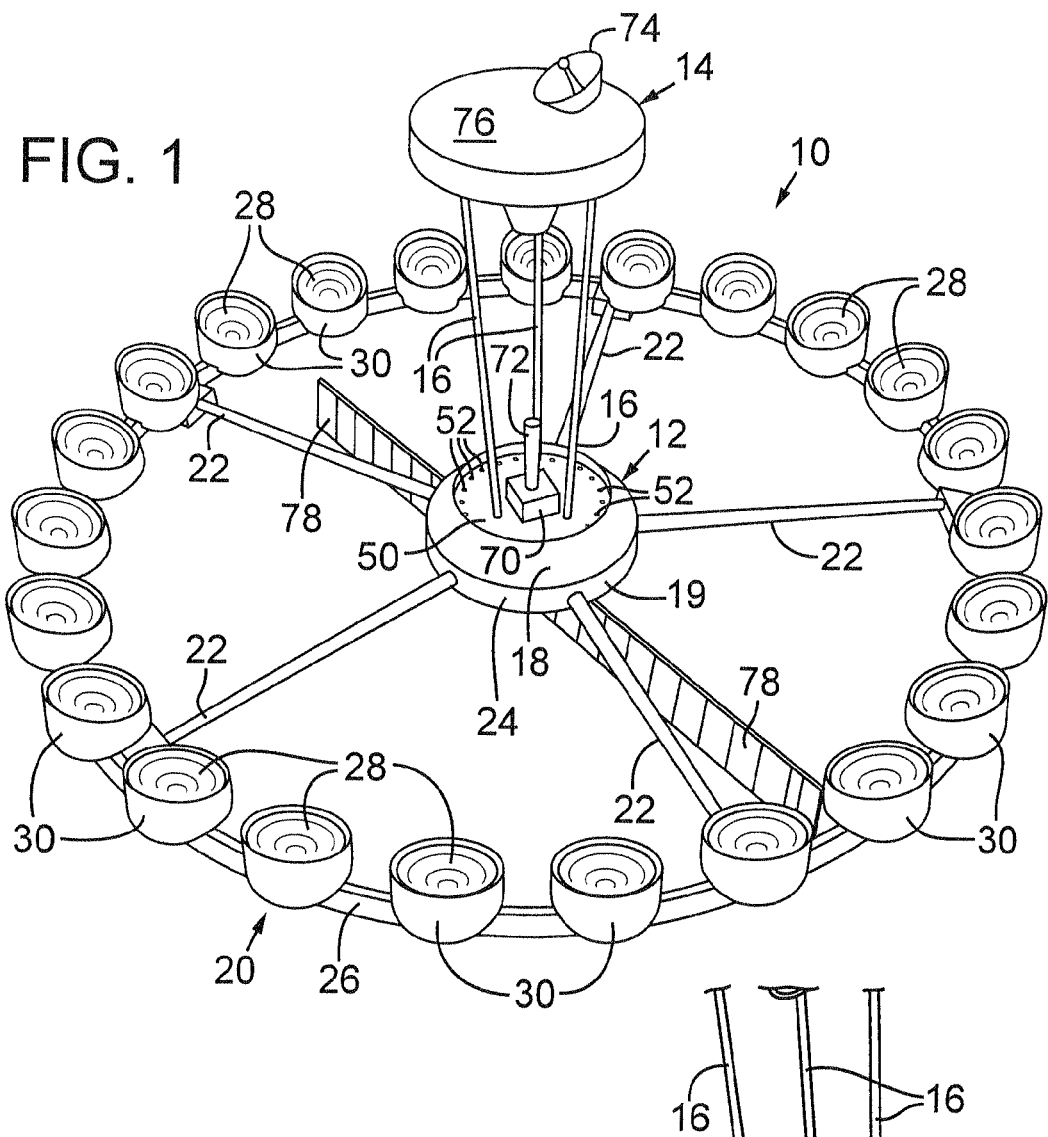
FIG. 1 is an isometric view of a preferred embodiment of an orbiting multi-aperture interferometric optical system.

FIGS. 1 and 2 show an isometric view and an enlarged, fragmentary rearward view, respectively, of a preferred embodiment of an orbiting multi-aperture interferometric optical system 10 constructed in accordance with one embodiment. With reference to FIGS. 1 and 2, optical system 10 is composed of a main body in the form of a central hub 12 and a secondary assembly in the form of a plate structure 14 spaced apart from each other by connection to the opposite ends of three cylindrical columns 16. Central hub 12 is composed of two separate cylindrical structures 18 and 19, the larger structure 18 containing most of the satellite equipment and the smaller structure 19 providing an anchor for a primary mirror structure 20 and containing a multi-spectral primary optical detector. Four mirror ring structures, two each connected to central hub 12 and plate structure 14, direct incoming light to the multi-spectral primary optical detector positioned at a detector plane on central hub 12.

FIG. 1 shows that central hub 12 is connected to primary mirror structure 20 by five cylindrical support rods 22 radially extending from a main fairing 24 of cylindrical structure 19 of central hub 12 to a ring truss 26. Ring truss 26 supports 23 primary mirrors 28, each set within a cup-shaped fairing 30. FIG. 2 shows an inner surface 40 of plate structure 14 encircled by an annular secondary fairing 42 and supporting 23 secondary mirrors 44 spaced apart along the periphery of plate structure 14. Secondary mirrors 44 are positioned such that their light reflecting surfaces confront those of primary mirrors 28.

FIG. 1 shows that a recessed top surface 50 of cylindrical structure 18 of central hub 12 supports 23 tertiary mirrors 52 positioned spaced apart along the periphery of top surface 50 near main fairing 24. FIG. 2 shows that a periphery 56 of an open-ended conical support member 58 attached to inner surface 40 of plate structure 14 supports 23 quaternary mirrors 60. Skilled persons will appreciate that light baffles and shields for the mirrors would be incorporated in an on-orbit optical system. Such baffles and shields would obscure the mirrors shown in the drawings and, therefore, are omitted from them.

FIG. 1 shows a box containing the multi-spectral primary optical detector 70, which is preferably component of a camera system, mounted at the center of top surface 50 of central hub 12. A tube 72 extending outwardly from the box toward inner surface 40 of plate structure 14 functions as a light baffle for camera system 70. A high gain communication antenna 74 for transmitting and receiving data and control signals from a remote station is mounted on a bottom surface 76 of plate structure 14. Two solar power panels 78 extend radially outwardly from a support member 80 of a bottom surface 82 of cylindrical structure 19.

Figure 3:
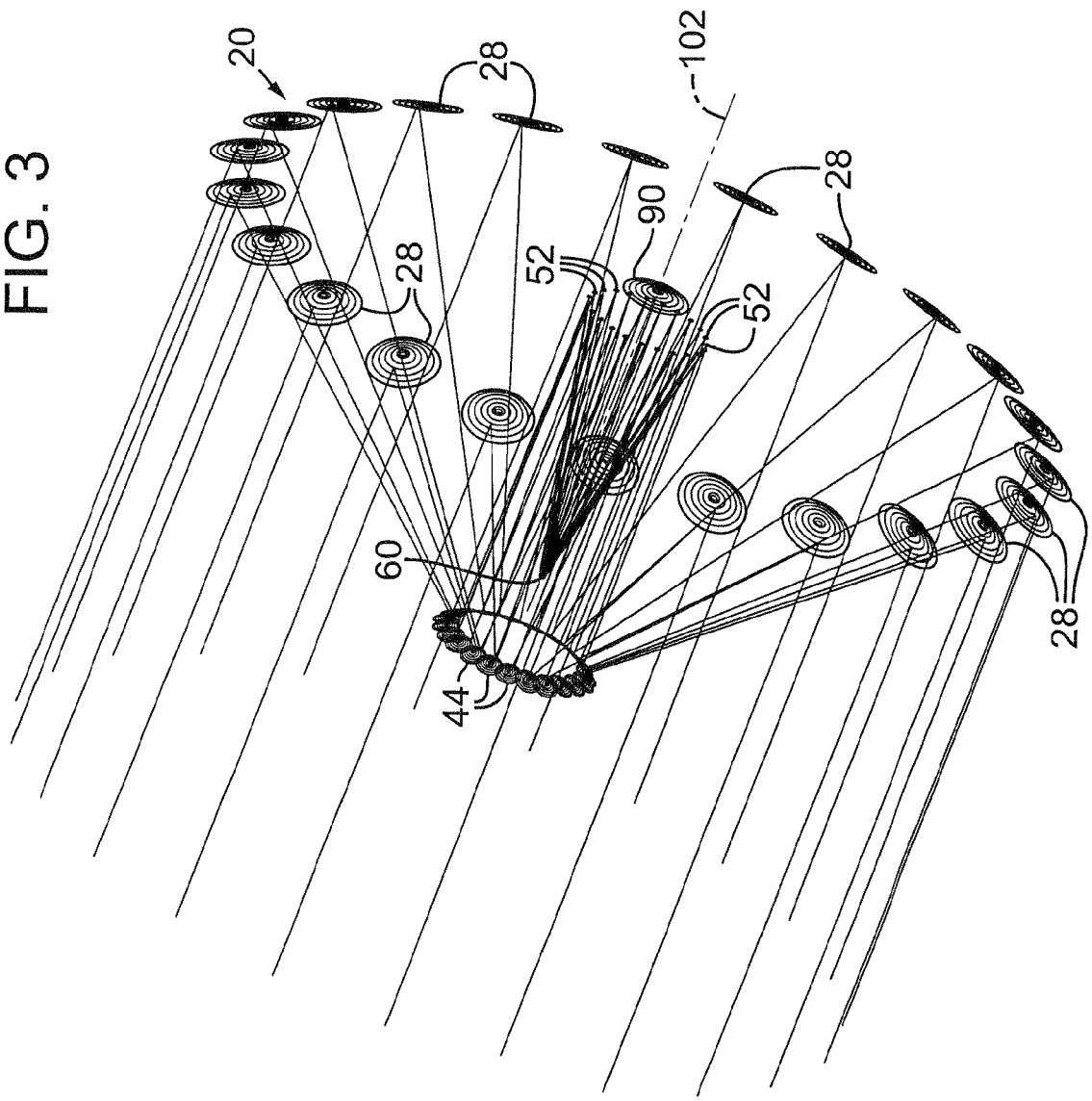
FIG. 3 is a diagram showing a perspective view of a preferred embodiment of a ring optical interferometer.
Figure 4:
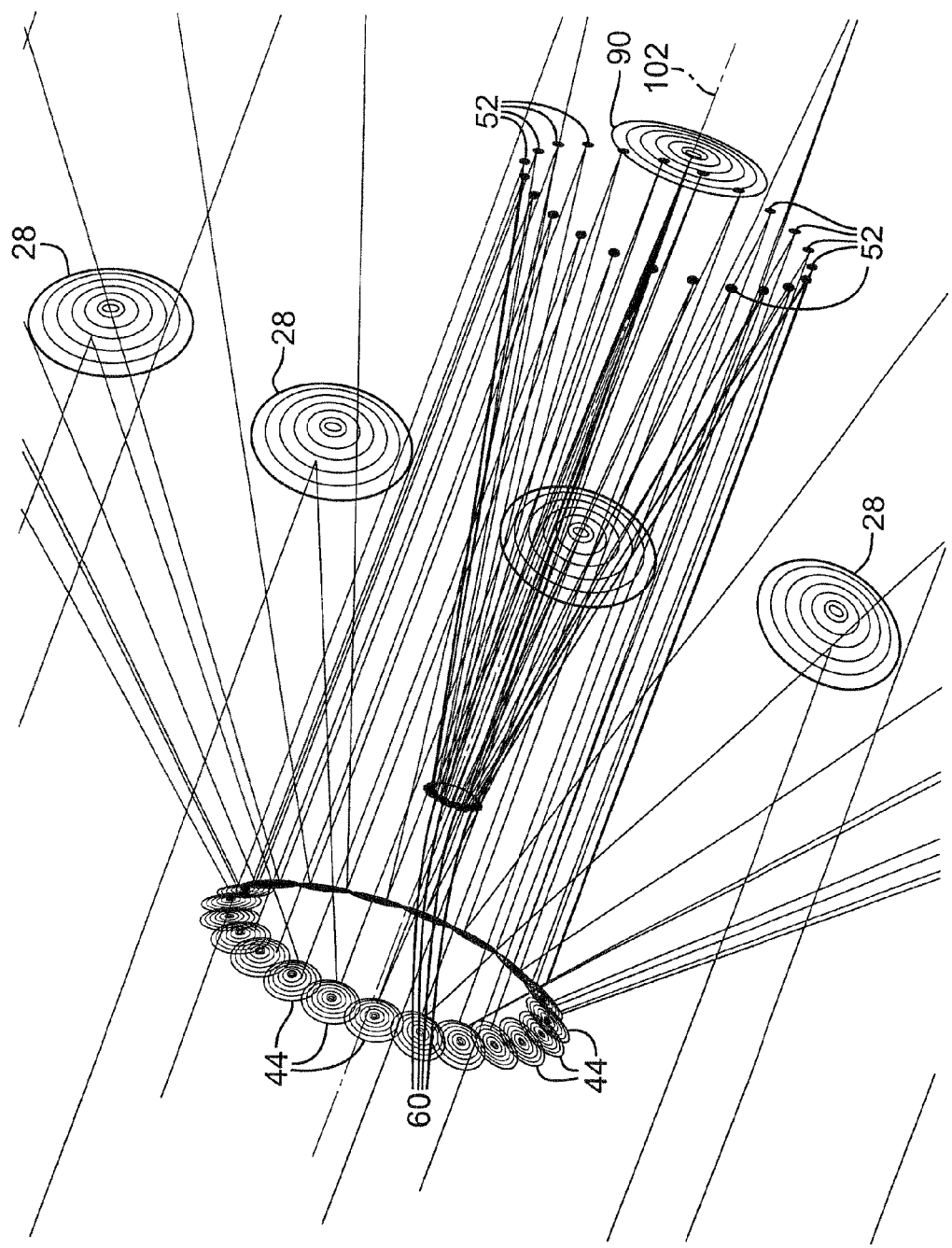
FIG. 4 is an enlarged fragmentary view of the ring optical interferometer of FIG. 3 showing the optical paths of incoming light converging to form a diffraction pattern at a detector plane.

FIGS. 3 and 4 show a preferred embodiment of multi-aperture interferometric optical system 10 that is formed of four ring structures, each including a set of mirrors cooperating to steer incoming light to form a coherent diffraction pattern on a light receiving surface of camera system 70. The overall effective focal length of this embodiment of optical system 10 is 900 meters. With particular reference to FIGS. 1 and 3, an outermost, primary ring structure 20 supports 23 1-meter diameter primary mirrors 28 mutually spaced apart along a 25-meter diameter ring truss 26, which defines a periphery around which primary mirrors 28 are arranged. Primary mirrors 28 are preferably positioned on ring truss 26 in a slightly asymmetric manner in which certain neighboring pairs of primary mirrors are spaced apart by center-to-center distances of either greater than or less than 2 meters. This asymmetric spacing tends to produce more uniform UV plane signal coverage.

With particular reference to FIGS. 2 and 4, 23 15-centimeter diameter secondary mirrors 44 are mutually spaced apart along a 3.5-meter diameter plate structure 14; 23 tertiary mirrors 52 of between about 8 centimeters and 9 centimeters in diameter are mutually spaced apart along a 3.5-meter diameter top surface 50 of cylindrical structure 18; and 23 quaternary mirrors 60 of between about 1 centimeter and 2 centimeters in diameter are mutually spaced apart along periphery 56 of a 0.4-meter diameter conical support member 58. (The ranges indicated for the diameters of the tertiary and quaternary mirrors provide for an optical designer flexibility to optimize the overall system design.) Plate structure 14, top surface 50, and conical support member 58 define the peripheries around which secondary mirrors 44, tertiary mirrors 52, and quaternary mirrors 60, respectively, are arranged. The secondary, tertiary, and quaternary mirrors are positioned to receive the light reflected by the primary mirrors and steer it for incidence on camera system 70 located at a detector plane 90.

Figure 5:
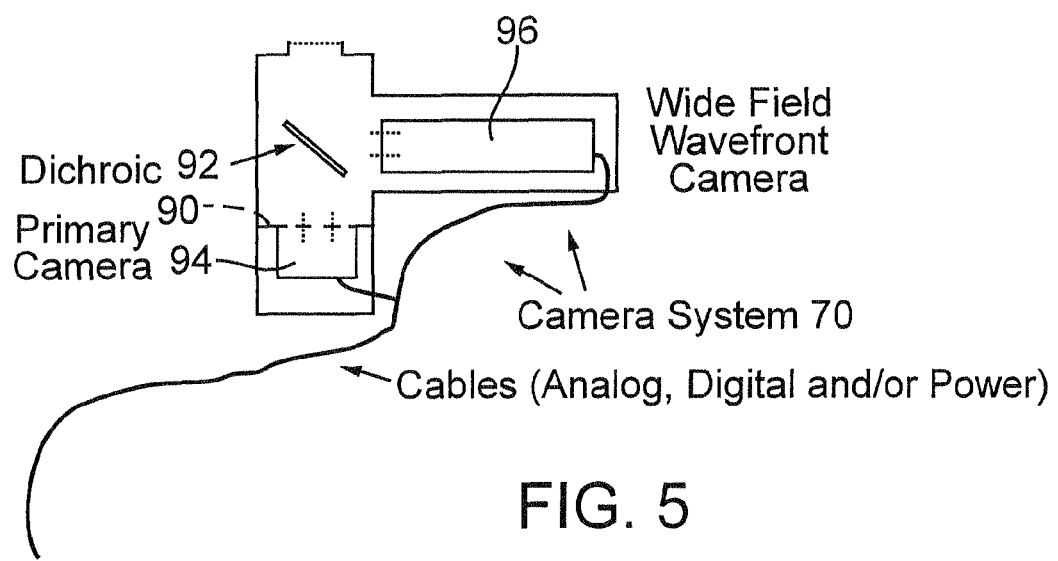
FIG. 5 is a block diagram of a camera system positioned at the detector plane shown in FIG. 4.

FIG. 5 shows that camera system 70 includes a dichroic optical element 92 that splits the incident light into two components and directs them to a primary camera 94 and a wavefront sensing system 96. Camera system 70 can be implemented with a primary camera 94 having a beam splitter that further divides the incident beam component into, for example, four components that each strike a different one of four detector elements. (The term "detector" as used herein refers to either a single detector element or multiple detector elements.) A preferred detector element is a charge-coupled device (CCD) of a channel amplification type, which enables high frame rate (i.e., at least 5 frames/second and nominally up to 100 frames/second) light pattern information acquisition. A suitable CCD detector element is an L3Vision CCD87 512×512 array with in-channel amplification, manufactured by e2v technologies. Each detector element preferably views a 20 nanometer-50 nanometer bandpass image that is tunable over the visible through near-IR spectrum. A primary camera 94 that is capable of imaging multiple spectral bands enables target recognition and other color imaging applications. Wavefront sensing system 96 provides information for optical system focusing and forming an image from the diffraction pattern.

The choices of the numbers of mirrors, distances between adjacent mirrors, mirror sizes, and related optical parameters for this embodiment were governed by a desire for minimal, efficient achievement of full and pseudo-uniform interferometric spatial frequency coverage.

FIG. 6 shows a mirror arm 100 defined by a primary mirror 28 and corresponding secondary mirror 44, tertiary mirror 52, and quaternary mirror 60. Mirror arm 100 has an optical path length segment and an effective focal length segment that are adjustable, as will be described below. With reference to FIG. 6, each mirror in mirror arm 100 is given its nominal location in a Cartesian coordinate system in which primary mirror 28 is located at the origin (0,0) and detector plane 90 is located 12 meters to the right at (12,0). Incoming light propagates through an arbitrary entrance and is reflected by primary mirror 28 and intermediate mirrors 44, 52, and 60 to camera system 70 positioned at detector plane 90.

More specifically, primary mirror 28 receives incident incoming light and first reflects it to secondary mirror 44, at location (10.5,10). Secondary mirror 44 reflects the light to tertiary mirror 52 at location (10.25,0), which reflects the light to quaternary mirror 60 at location (11.8,8), which then reflects the light to camera system 70. Skilled persons will appreciate that each primary mirror has a corresponding secondary, tertiary, and quaternary mirror, thereby providing a total of 23 mirror arms configured as depicted in FIG. 6, forming generally concentric rings. Although they are generally concentric, the rings are not all coplanar. As will be evident from the following description, certain of the rings may be tilted, so they need not lie in parallel planes. Moreover, the rings need not be circular. The "generally" concentric qualifier stems for possible small distance lateral shifting of the component rings, resulting in eccentric nesting of the different rings.

The light reflecting surfaces of the primary mirrors are of parabolic shape; and the light reflecting surfaces of the secondary, tertiary, and quaternary mirrors are of pseudo-conic (i.e., aspheric) shape. The mirror element prescription set forth in the table below presents the optical parameters of the mirror elements in each mirror arm 100.

| Mirror Element | Radius of Curvature (mm) | Conic Section Constant | Diameter (mm) |
| --- | --- | --- | --- |
| Primary | −29000 | −1 | 1000 |
| Secondary | −4821.8515 | −1.543 | 150 |
| Tertiary | −313087.133 | 1244.587930 | 80-90 |
| Quaternary | −2895.062870 | 3.190692 | 10-20 |

Steering of optical system 10 points its optical axis 102 at an angle without moving ring truss 26, the platform on which optical system 10 is supported. In a spaceborne configuration, steering of optical system 10 to point optical axis 102 at an angle relative to nadir is effected by reorienting primary mirrors 28, each of which can be reoriented, e.g., ±10 degrees, in all directions from its nominal position. Mirror arms 100 meet three conditions to form a coherent diffraction pattern at detector plane 90. These three conditions include nearly identical focal planes, common optical path lengths, and common effective focal lengths. Nearly identical focal planes for mirror arms 100 cause the bundles of light rays to converge to a single, shared three-dimensional spot for the system optical axis. A common optical path length maintains coherence of the light rays at detector plane 90 to provide high frequency detail in the diffraction pattern. A common effective focal length maintains constant lateral magnification.

To simultaneously meet these three conditions, three independent variables are controlled, namely, the positions of the secondary, tertiary, and quaternary mirrors. The secondary and quaternary mirrors are associated with positioning systems permitting lateral motions up to about ±20 centimeters and about ±5 centimeters, respectively. The tertiary mirrors are associated with positioning systems permitting lateral motions of up to ±1 meter. In addition to the lateral movements of the secondary, tertiary, and quaternary mirrors, the plane of the secondary mirror ring structure can be tilted by a mechanism that moves inner surface 40 of plate structure 14 supporting secondary mirrors 44. The plane of the tertiary mirror ring structure can similarly be tilted by a separate mechanism that moves top surface 50 of a ring-shaped plate (not shown) supporting tertiary mirrors 52. Whether the plane of quaternary mirror ring structure is equipped with a tilt mechanism would be a mechanical design option.

In the illustrated preferred arrangement of optical system 10, central hub 12 may have a radius of 1 meter, and tertiary mirrors 52 form a ring with a nominal radius of 1.75 meters. The tertiary mirrors mounted on top surface 50 of a ring-shaped plate can be moved laterally relative to hub 12 and thereby permit eccentric placement of the ring of tertiary mirrors 52 around the hub 12, and be moved relative to the hub by tip and/or tilt motion. The lateral and tip/tilt movements of secondary mirrors 44 can be achieved by similar arrangements. Thus, a ring supporting structure can provide coordinated movement of all of the mirrors of a ring in lateral and tip/tilt directions. (In some arrangements, tip/tilt control of the secondary mirrors can be omitted).

Tertiary mirrors 52 in one implementation are mounted on a linear, piston-driven actuator that permits ±1 meter of vertical movement of top surface 50. In this arrangement, the single piston moves all 23 of tertiary mirrors 52. Each tertiary mirror 52 can also be provided with small scale positioning systems for precise vertical positioning from the baseline provided by the shared piston. Each tertiary mirror 52 on the shared piston also has separate tip/tilt control. Alternatively, instead of employing a single, shared vertical positioning system (with fine individual adjustments), each tertiary mirror 52 can be mounted on its own linear actuator, thereby permitting independent movement.

Quaternary mirrors 60 are set to positions dictated by the particular placement and orientation of the primary, secondary, and tertiary mirrors to which each quaternary mirror 60 corresponds. As such, the quaternary mirrors 60 typically use highly customized positioning. While a movable ring support structure as described for the secondary and tertiary mirrors may be employed for gross positioning, the position of each quaternary mirror 60 may be sufficiently independent such that coordinated movement of the 23 mirrors by a movable support ring offers little benefit. In the depicted arrangement, the support structure for the quaternary mirrors 60 is static and each quaternary mirror 60 is provided with its own positioners. The quaternary mirrors are generally associated with a position configured to adjust focus only.

Figure 7:
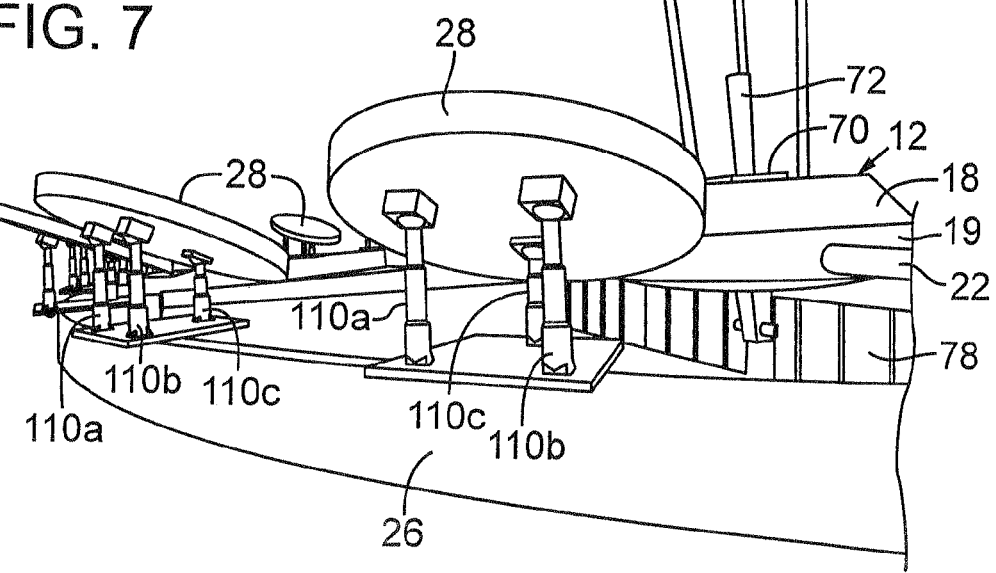
FIG. 7 is an enlarged fragmentary perspective view of several primary mirrors, each attached to three positioning devices mounted to a ring truss on the optical system of FIG. 1.

FIG. 7 shows with reference to primary mirrors 28 (with fairings 30 removed for clarity) mounted on ring truss 26 an exemplary positioning system implementation that can accomplish individual tip/tilt and linear adjustment for each mirror. Although it is shown with respect to primary mirrors 28, this positioning system can also be implemented with the secondary, tertiary, and quaternary mirror ring structures. With reference to FIG. 7, each of three extensible pistons 110a, 110b, and 110c has one end mounted in a spherical bearing joint on the bottom side of fairing 30 of mirror 28 and the other end fixed to a plate 112 mounted on ring truss 26. Changing the lengths of extensible pistons 110a, 110b, and 110c by equal amounts linearly adjusts the vertical distance between the mirror 28 connected to them and ring truss 26 and thereby adjusts the optical path length of the mirror arm 100 to which mirror 28 is associated. Changing the lengths of extensible pistons 110a, 110b, and 110c by different amounts accomplishes tip/tilt positioning of mirror 28 connected to them. (In the preferred embodiment described, primary mirrors 28 undergo only tip/tilt positioning.)

Skilled persons will appreciate that the tip/tilt positioning of primary mirrors 28 contributes significantly to an angular momentum vector that would tend to tip the mass of the entire structure of optical system 10. Ensuring the conservation of angular momentum would maintain the pointing direction stability of optical system 10 under such conditions. This can be accomplished by the use of countermasses producing an angular momentum vector of opposite direction to that produced by primary mirror movement and other sources of residual angular momentum offset. In other words, these same principles apply to all masses that move and generate an angular momentum vector.

It will be appreciated that positions of the secondary mirrors depend on position of the primary mirrors, and that the positions of the tertiary mirrors depend on the positions of the primary and secondary mirrors. Control arrangements may be devised that mechanically couple movement of secondary mirrors 52 to primary mirrors 28 to achieve at least gross positioning. Such control systems are simplified if the relationship of the movements of the components are linear. Nonlinear relationships can be addressed by screw driven cams and similar types of positioning mechanisms.

Figure 8:
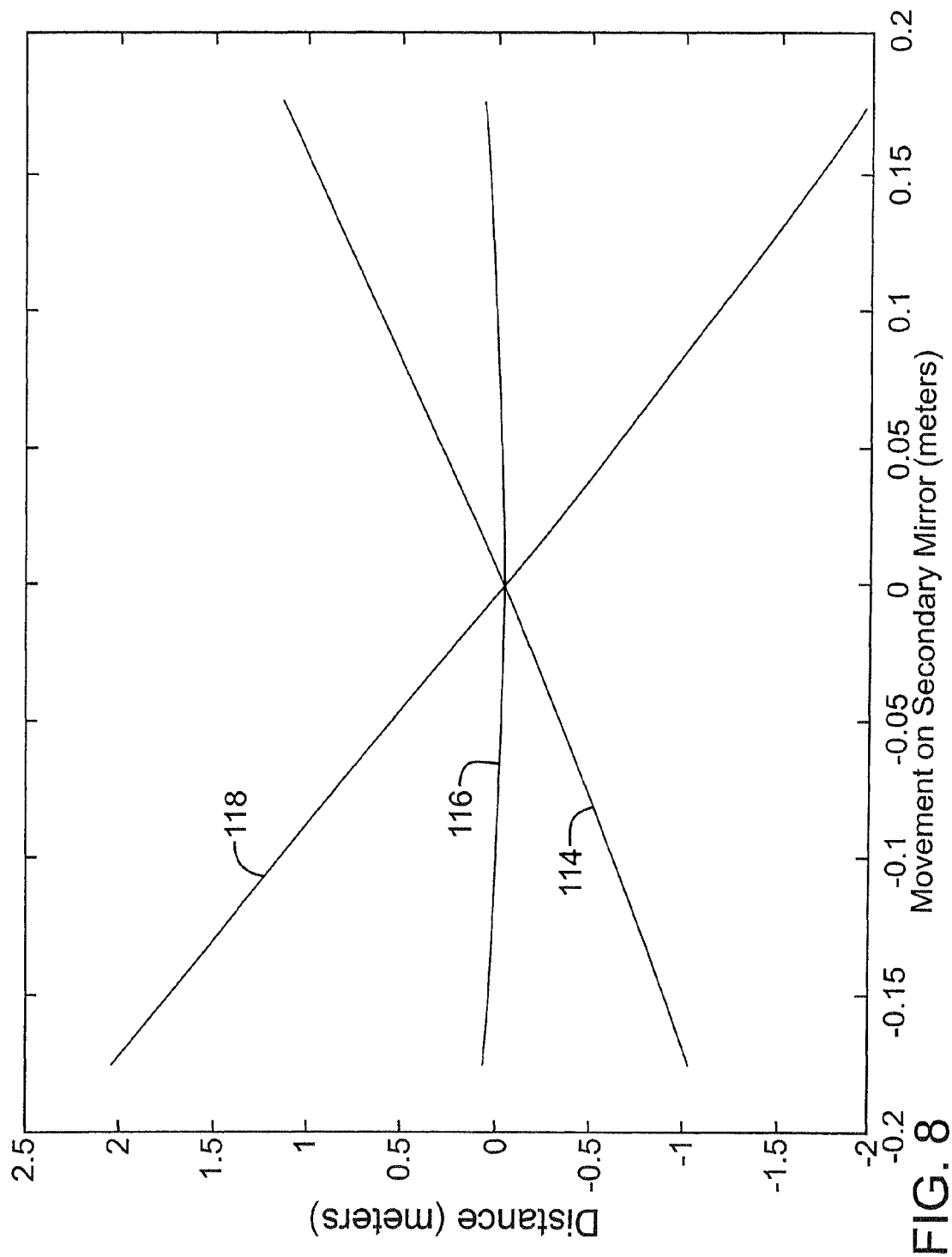
FIG. 8 is a graph showing optical path length relative to nadir in operation of the positioning of the mirrors of the optical system of FIG. 1.

FIG. 8 is a graph showing the optical path length of optical system 10 relative to nadir and the corresponding movements of secondary mirror 44, tertiary mirror 52, and quaternary mirror 60 required to adjust their corresponding optical path length contributions to their associated mirror arm 100 in response. The abscissa represents the position value of secondary mirror 44, and the ordinate indicates the position value of each of tertiary mirror 52 and quaternary mirror 60. (Primary mirror 28 performs only tip/tilt movement in this example.) Curve 114 and curve 116 represent the corresponding movements of tertiary mirror 52 and quaternary mirror 60, respectively, in response to movement by secondary mirror 52. Curve 118 represents the optical path length of the mirror arm 100 to which the primary, secondary, tertiary, and quaternary mirrors are associated. For example, if there is a command to point system optical axis 102 5-degrees from nadir, optical system 10 specifies from memory storage the corresponding optical path length, individually for each of the 23 mirror arms 100. FIG. 8 provides motion curves that specify the position values of each of secondary, tertiary, and quaternary mirrors to adjust their corresponding optical path length contributions to their associated mirror arm 100 in response to the command.

Primary mirrors 28 are mounted on tip/tilt positioners to provide their steering capability. Redundant positioning systems may be employed in anticipation of failures of certain systems in long-term space environments. Thus, a tip-controlling motor may be mounted on a stage controlled by a tilt-controlling motor, which in turn is mounted on top of a second tip-controlling motor, which in turn is mounted on a third tilt-controlling motor. The last two motors would generally remain unused; however, if the first tip/tilt motors fail, the underlying tip/tilt motors can be used to preserve complete operation. In addition, or in the alternative, the motors that control the tip/tilt motions (e.g., through worm gears) can employ redundant motor windings, so that if one motor winding fails, the control system can switch to the backup winding. Loss of mirrors is akin to shuttering small parts of the aperture of the optical interferometer. Resolution would be somewhat impaired if many adjoining mirrors are lost, but overall optical system performance would not be seriously degraded until about 15 of the mirror arm paths are in operation. If operating in a motion target indicator mode, in which moving objects are detected (i.e., no image formation), optical system 10 can function with as few as 10 mirror arm paths in operation.

Figure 9:
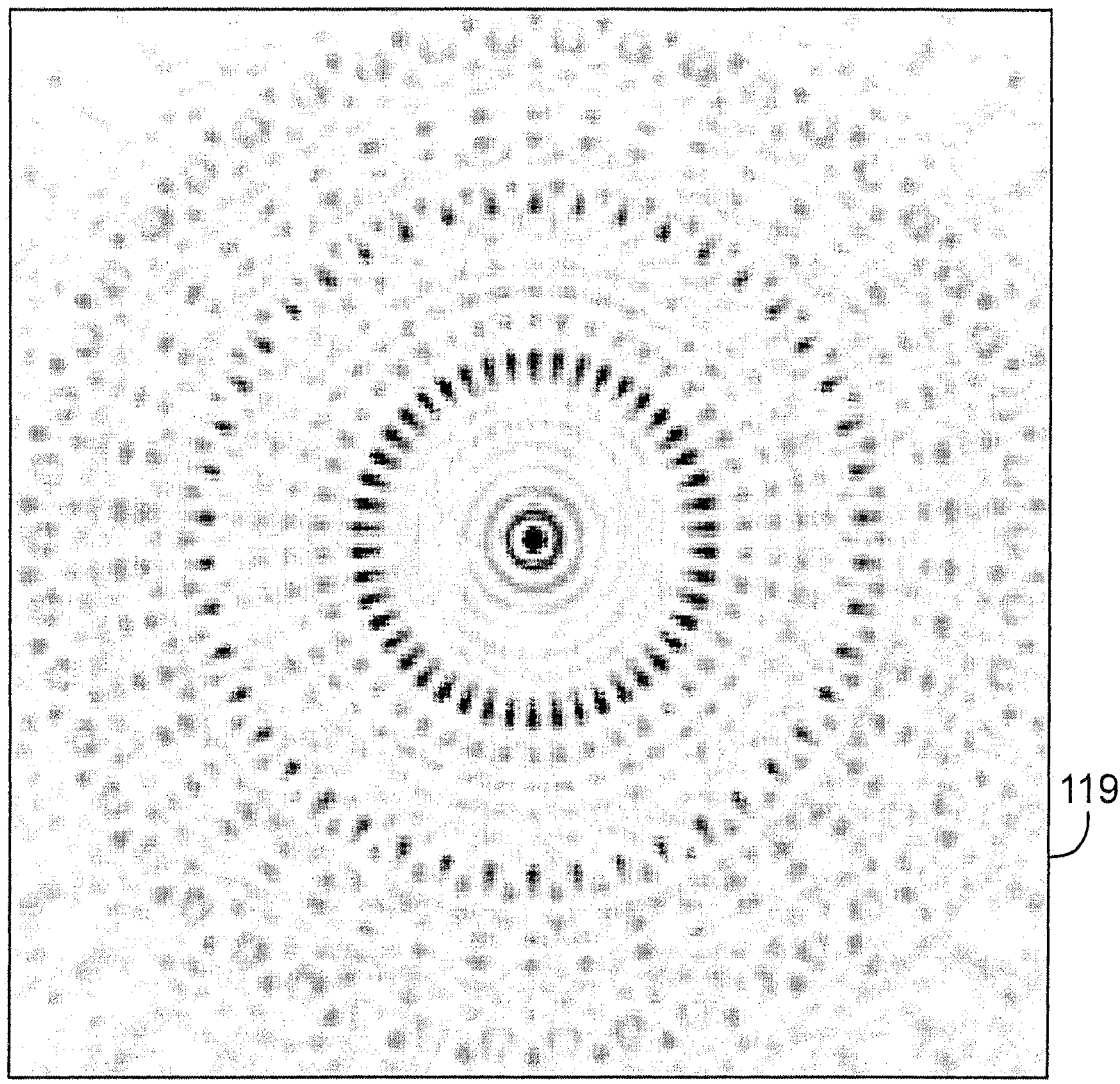
FIG. 9 is an exemplary diffraction pattern formed at the detector plane of the optical system of FIG. 1.

When the beams from the 23 primary mirrors are superimposed on the optical detector, a diffraction pattern results in the form of a complicated point spread function. Slight imperfections in the tip/tilt and optical path length adjustment mechanisms characterizing the state of the optical system also complicate the point spread function. This pattern is characterized and compensated-for to yield a final image by practice of known techniques taught by applicant's '227 patent. FIG. 9 shows an exemplary combined coherent radiation diffraction pattern 119 formed on the light receiving surface of optical detector 70. Wavefront sensing system 96 (FIG. 5) detects biases and misalignments of optical system 10, and the '227 patent teaches techniques for measuring the biases and misalignments and how to correct for them. The '227 patent particularly concentrates on the wavefront sensing of low contrast, extended scenes and their notorious difficulties in achieving focus.

From geostationary orbit, it appears that the interferometric optical system described above can achieve an imaging resolution on the order of approximately 0.8 meter. If placed ten times closer to Earth, a resolution ten times greater could be achieved.

Skilled persons will appreciate that, although the preferred embodiment described is implemented with certain degrees of movement (tip/tilt/lateral/vertical) for different mirrors, other embodiments can employ different combinations of movements (including movement of the detector). More generally, while the detailed arrangement employs four sets of mirror (primary, secondary, tertiary, and quaternary), other embodiments can employ more or fewer mirror sets.

An implementation using a single quaternary mirror 60 with a tip/tilt positioning device (possibly in association with a linear piston (focusing) positioning device) may be substituted for a mirror ring to reduce cost. The effect would be to constrain the quaternary mirror to linear motion at the expense of complicating the shapes of curves 114 and 116 representing the positioning of the tertiary mirror 52 and quaternary mirror 60, respectively.

The embodiment described above was in the context of an orbiting earth-imaging optical interferometer; however, the same arrangement can be pointed to image astronomical subjects. Such an optical interferometer can also be terrestrially based and used to image subjects in and beyond the atmosphere.

Figure 10:
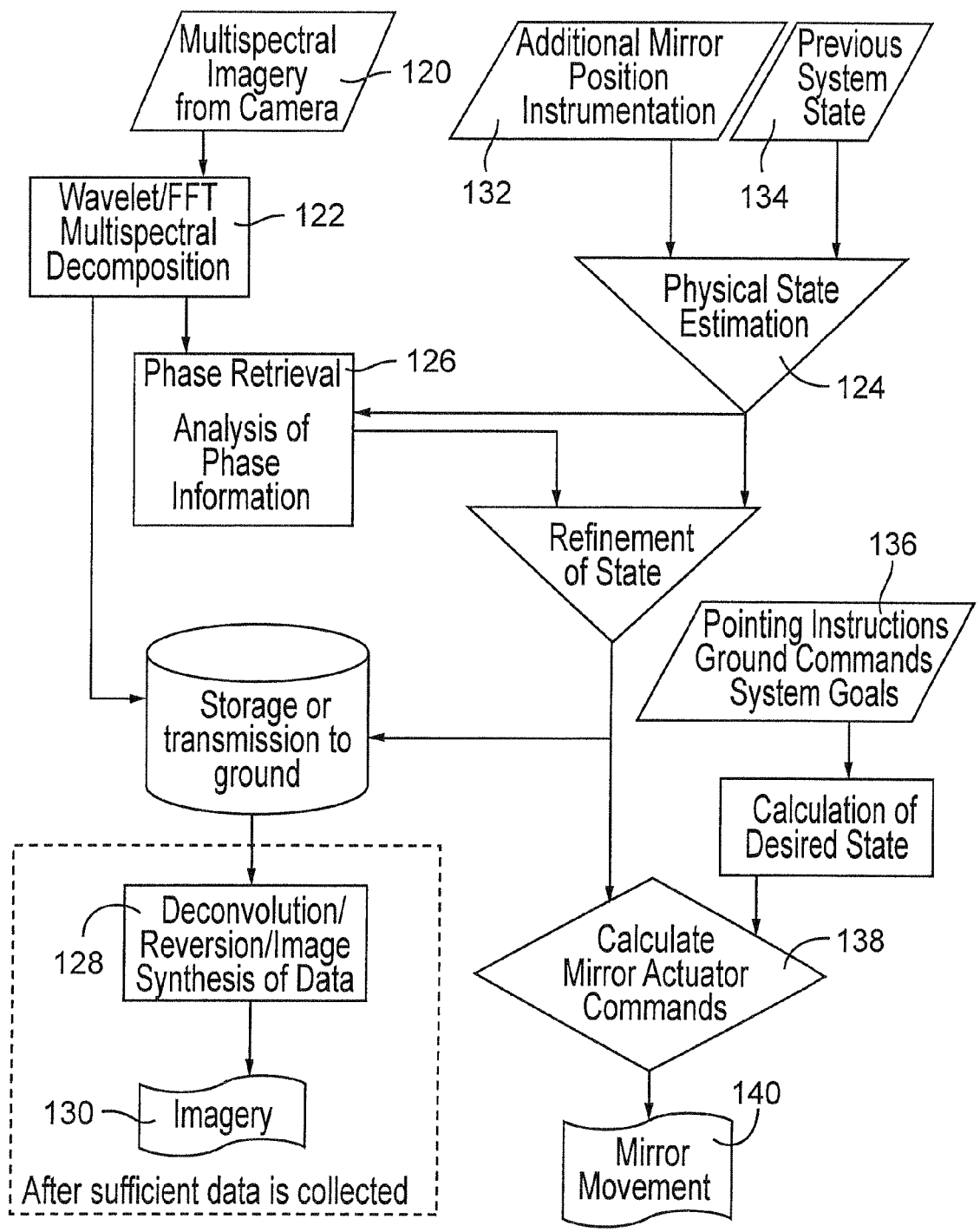
FIG. 10 is a synoptic flow diagram of the primary information and control processes underpinning the dynamic function of the preferred embodiment.

FIG. 10 is a synoptic flow diagram that summarizes the primary information and control processes underpinning the dynamic function of one embodiment. The corresponding process blocks are noted in parentheses in the following description.

Instead of taking single images by a "dwelling" detector, as is typical of prior art sparse array designs, primary data are gathered using a high frame rate stream of primary detector interferometric data from multiple spectral bands (120). Attempting to form a single image would produce the same blurry image typical of ground-based astronomy looking through the atmosphere. The primary data are first decomposed into wavelet-like, spatial-spectral data (122), which are then delivered to three cascaded data processing units: (A) a physical state estimation unit (124); (B) a "phasing" system (126); and (C) an image synthesis processing unit (128).

Forward and backward physical state estimation unit (124) drives physical figure (i.e., overall mirror position) control "phasing" system (126). The phasing system (126) not only supports actual figure control but also provides time-delayed "best estimate" physical state information to an image synthesis processing unit (128). The image synthesis processing unit (128) references raw data from the primary sensors against "best estimate biases" synthesized from the raw information of the figure control phasing system (126) and physical state estimation unit (124), ultimately forming a single high-resolution image of the object/scene (130).

The inclusion of independent wavefront sensors or on-board position sensors (132, 134), together with pointing instructions (136), provide data that improve the physical figure control system and/or the best estimate biases. This facilitates constant correction of the satellite and thereby contributes to calculation of mirror actuator commands (138) for the desired overall mirror movement (140). Wavefront sensing system 96 of FIG. 5 (operating in accordance with teachings of the '227 patent) contributes to the mirror position instrumentation indicated in process block 132 of FIG. 10. Other potential possible contributors to the mirror position instrumentation include on-board laser positioning devices.

Establishing and Maintaining Focus

Skilled persons will immediately recognize that establishing and maintaining focus of optical system 10 (i.e., phasing optical system 10) is a system engineering challenge. Furthermore, it is immediately recognizable that the quaint notion of the term "focus" itself is a gross over-simplification of what truly needs to happen, but that singular word retains the value that it succinctly expresses the technical goal. In short, the end-goal is to ensure optical system 10 takes good pictures.

The term "wavefront error" (WFE) summarizes the degree to which perfect focus or phase is not being achieved and thus describes an instantaneous ability of a telescope to gather good pictures. Briefly, electromagnetic radiation propagating from a distant object approaches a telescope as a culturally derived notional plane-wave. When in focus, the mirror trains of a segmented telescope bring the entire wave to a single point at focal plane 90. Wavefront error summarizes the extent to which a telescope does not bring the entire wave to a single point at focal plane 90, where WFE is described in terms of wavelength of the notional plane-waves. Generally speaking, telescopes with a WFE better than one-tenth of a wavelength, root mean-square (RMS), generate "good" quality pictures. With certain major exceptions that this disclosure will explore in detail, telescopes which have a WFE approaching one-quarter wavelength to one-half wavelength and higher, RMS, generally generate "poor" quality pictures.

Phasing a telescope is a common term-of-art which essentially means the same thing as focusing the telescope. The term "phase" will be used very carefully in this disclosure because two very different meanings of the term "phase" are used herein. One meaning of the term "phase" refers to the notion that the theoretical phase of the physical phenomena of electromagnetic radiation needs to be brought into alignment at a focal-plane detector even though the electromagnetic radiation has been split into multiple paths. The art of interferometry is grounded in this type of physics-based phasing. Another meaning of the term "phase" refers to the Fourier domain phase of focal-plane detector data (e.g., in the context of temporal phase diversity). Related terms in the Fourier domain phase context are "phasor" and "phasor spin."

Figure 11:
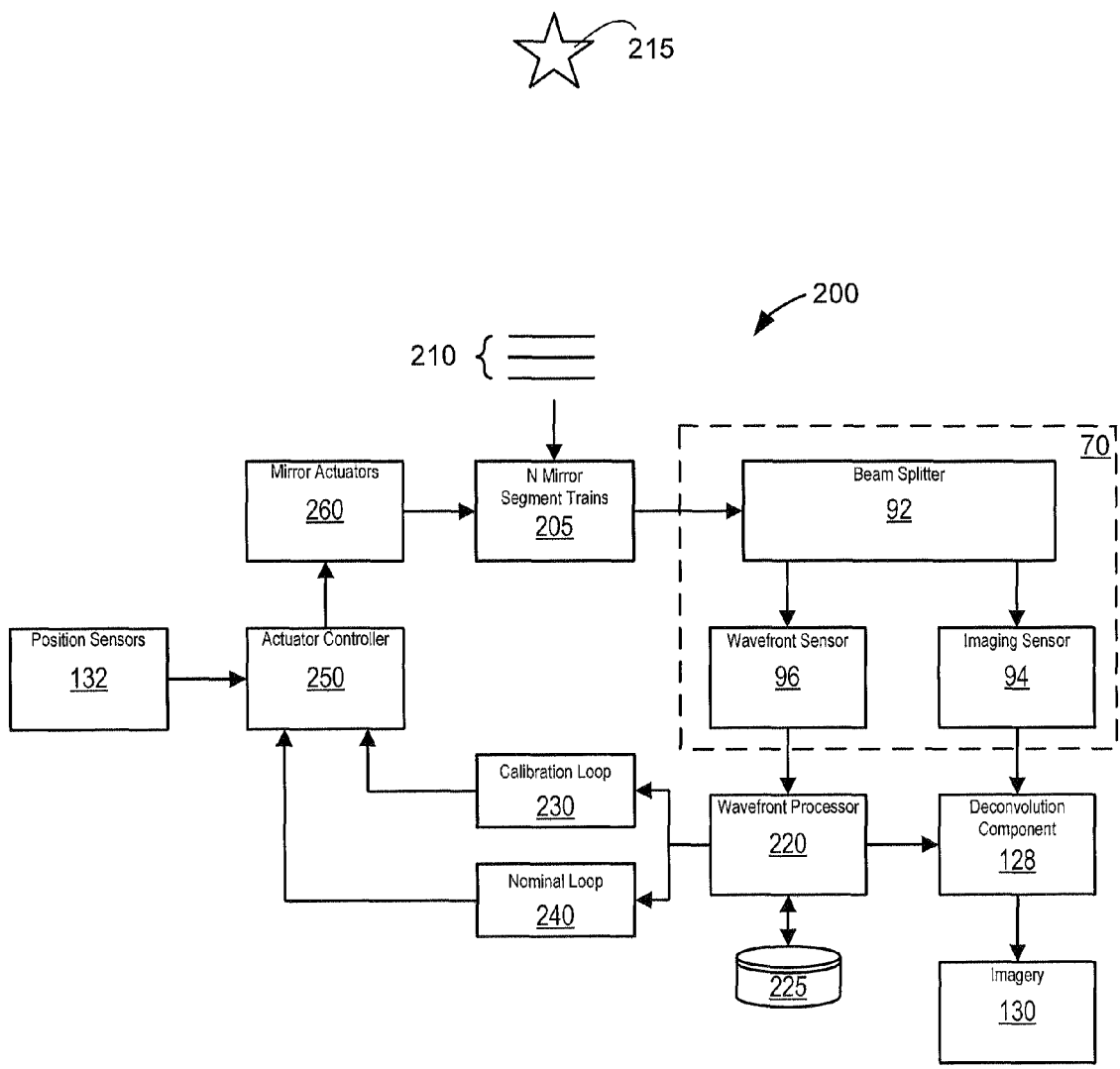
FIG. 11 is a high-level block diagram illustrating a system for focusing the multi-aperture interferometric optical system and forming an image from data collected by the optical system, according to one embodiment.

FIG. 11 is a high-level block diagram summarizing an example focusing system 200 for automatically focusing optical system 10. While focusing system 200 is designed to focus multi-aperture interferometric optical system 10, focusing system 200 may also be used to focus any segmented optic telescope (i.e., a telescope that reflects electromagnetic radiation from a distant object off of at least two primary mirror surfaces and converges the reflected light onto a shared singular focal-plane detector to form what is conventionally referred to as a single "image" on that detector).

Grossly summarized, a set of N mirror segment trains 205 of focusing system 200 cooperate to focus electromagnetic radiation (depicted as plane-waves 210) propagating from a target, such as a star 215, on optical detector 70, which is positioned at focal plane 90 (see FIGS. 3 through 6). As used herein, segment train refers to a given primary segment and any mirrors beyond it that direct reflected electromagnetic radiation onto detector 70. For example, the preferred embodiment described with reference to FIGS. 1 and 6 includes 23 mirror segment trains, each of which includes four mirrors (e.g., mirrors 28, 44, 52, and 60). A wavefront processor 220, among other things, generates 2D fast Fourier transforms (FFT) of data frames captured by detector 70 that will be used to focus the optical system 10. A calibration loop 230 and a nominal loop 240 establish and maintain focus, respectively, of optical system 10 using data gathered from focal plane 90. Based on data from calibration loop 230, nominal loop 240, or both, an actuator controller 250 generates actuator commands for adjusting mirror positions (e.g., tip positions, tilt positions, piston positions, or a combination thereof within segment trains 205 via mirror actuators 260. While focusing system 200 may use additional data from other sources, such as on-telescope position sensors 132 or pupil-plane data sources, focusing system 200 need only use data from focal plane 90 to establish and maintain focus of optical system 10. The other data sources may be used in certain embodiments to enhance focusing and add redundancy to the focusing operation.

In a preferred embodiment, focusing system 200 establishes and maintains focus when optical system 10 is aimed at an object or scene having a non-zero contrast. However, focusing system 200 may also establish and maintain focus as scenes approach zero-contrast (e.g., the blank wall problem) using techniques described in further detail below.

As previously described with reference to FIG. 5, optical detector 70 includes a beam splitter 92 for splitting incident electromagnetic radiation into two components that are directed toward primary image sensor 94 and wavefront sensing system 96. Optical detector 70 is configured to sequentially capture discrete data (i.e., data frames) over time to aid in establishing and maintaining focus of optical system 10. Thus, according to a preferred embodiment, optical detector 70 generates a sequence of data frames. However, classic "still image" cameras may be used to establish and maintain focus of optical system 10 if procedures are implemented to analyze sequences of still images. According to one embodiment, optical detector 70 comprises multiple detectors tuned to different wavelengths of electromagnetic radiation. While color imagers and multi-spectral cameras greatly enhance the performance of focusing system 200, this disclosure will concentrate on what is conventionally referred to as "white light" or "broad spectrum" imaging. Essentially, "white light" is the most challenging case, and the disclosure will provide ancillary descriptions on how multiple detectors can increase the performance of focusing system 200.

Referring again to FIG. 11, wavefront processor 220 analyzes the data frames generated by wavefront sensing system 96 to determine phase information corresponding to the underlying data (e.g., Fourier phase and magnitude information). The phase information is used by calibration loop 230 and nominal loop 240 to establish and maintain focus of optical system 10. Simply put, calibration loop 230 takes a "way out of focus" segmented optic telescope and brings it into initial focus and nominal loop 240 attempts to maintaining that focus. Nominal loop 240 includes condition branches that are meant to deal with the range of conditions from so-called nominal conditions of slight de-focus all the way to abrupt and gross out-of-focus, effectively looping back to earlier stages in the focusing sequence (i.e., calibration loop 230) if and when larger-than-nominal distortions occur. Generally, a telescope is "out-of-focus" when its WFE is equal to or greater than five wavelengths RMS, "near-focus" when its WFE is between five wavelengths and one-eighth wavelength RMS, and "in-focus" when its WFE is equal to or less than one-eighth wavelength RMS.

According to one embodiment, calibration loop 230 takes a telescope from the out-of-focus state to the near-focus state by grossly aligning and focusing individual segments of a segmented optic telescope, followed by an inter-segment process starting with fine-scale tip-tilt alignment and then piston-based interferometry. The words tip, tilt, and piston are terms-of-art referring to three of the most basic controls one has over a given segment of a multi-segment telescope.

Nominal loop 240 attempts to keep optical system 10 in the in-focus state across a range of operational conditions. Such operational conditions are ultimately unlimited in their scope, so the nominal loop 240 attempts to keep optical system 10 in-focus while recognizing that optical system 10 may sometimes drift into the near-focus realm or even into the out-of-focus realm, and will need to act accordingly in order to get optical system 10 back to the in-focus state. Thus, according to one embodiment, once nominal loop 240 gains control of focusing optical system 10, it may split into a remedial loop based on an ongoing confidence of whether an in-focus state is being maintained or violated. If the in-focus state is being violated, the remedial-loop simply walks as far back into the in-focus establishment steps (e.g., calibration loop 230) as the WFE dictates and then retraces the necessary steps.

According to one embodiment, focusing system 200 utilizes an incremental modulation, measure, and response form of a control loop to automatically focus the telescope, in which focusing system 200 applies a concurrent set of modulation increments covering combinations of the tip-tilt-piston states of each segment. After measuring a response of optical system 10 to the modulation increments, focusing system 200 then determines whether object 215 is into better focus, worse focus, or the same level of focus by examining focal-plane data. The measurements relating to the degree of focus are used to generate a set of actuation instructions that reactively incrementally modulate optical system 10 into a better state of focus.

Focusing system 200 may store (e.g., in memory 225) an ongoing estimation of residual WFE over time to turn what otherwise is a telescope producing mediocre quality pictures into one giving effectively diffraction-limited quality pictures. For example, the residual WFE data can feed wavefront-assisted deconvolution routines within deconvolution component 128 to transform otherwise slightly blurry imagery into crisp diffraction-limited imagery 130. Thus, by estimating WFE over time, focusing system 200 performs the dual roles of establishing and maintaining focus of optical system 10 and post-processing slightly blurry raw image data into near diffraction-limited imagery.

Overview

Before describing detailed examples of establishing and maintaining focus in segmented-optic telescopes using only focal-plane detector data, general concepts surrounding segmented-optic telescopes and data analysis tools will first be described.

Figure 12:
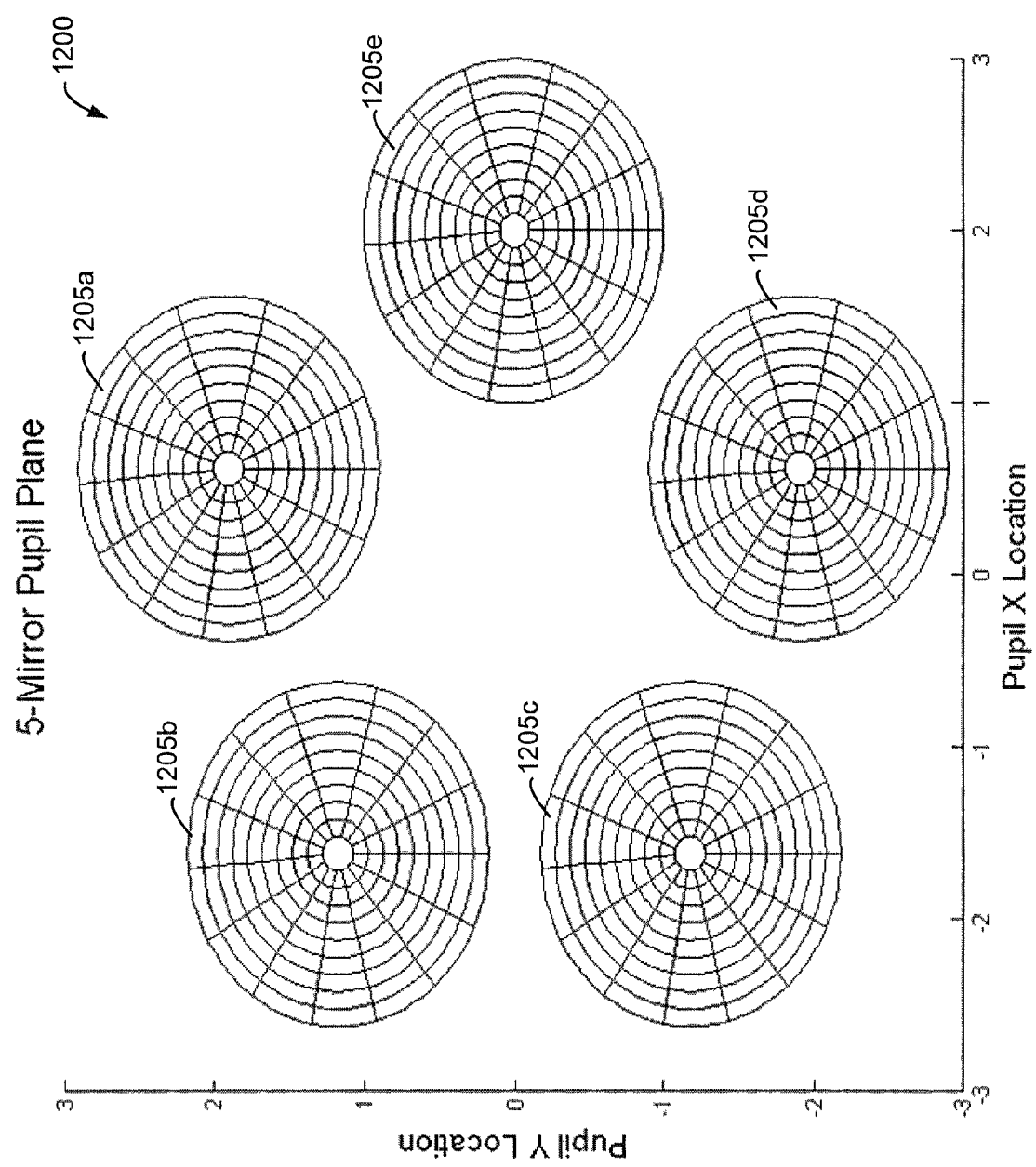
FIG. 12 is a graph depicting an example of a five-mirror pupil plane.

FIG. 12 depicts a five-mirror pupil plane 1200 of a generic segmented optic telescope having five circular mirrors 1205a-1205e. Skilled persons will recognize that pupil plane 1200 is not a physical surface but represents an abstraction, which can be intuitively viewed as a perfect planar light-wave interacting with the primary mirrors of a telescope (e.g., primary mirrors 28 of FIG. 1). The units on the x-axis and y-axis are ultimately arbitrary, and hence no units are indicated in FIG. 12. However, the units on the x-axis and y-axis could be in meters representing the actual physical dimensions of the primary mirrors, in which case FIG. 12 would represent five circular mirrors 1205a-1205e having an approximately two-meter diameter (relatively small for a big-program modern observatory, but quite large for a telescope intended for terrestrial, aerial or near-space imaging).

Wavefront Error (WFE)

Figure 13:
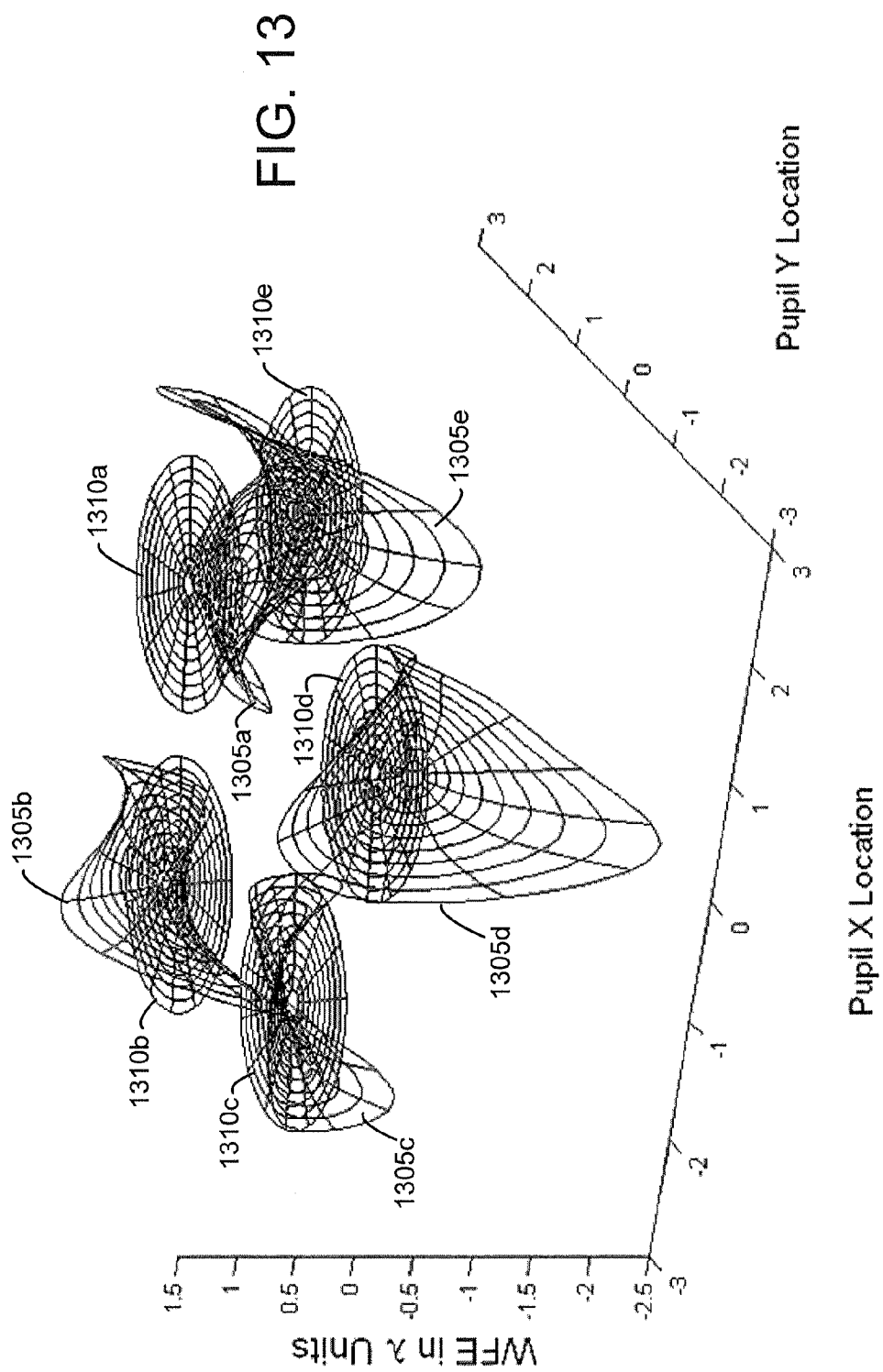
FIGS. 13 and 14 are graphs depicting two examples of a wavefront error (WFE) associated with each pupil plane of the five-mirror pupil plane of FIG. 12.
Figure 14:
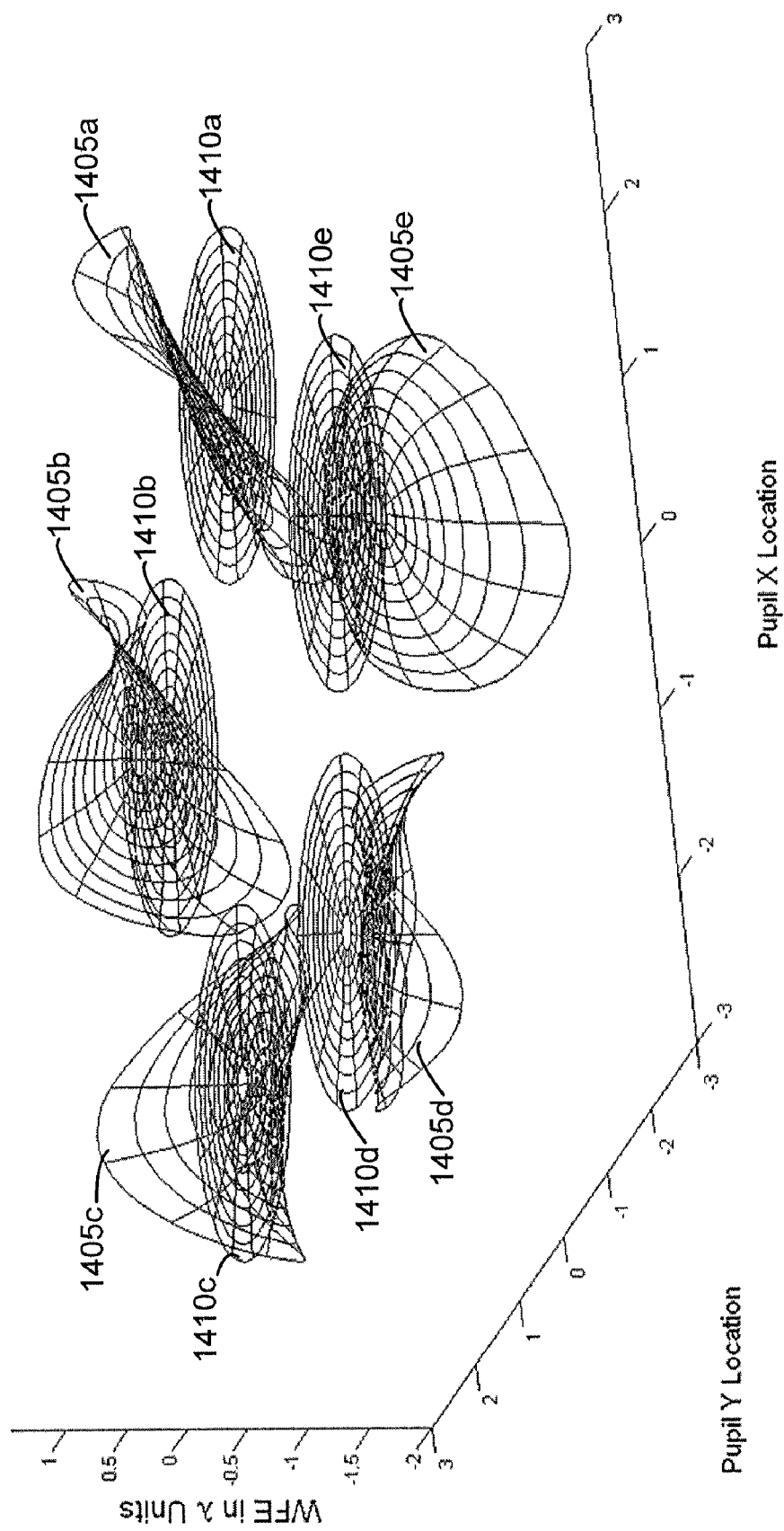

As a plane wave of light (or other electromagnetic radiation) enters and travels through each segment of a telescope, the plane wave interacts with one or more planes of mirrors and is modulated by distortions inherent in the mirror-planes of each segment to produce a specific WFE profile. For example, the previously described preferred embodiment includes twenty-three segments (see FIG. 1), each of which includes four mirror planes (see, e.g., FIG. 6). In other words, a plane wave reflecting off of primary mirror 28 will encounter three other mirrors 44, 52, and 60 before converging onto detector 70 located at focal plane 90. As shown in FIGS. 13 and 14, each segment produces specific WFE profiles 1305a-1305e and 1405a-1405e, respectively, as the plane wave travels through each segment. Pupil planes 1310a-1310e and 1410a-1410e serve as reference planes and represent what the plane wave should look like if there is no WFE. While the x-axes and y-axes of FIGS. 13 and 14 are unit-less, the z-axes have units in wavelengths of light (or other electromagnetic radiation) represented by lambda, $\lambda$. Although the z-axes have units in $\lambda$, arbitrary magnitudes are depicted and a WFE of one $\lambda$ or more is generally associated with fairly distorted final imagery.

Figure 15:
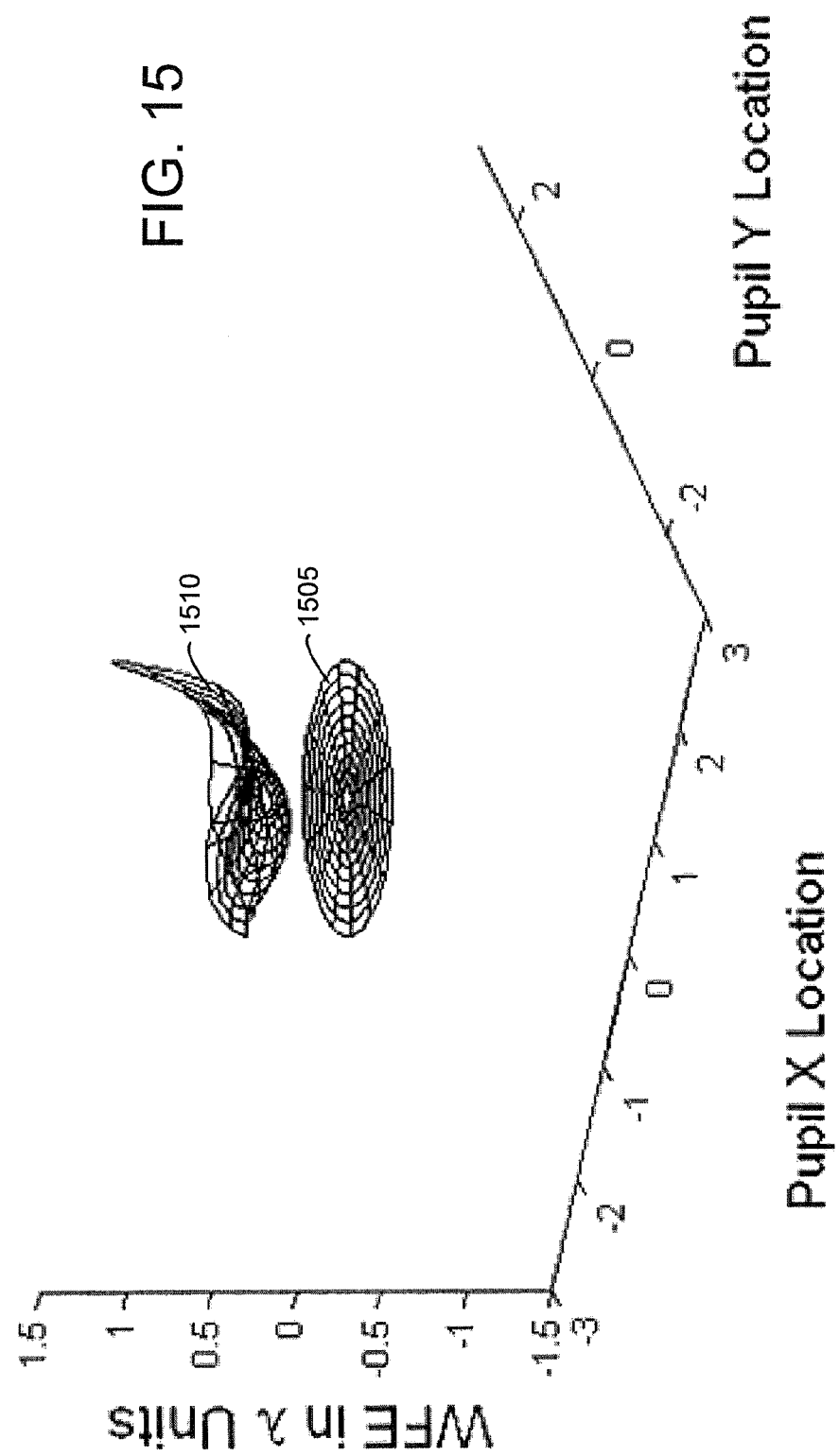
FIG. 15 is a graph depicting an example of a WFE associated with just one pupil plane.
Figure 16:
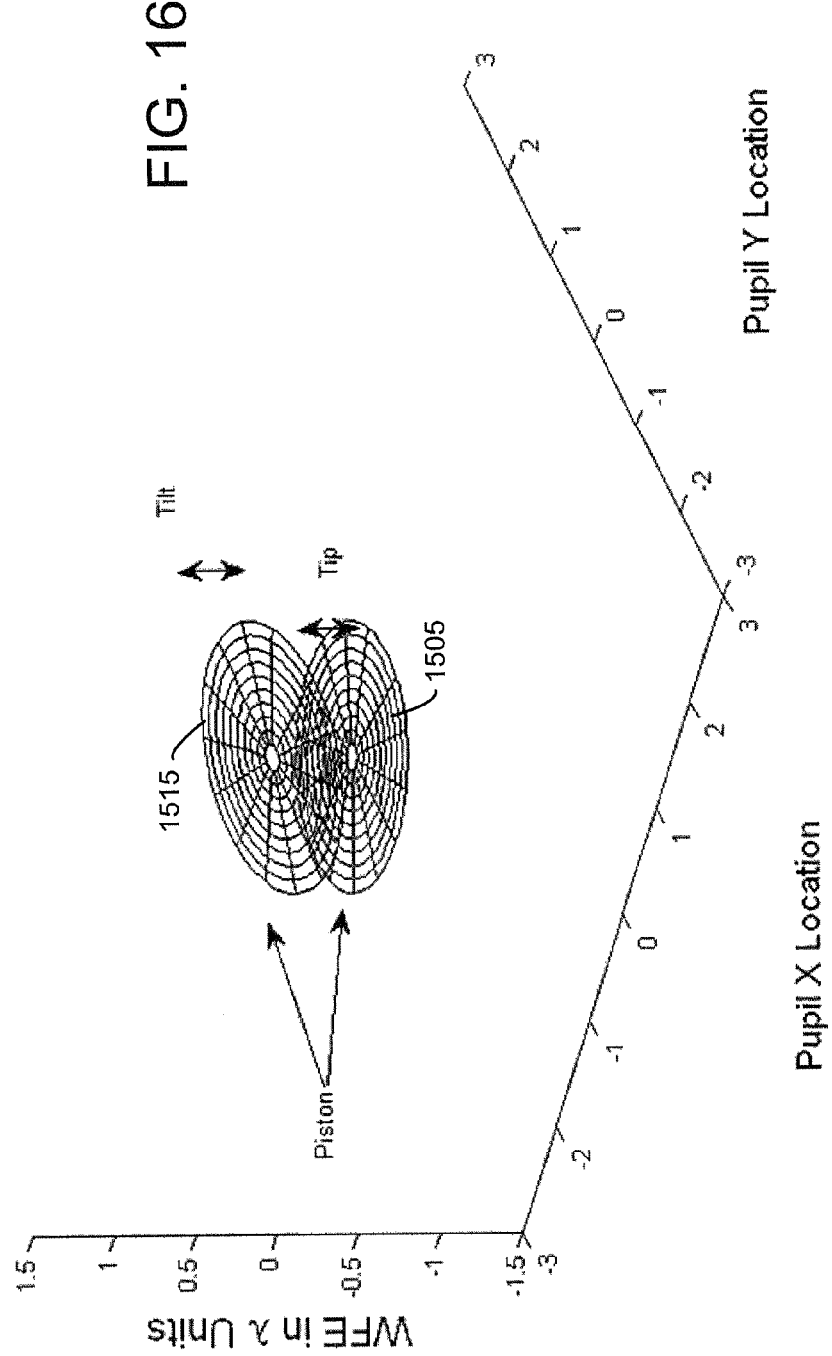
FIG. 16 is a graph depicting tip, tilt, and piston offsets of an example WFE with respect to an ideal pupil position.

FIG. 15 depicts for one segment an isolated pupil plane 1505 overlaid by an example WFE 1510. Actual WFEs would be much more distorted than the smooth WFE depicted in FIG. 15 and would likely contain clear artifacts (e.g., lumps and features) related to microscopic properties of the multiple mirror surfaces added together. FIG. 16 depicts an example WFE 1515 having roughly the same orientation as that of WFE 1510 (FIG. 15), but WFE 1515 has been stripped of its "curves" and is just a slanted and offset version of a planar disk. FIG. 16 also crudely labels a piston component, tip component, and tilt component of WFE 1515. The piston component represents the WFE's height above or below an ideal pupil position (e.g., pupil plane 1505). The tip component represents the WFE's angle with respect to the x-axis. The tilt component represents the WFE's angle with respect to the y-axis.

Figure 17:
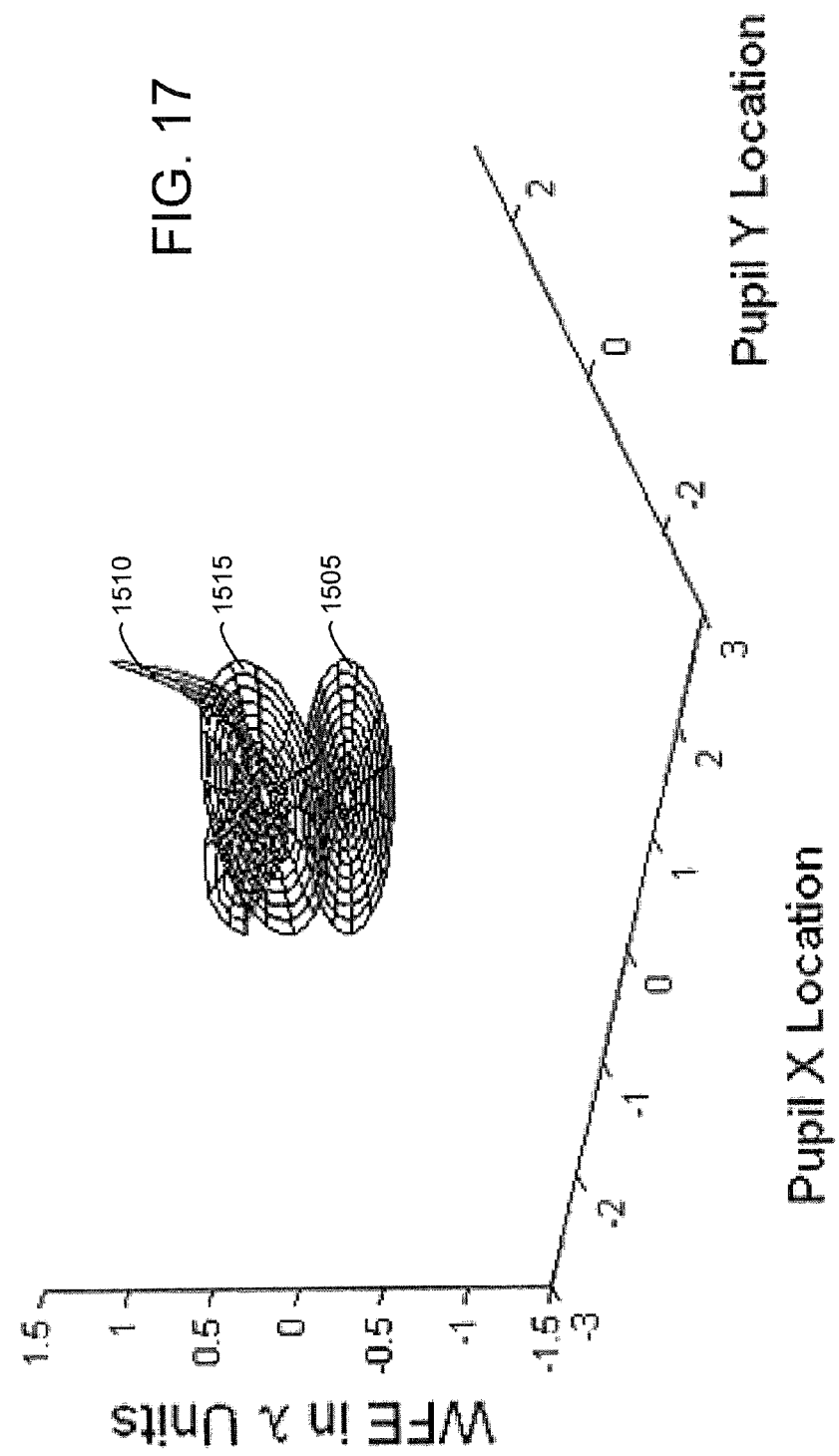
FIG. 17 is a graph depicting the example WFE of FIG. 15 along with the tip, tilt, and piston offsets of FIG. 16.

FIG. 17 combines FIGS. 15 and 16 and illustrates that example WFE 1515 of FIG. 16 represents the tip, tilt, piston (TTP) components of example WFE 1510 of FIG. 15. It is possible to hone in on just these three main components because the higher order WFE components (e.g., the curves) generally have time-bandwidth changes several orders of magnitude slower than those of the tip-tilt-piston components (see, e.g., FIG. 19) and separate procedures more akin to engineering calibration routines can be utilized to measure, actuate, and correct the higher order WFE components. For example, measuring, actuating, and correcting higher order WFE components can follow the same or similar procedures as the lower order WFE components, but will result in larger matrices and a possible reduction in signal-to-noise ratio on the resulting temporal phase diversity measurements.

Figure 18:
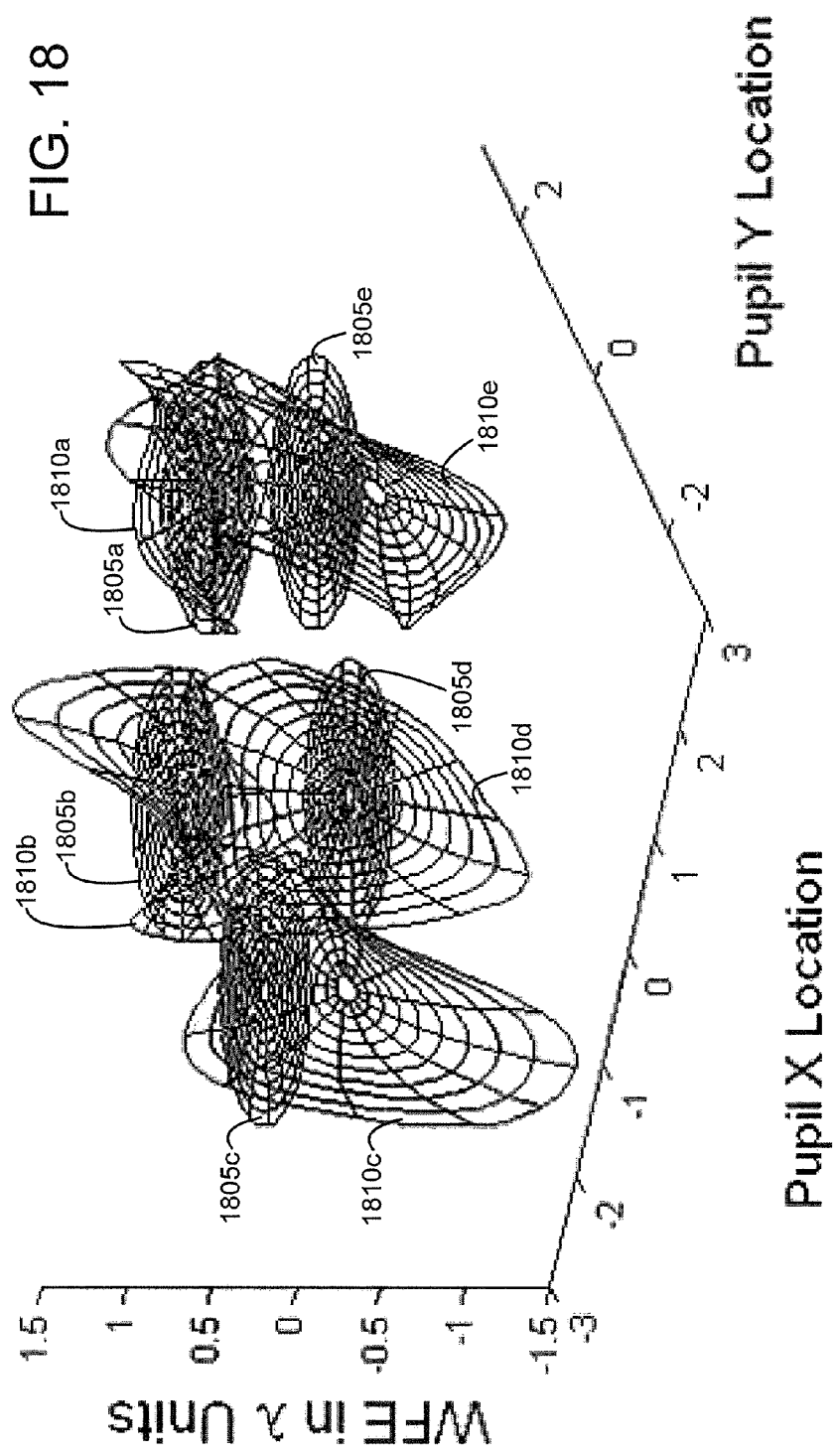
FIGS. 18-24 are graphs depicting other example WFEs associated with the five-mirror pupil plane of FIG. 12.
Figure 19:
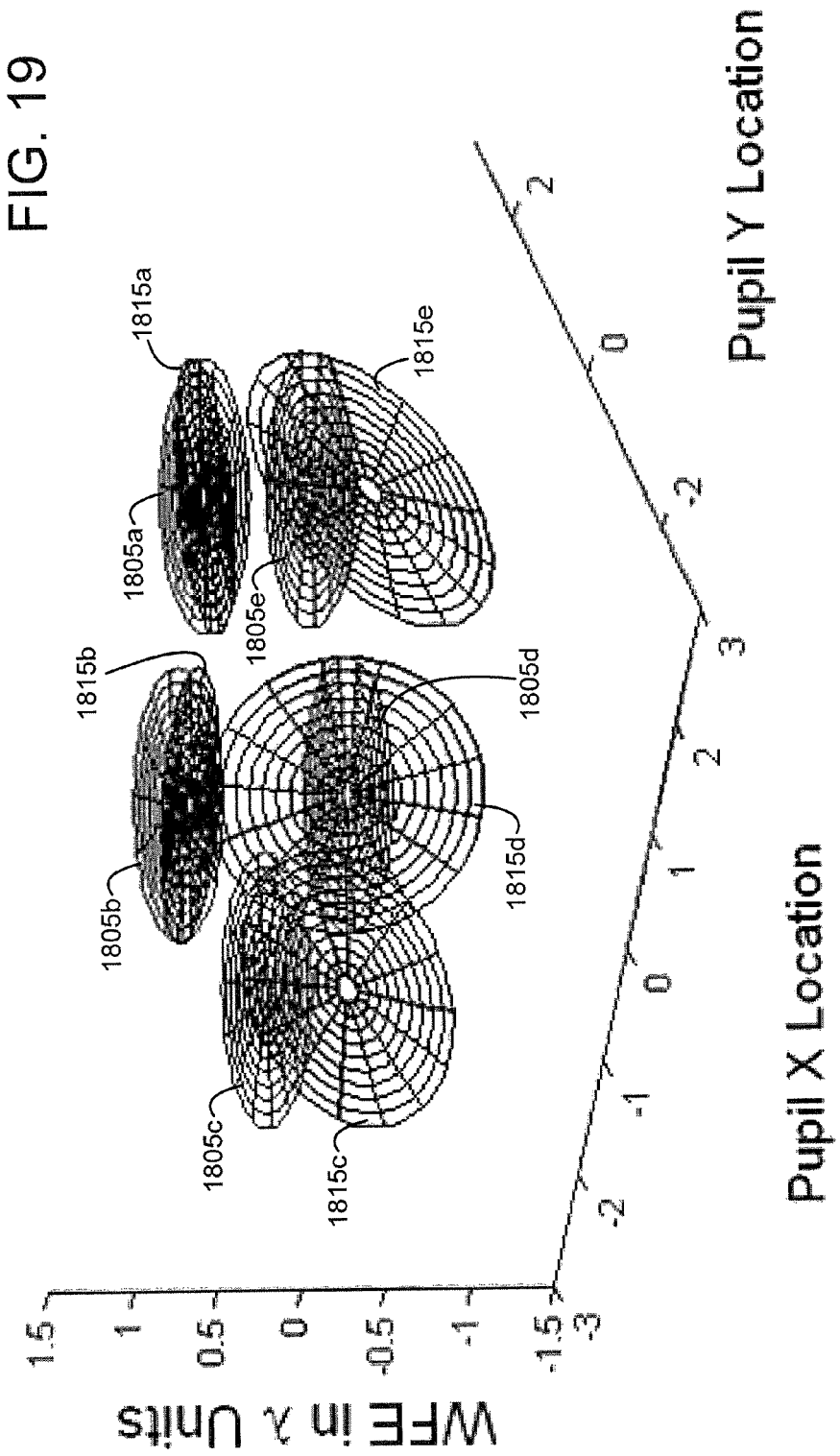

FIG. 18 depicts pupil planes 1805a-1805e for five segments overlaid by example WFEs 1810a-1810e. FIG. 19 depicts example WFEs 1815a-1815e, which correspond to WFEs 1810a-1810e of FIG. 18 with the tip, tilt, piston (TTP) components extracted. As discussed with reference to FIG. 17, FIG. 19 represents the distortion modes (e.g., the TTP WFE components) that change more frequently and more drastically for typical multi-segment telescopes.

Figure 20:
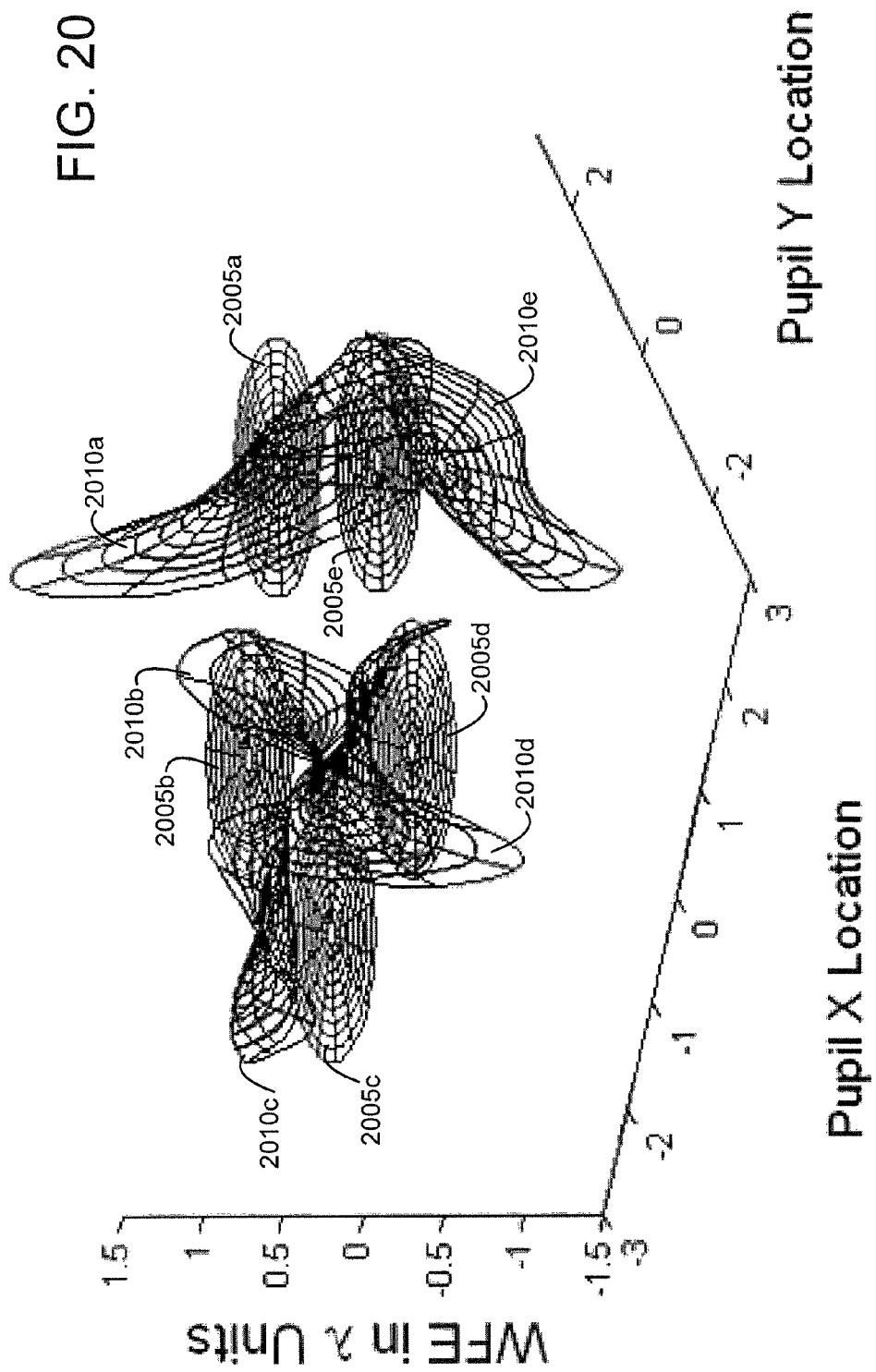
Figure 21:
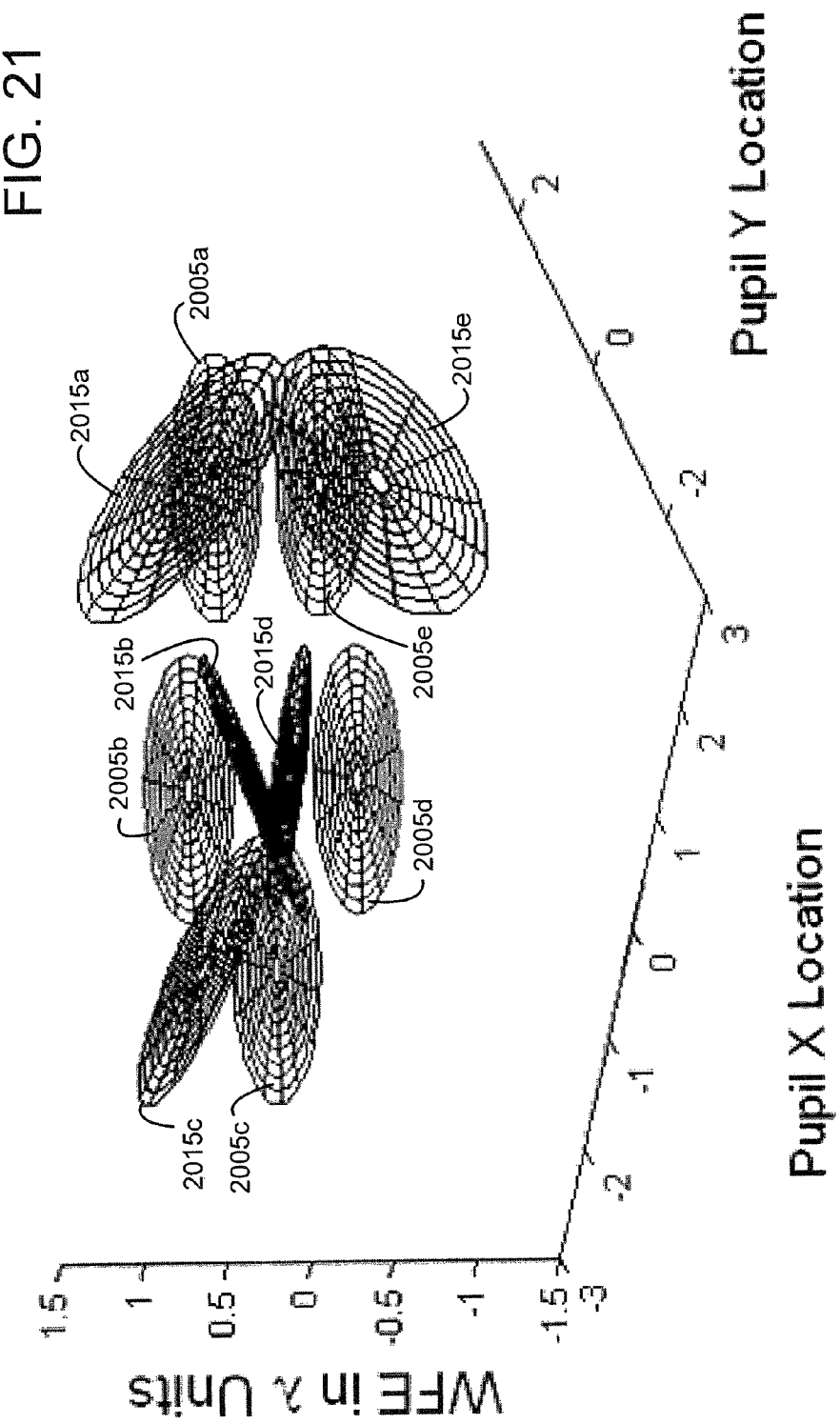
Figure 22:
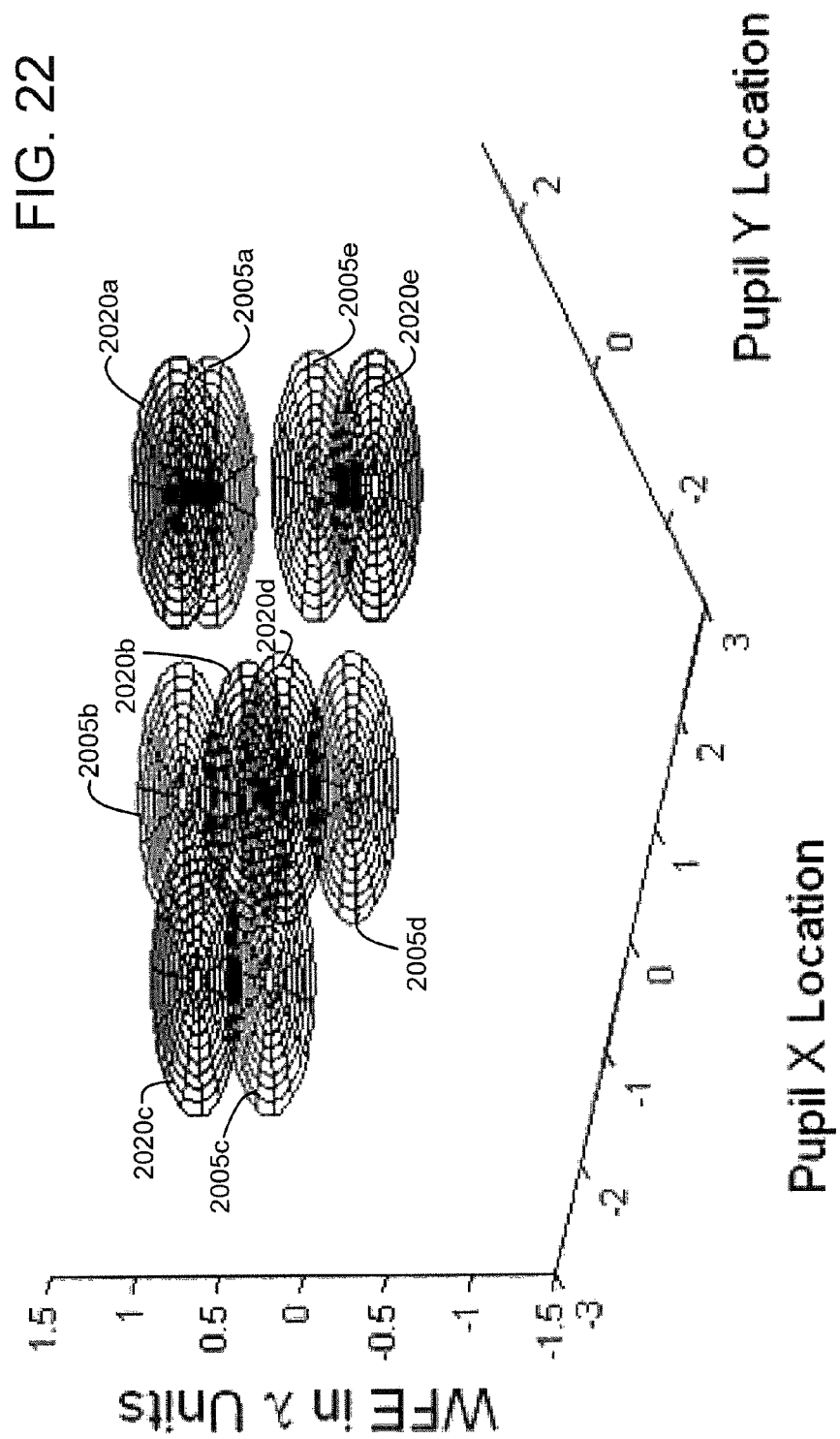
Figure 23:
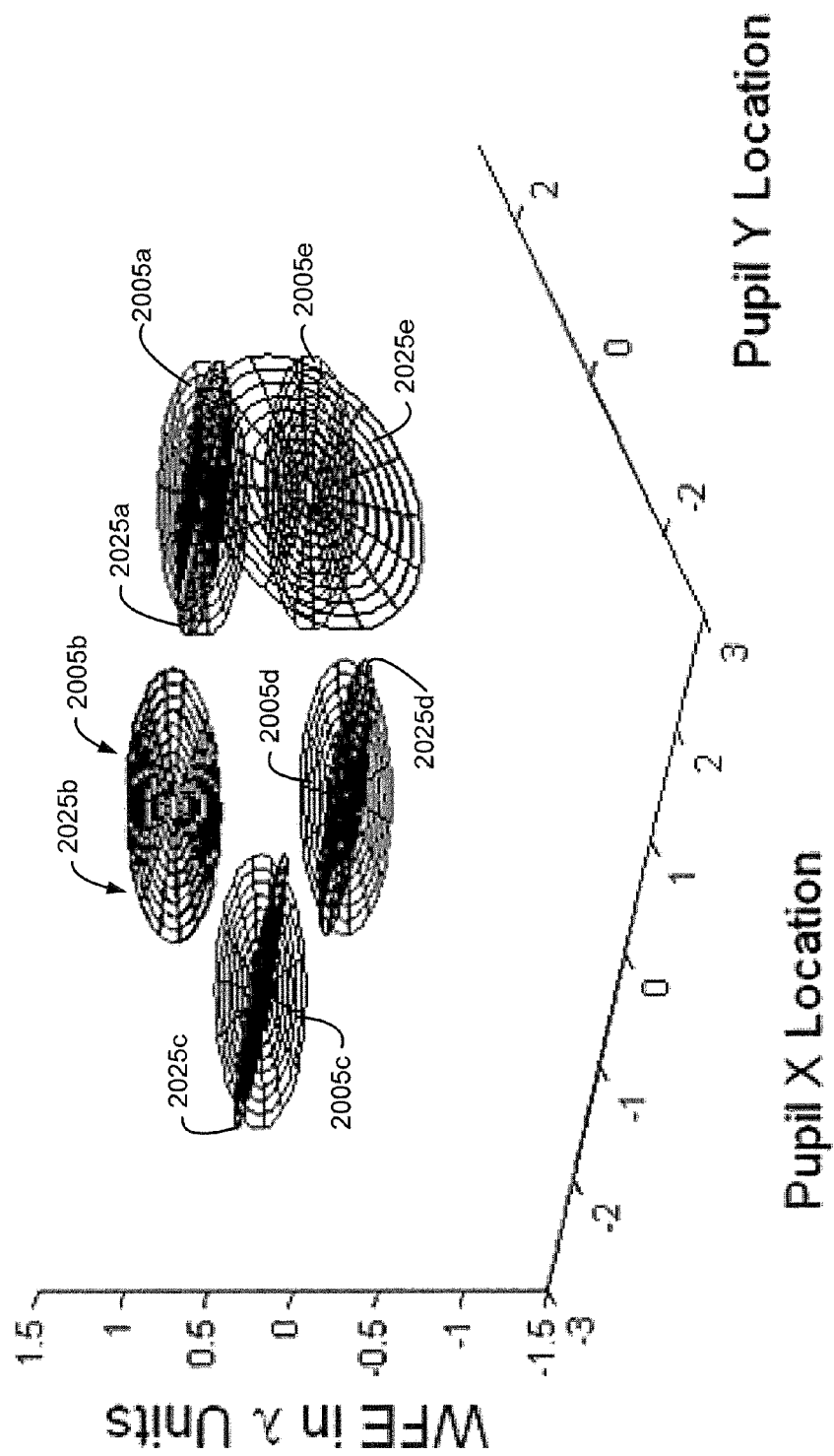
Figure 24:
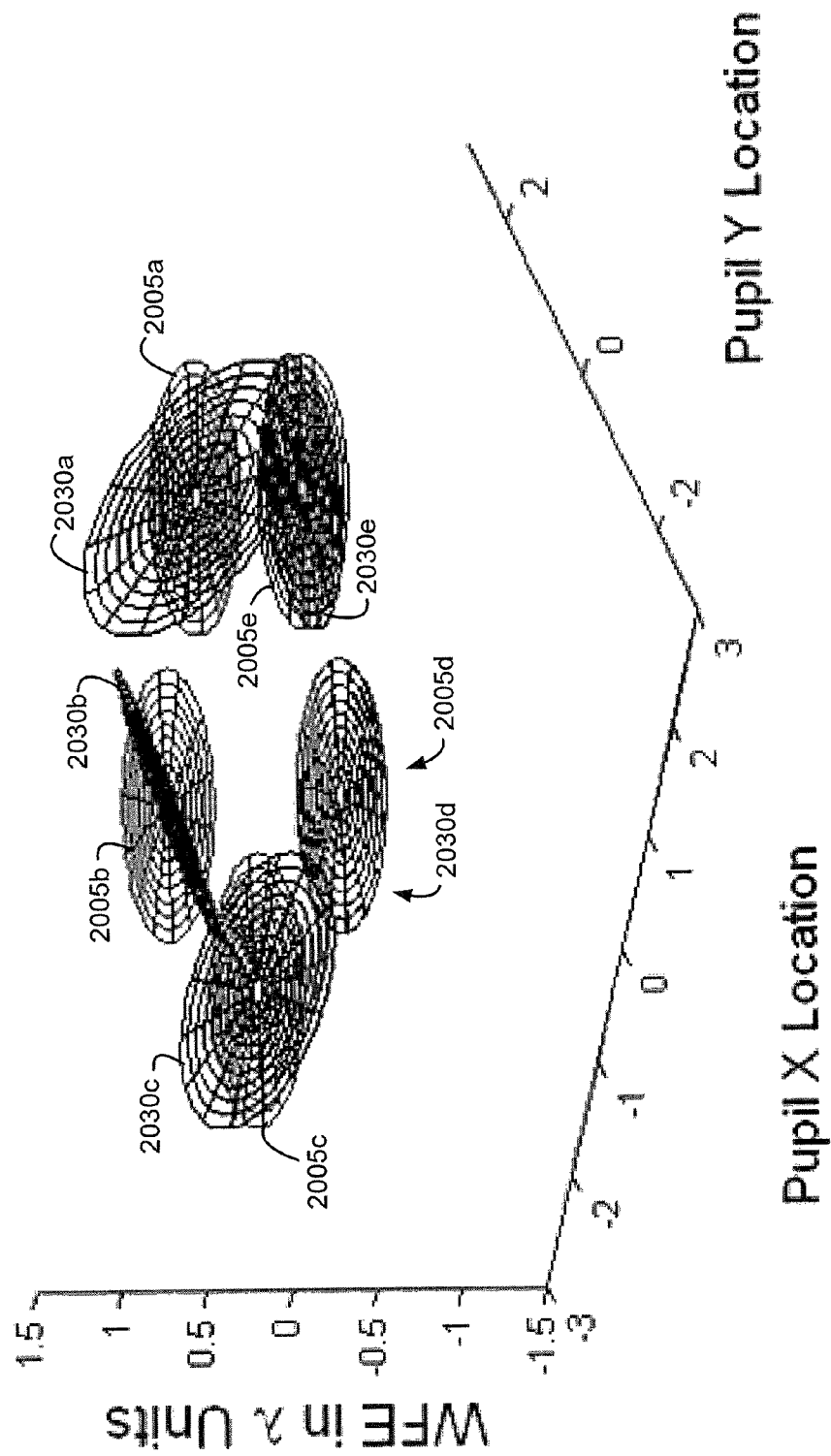

FIGS. 20-24 represent other example WFEs corresponding to a five segment telescope. In particular, FIG. 20 depicts pupil planes 2005a-2005e for the five segments overlaid by example WFEs 2010a-2010e. FIG. 21 depicts example WFEs 2015a-2015e, which correspond to WFEs 2010a-2010e of FIG. 20 with the tip, tilt, piston (TTP) components extracted. FIG. 22 depicts WFEs 2020a-2020e illustrating only the piston component of example WFEs 2015a-2015e. FIG. 23 depicts WFEs 2025a-2025e illustrating only the tip component of example WFEs 2015a-2015e. FIG. 24 depicts WFEs 2030a-2030e illustrating only the tilt component of example WFEs 2015a-2015e. Careful examination of FIGS. 22, 23, and 24 provides greater insight into the intuitive aspects of the piston, tip, and tilt components.

Figure 25:
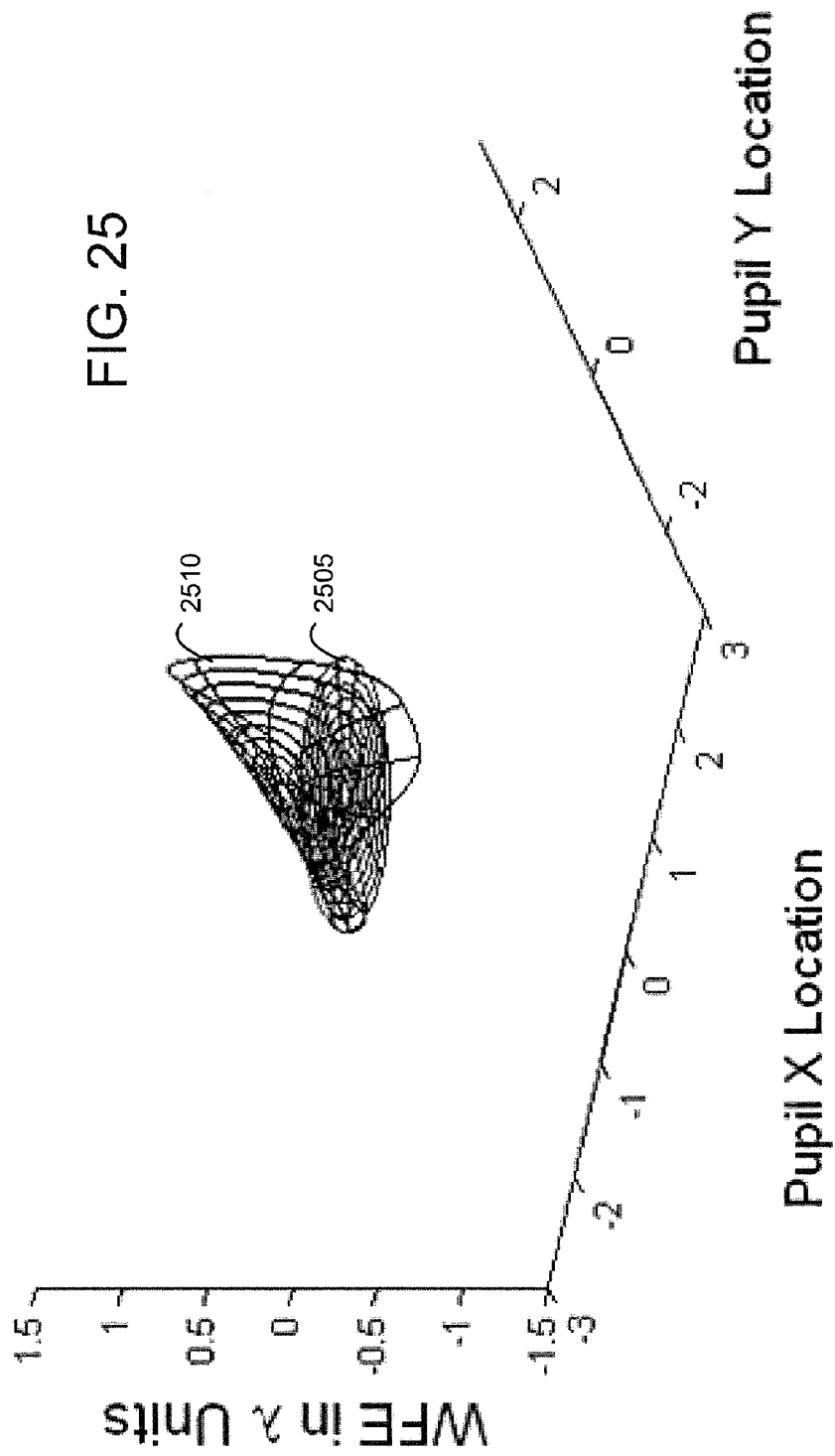
FIGS. 25-29 are graphs depicting another example of a WFE associated with just one pupil plane.
Figure 26:
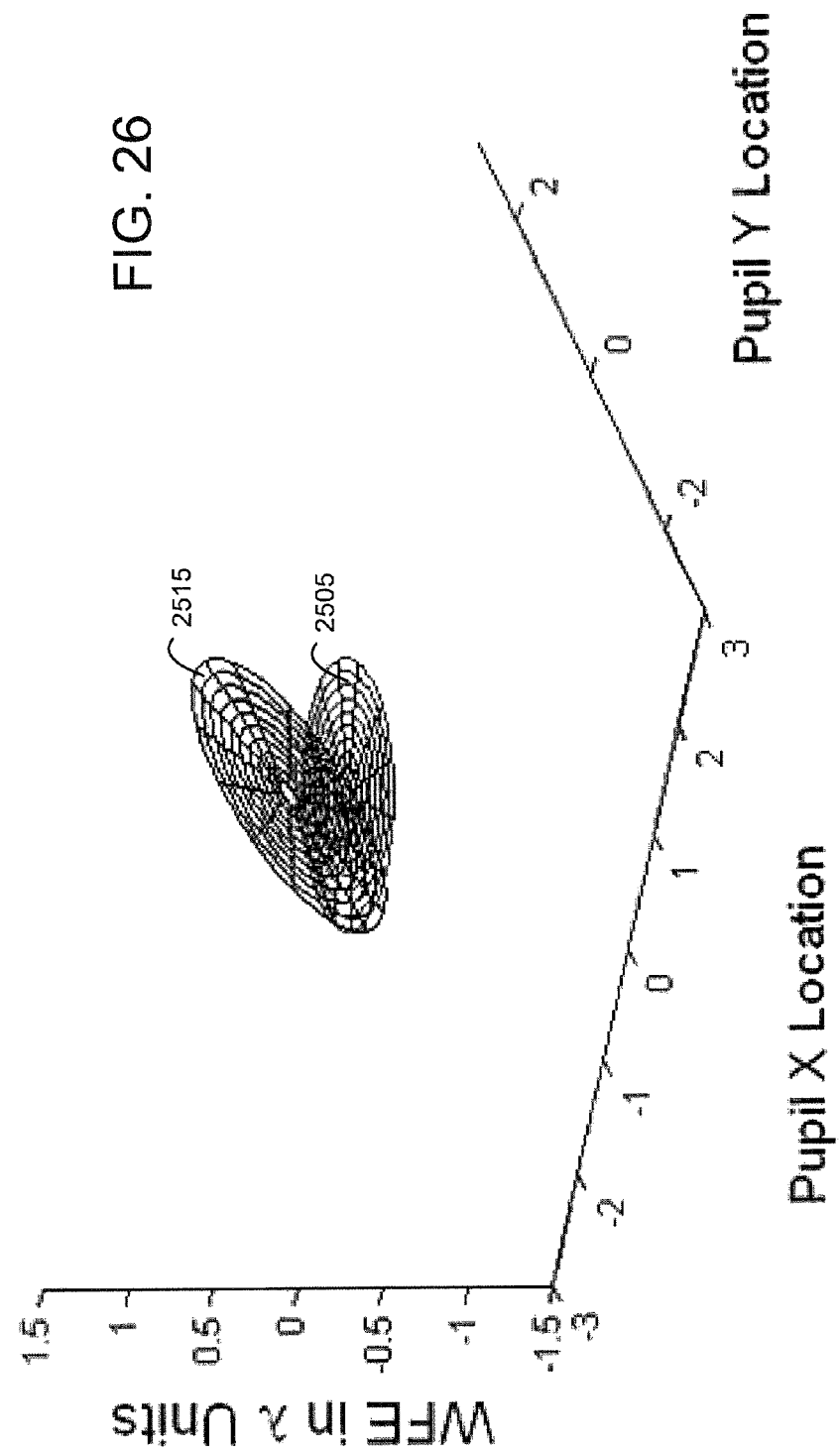
Figure 27:
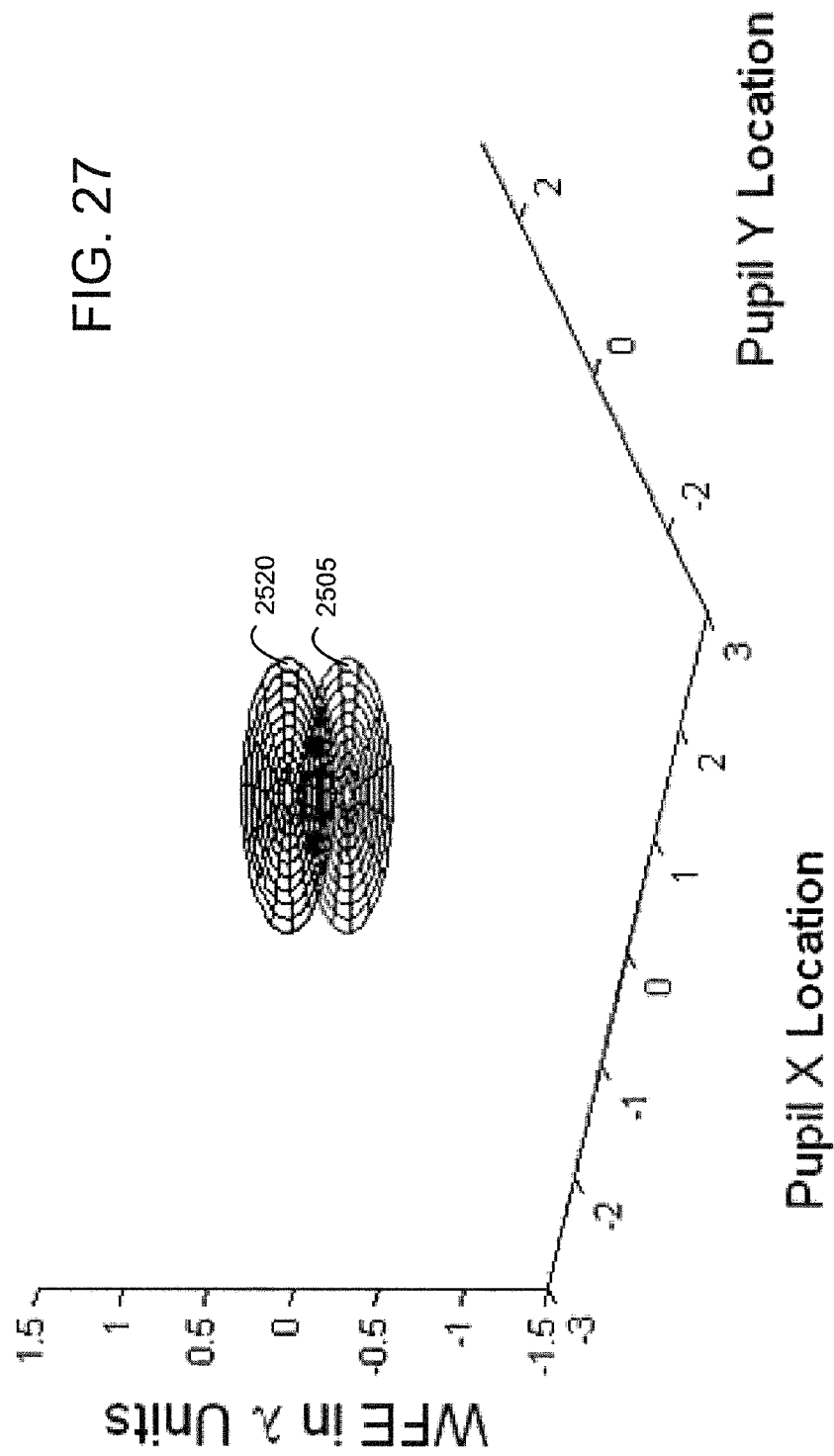
Figure 28:
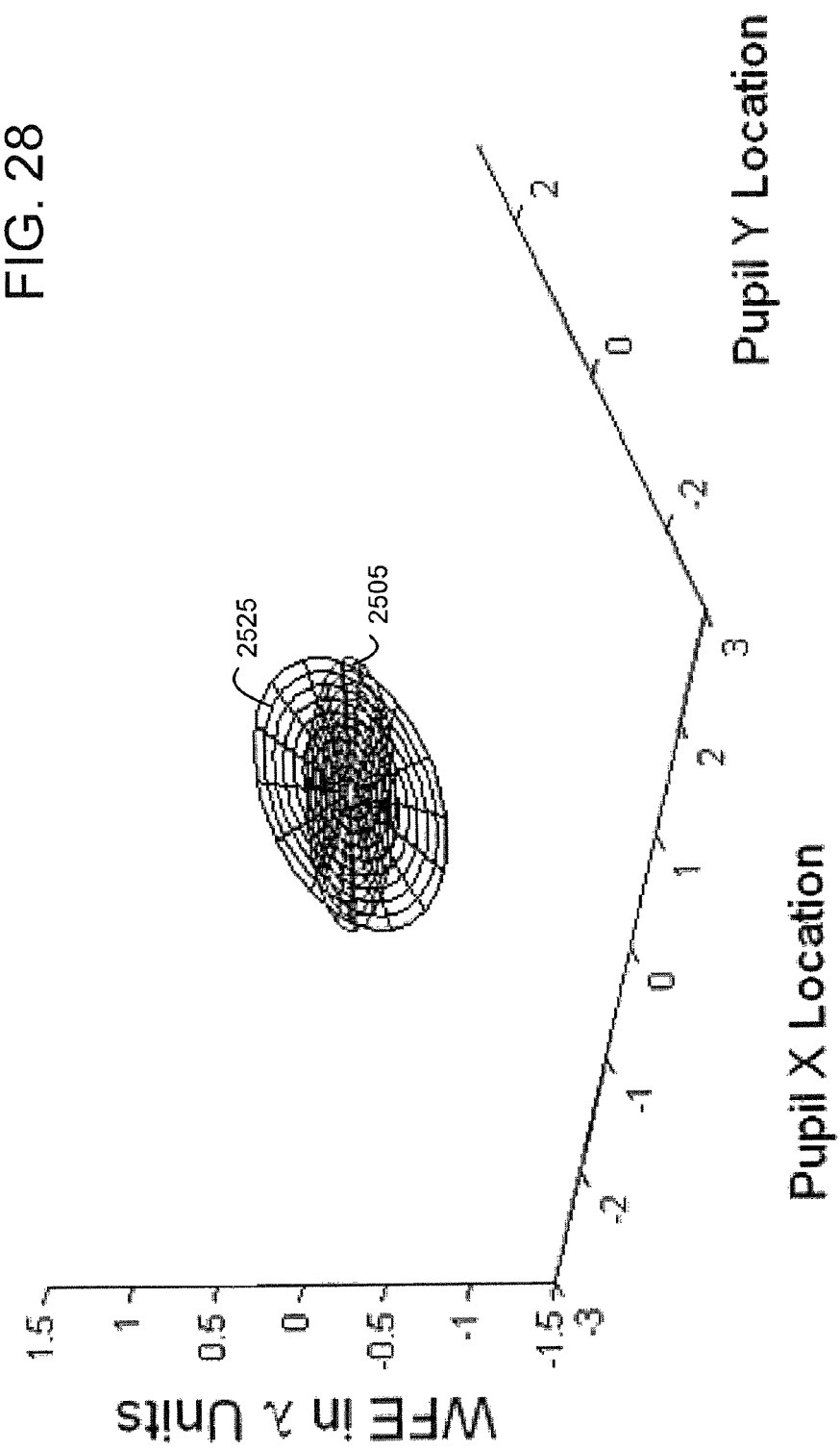
Figure 29:
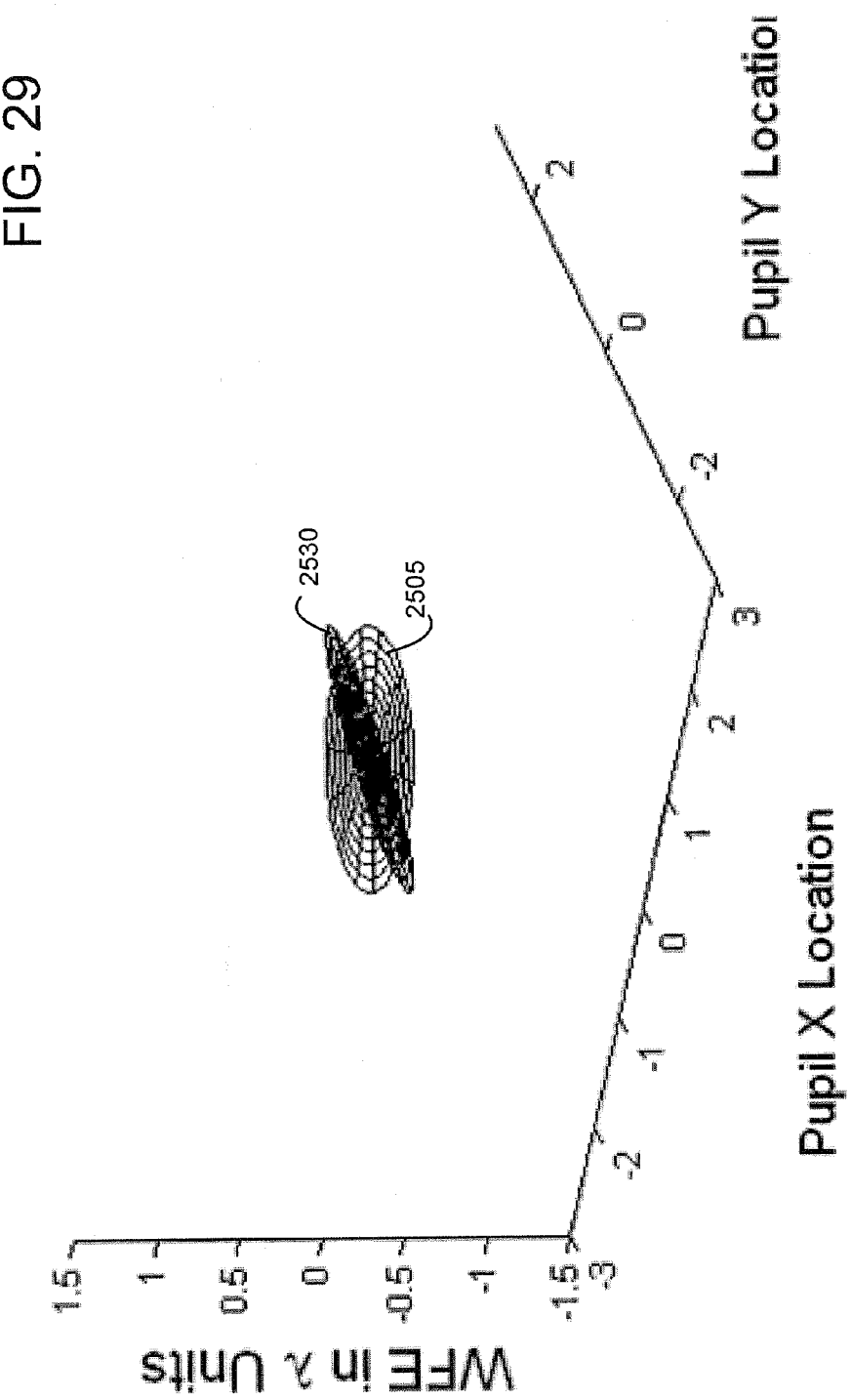

FIGS. 25-29 provide yet another set of example WFEs isolating one segment. In particular, FIG. 25 depicts a pupil plane 2505 corresponding to the segment overlaid by an example WFE 2510. FIG. 26 depicts example WFE 2515, which correspond to WFE 2510 of FIG. 25 with the tip, tilt, piston (TTP) components extracted. FIG. 27 depicts WFE 2520 illustrating only the piston component of example WFE 2515. FIG. 28 depicts WFE 2525 illustrating only the tip component of example WFE 2515. FIG. 29 depicts WFE 2530 illustrating only the tilt component of example WFE 2515. Taken together, FIGS. 25-29 illustrate how tip, tilt, and piston WFE components can be broken down and isolated, which allows the TTP WFE components to be eventually measured and eliminated (via reactive modulation increments).

Time Evolution of WFE Components

FIGS. 13-29 represent WFEs in a fixed moment in time (e.g., a veritable snapshot of the state of the WFE during a particular instant). As will be discussed in more detail below, measuring the time evolution of WFE and correcting for it through actuation of the mirror surfaces helps establish and maintain focus.

Figure 30:
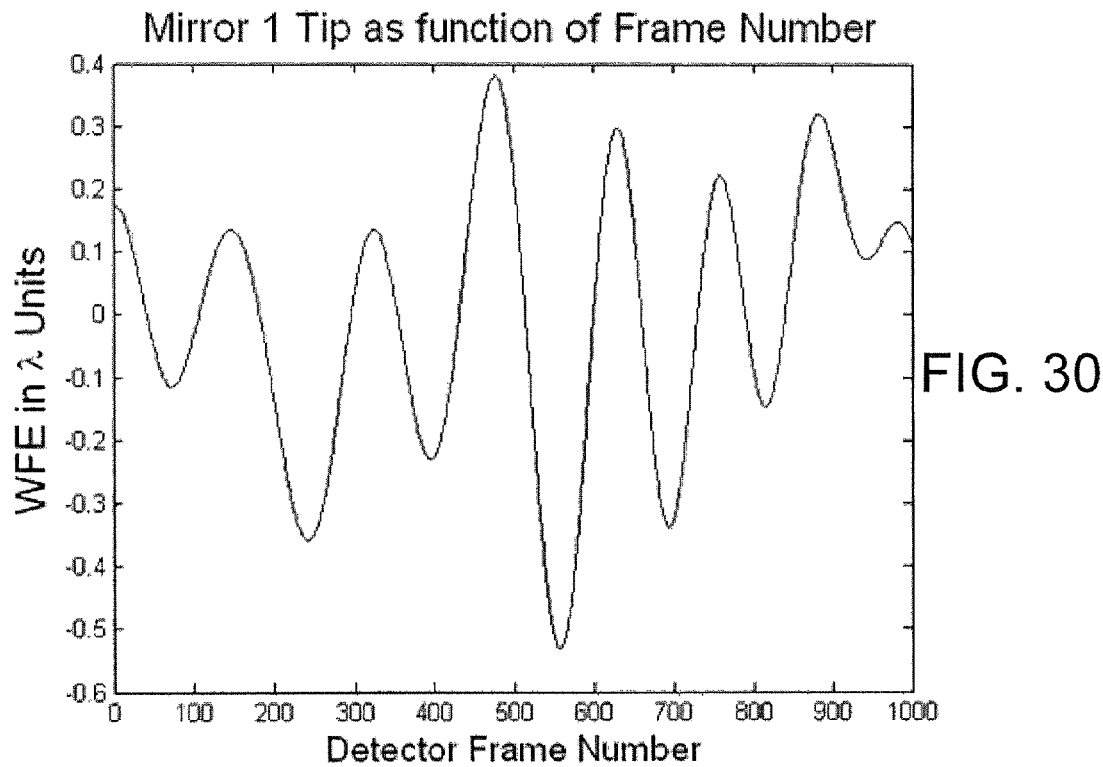
FIGS. 30-33 are graphs depicting examples of the time evolution of a tip component of a WFE associated with one pupil plane.
Figure 31:
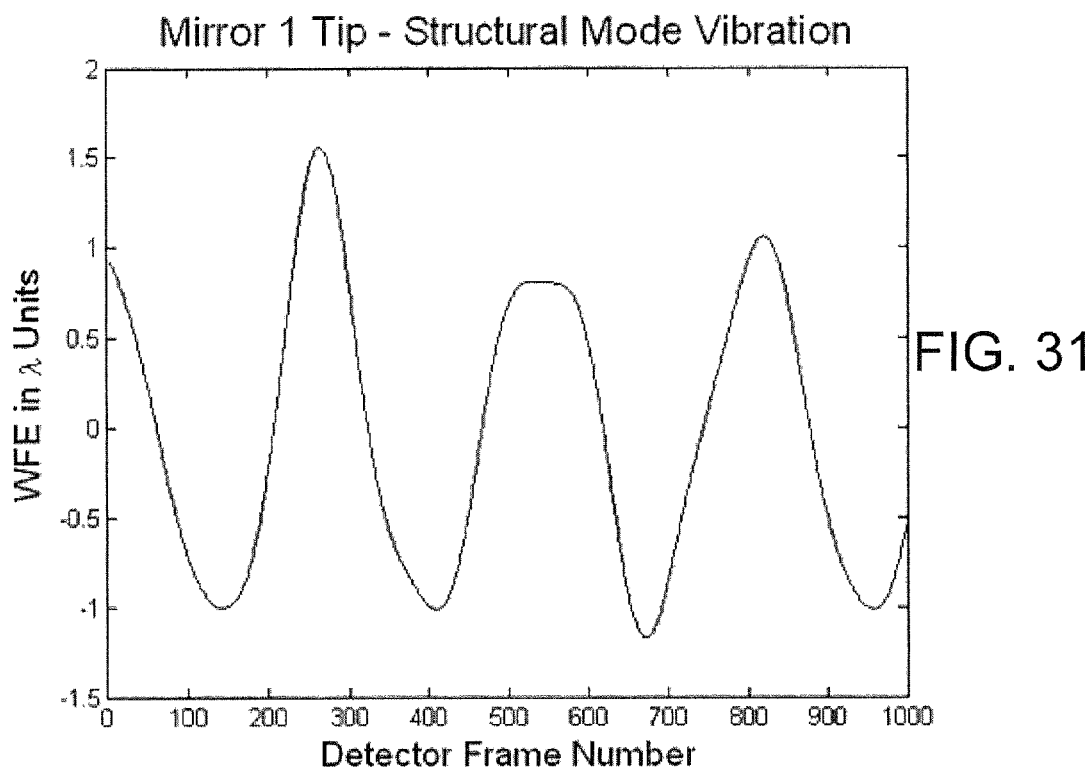

FIG. 30 depicts a simple example of the time evolution of one TTP component of one mirror (e.g., the tip WFE component of a mirror in segment one as a function of frame number). FIG. 31 is another example of the time evolution of the tip WFE component of a mirror in segment one, only this time the tip WFE component exhibits noticeable sinusoidal structure typical of a telescope vibrating with a low amplitude in some fundamental structural mode. The approach taken in this disclosure applies equally well to any innate time development of a TTP component, whether it is random-like as shown in FIG. 30 or more structured as shown in FIG. 31.

Figure 32:
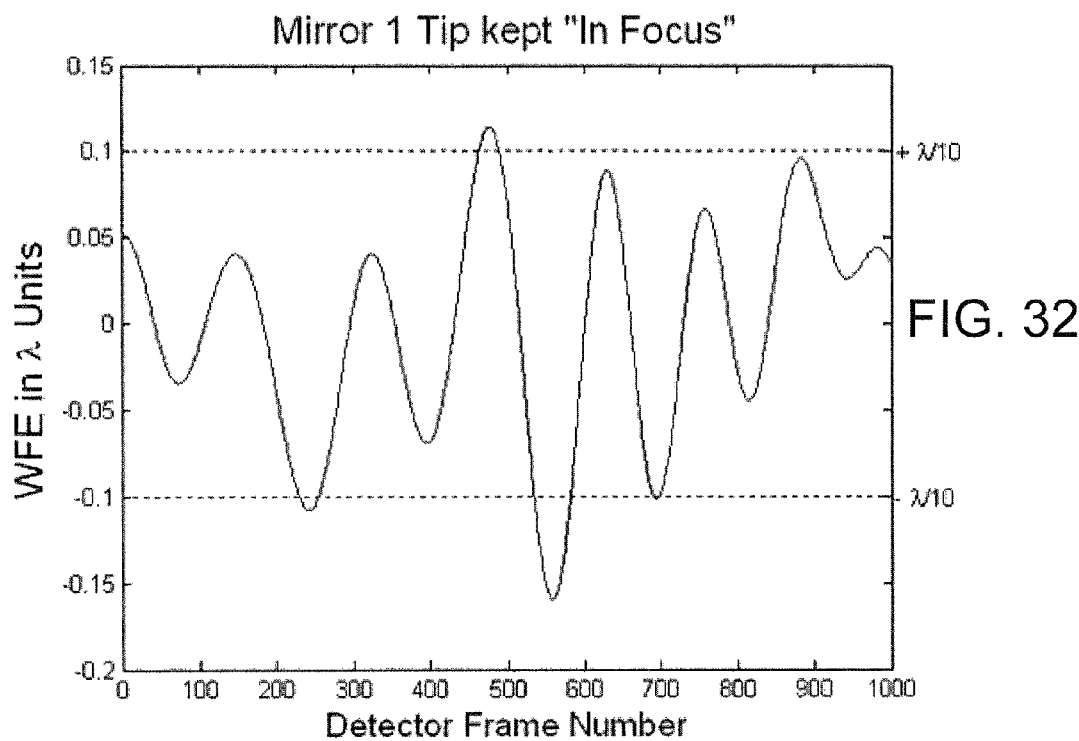

A simplified and somewhat arbitrarily defined sub-goal in maintaining the focus of a segmented-optic telescope is depicted in FIG. 32, where the ongoing levels of the tip-tilt-piston distortions introduced in FIG. 30 are generally kept to better than one-tenth wavelength. This assumes that the higher order modes (e.g., the curves in FIGS. 13 and 14) have also been reduced to below one-tenth wavelength levels. The eventual solution may be less stringent than this, and might be higher or lower than one-tenth wavelength.

Nominal Loop Preview

Figure 33:
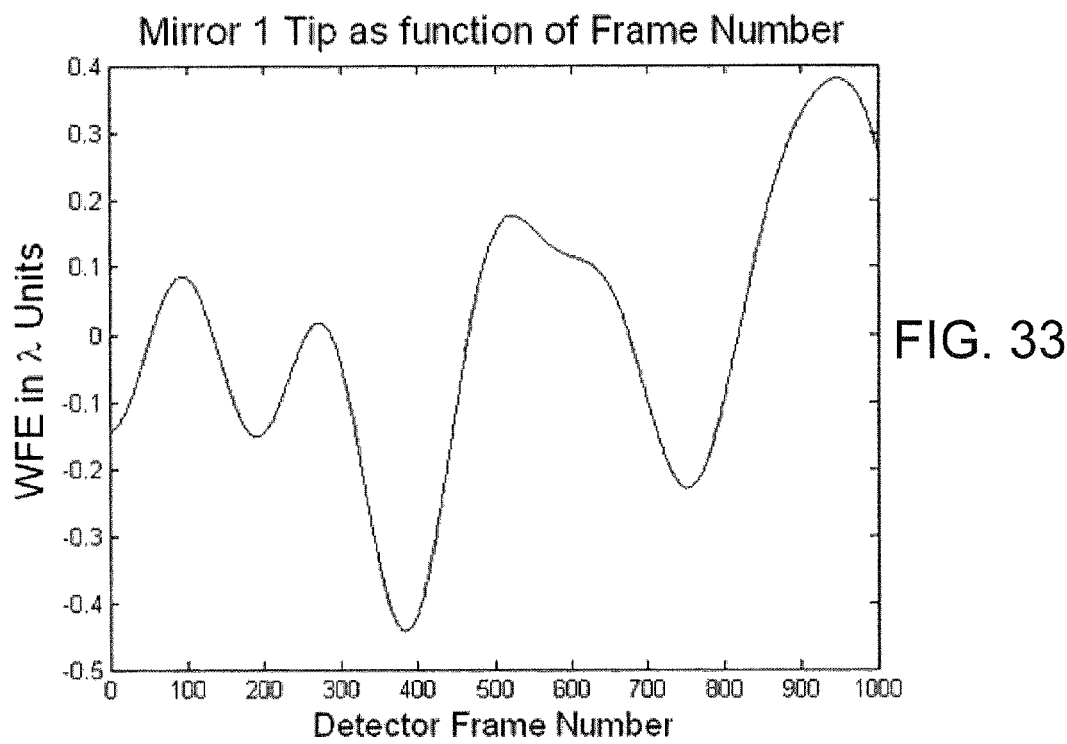

FIGS. 33-41 provide an initial overview (and rather oversimplified for summary purposes) of how focusing system 200 automatically maintains focus, according to one embodiment. Later parts of this disclosure explore this process in much greater detail, of course, but the general approach depicted in this sequence of figures is that the de facto unknown WFE component represented in FIG. 33 (i.e., the tip WFE component of a mirror in segment one) needs to be "roughly" measured to arrive at a sequence of actuation pulses that keep the component in focus. As shown in FIG. 33, portions of the tip WFE component drifts out of the one-tenth wavelength range.

Figure 34:
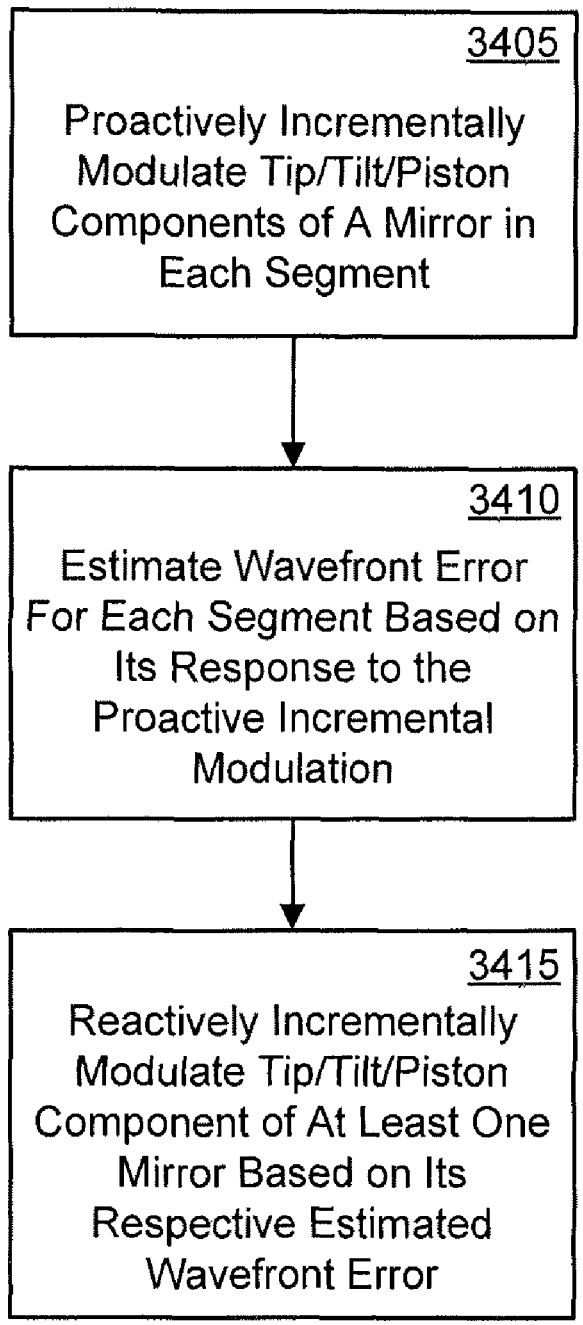
FIG. 34 is a high-level flowchart illustrating a method for maintaining focus of a segmented optic system, according to one embodiment.

FIG. 34 is a high-level flowchart illustrating a method 3400 for maintaining focus of a segmented optic system, according to one embodiment. At step 3405, method 3400 proactively (i.e., intentionally by a known amount) incrementally modulates TTP components (e.g., a tip component, a tilt component, a piston component, or a combination thereof) of a mirror in each segment. For example, with reference to FIGS. 6 and 7, TTP components of any of the mirrors (e.g., primary mirror 28, secondary mirror 44, tertiary mirror 52, quaternary mirror 60, or a combination thereof) in each of the twenty-three segments may be proactively incrementally modulated so that a system response to the modulation increments can be measured.

At step 3410, method 3400 estimates TTP WFE components for each segment based on the response of the segment to the proactive modulation increments. Various techniques for measuring or estimating the TTP WFE components will be described in more detail below. The beneficial result of step 3410 is that TTP WFE components for each segment can be measured or estimated so that the WFE can be reduced. At step 3415, method 3400 reactively incrementally modulates TTP components of at least one mirror in at least one segment based on the estimated WFE for the respective segment. For example, if a tip WFE component for the segment shown in FIG. 6 is estimated to be outside of the one-tenth wavelength range, method 3400 may reactively incrementally modulate a tip component of secondary mirror 44.

Figure 35:
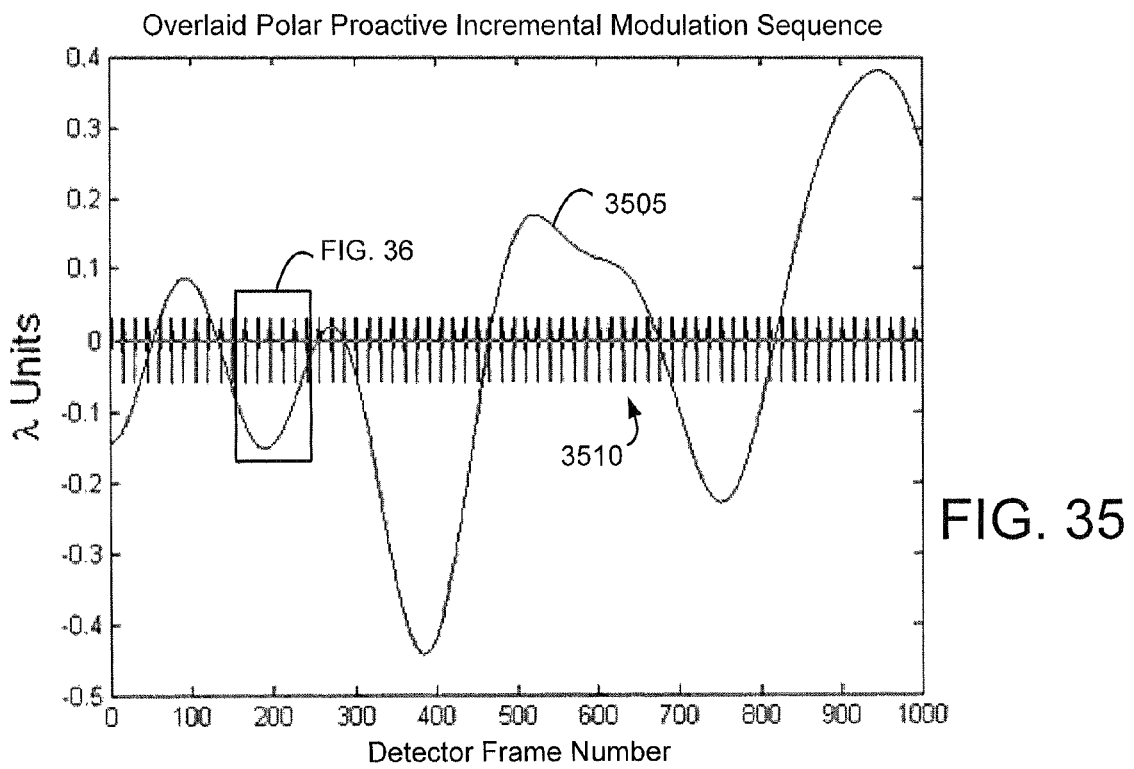
FIGS. 35 and 36 are graphs depicting the pre-actuated time evolution of the tip component shown in FIG. 33 along with proactive incremental modulation associated with the method of FIG. 34.

FIG. 35 is a graph illustrating the time evolution of the tip WFE component 3505 of a mirror in segment one as a function of frame number. FIG. 35 also illustrates a sequence of polar proactive modulation increments 3510 that are being applied to actuators 260 of the tip component of mirror one. While FIG. 35 illustrates proactive incremental modulation 3510 for the tip component of only one mirror, proactive tilt and piston incremental modulation is also applied to the mirror and to mirrors in the other segments. Actively actuating the TTP components allows measurement of a system response that allows an instantaneous value of the TTP components to be better determined. The proactive modulation increments 3510 represent actuation values sent to the physical positioning hardware (e.g., actuators 260) controlling the tip mode of the mirror.

Figure 36:
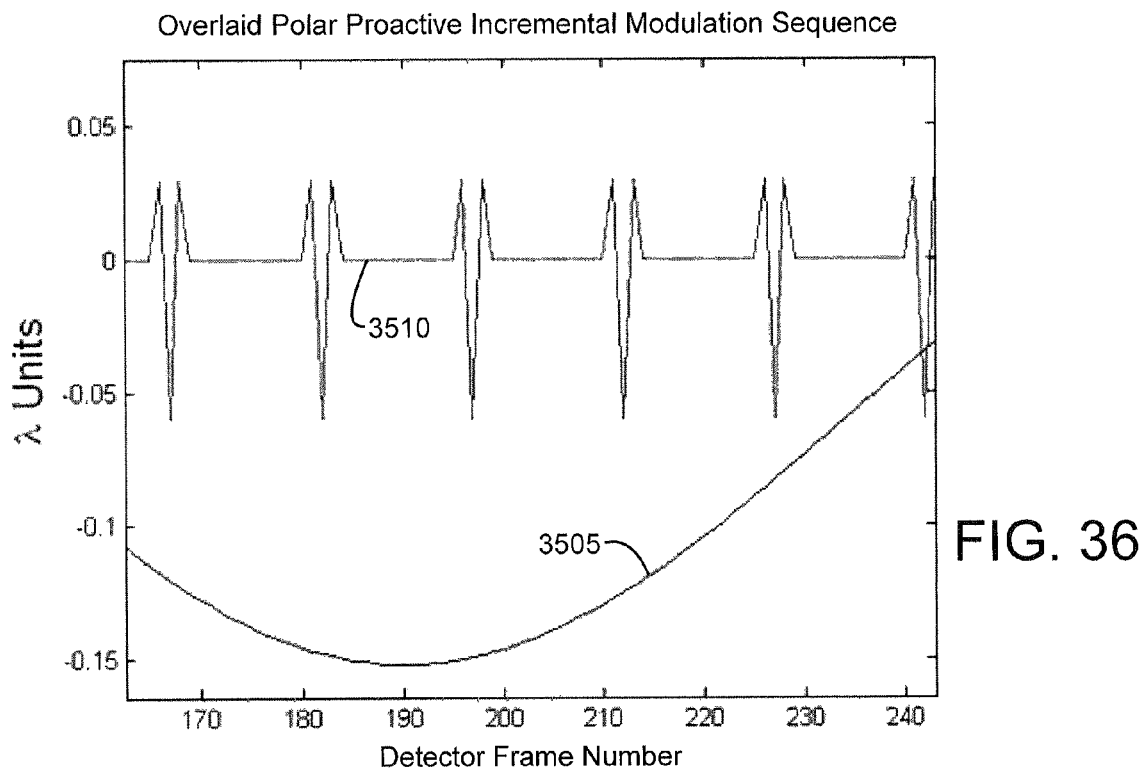

FIG. 36 zooms in on a portion of FIG. 35 to give a better view of the polar proactive modulation increments 3510 over many frames. In words, the tip mode is first incrementally modulated up by 0.03 wavelength over one frame, down by 0.09 wavelength over the next frame, then incrementally modulated up again by 0.09 wavelength over the next frame, and then incrementally modulated down again by 0.03 wavelength to bring the tip component back to where it started before incremental modulation, apart from any mechanical jitter in the structural system and errors in the actuation system. This up-one, down-two, up-one sequence is just one of very many choices available to implement method 3400. While a preferred embodiment incrementally modulates TTP components in some known fashion, natural jitters inherent in the structural vibrations may be used to perform the same function as proactive incremental modulation. Thus, while proactive incremental modulation may work well for some segmented optic designs, it may not be the best for all segmented optic designs.

Figure 37:
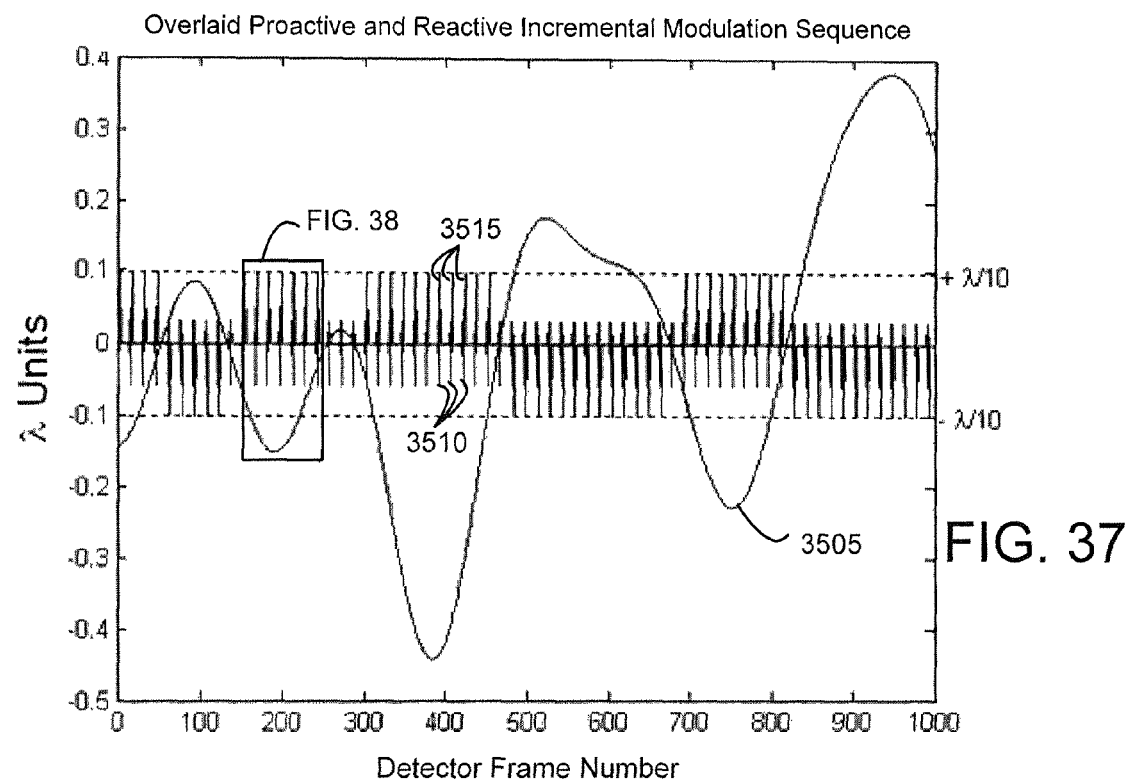
FIGS. 37 and 38 are graphs depicting reactive modulation increments generated by the method of FIG. 34 in response to the proactive modulation increments shown in FIGS. 35 and 36.

FIG. 37 introduces a simplified version of what is variously referred to as "reactive actuations," "corrective actuations," "response incremental modulation," and the like. As shown in FIG. 37, reactive modulation increments 3515 are generally of opposite polarity to the innate swings of tip WFE component 3505. To summarize, proactive modulation increments 3510 have led toward a measurement of tip WFE component 3505 and provided a sense of its drifts and swings so that reactive incremental modulation pulses 3515 can be applied to mirror actuators 260 to converge the WFE swings into the one-tenth wavelength range.

Figure 38:
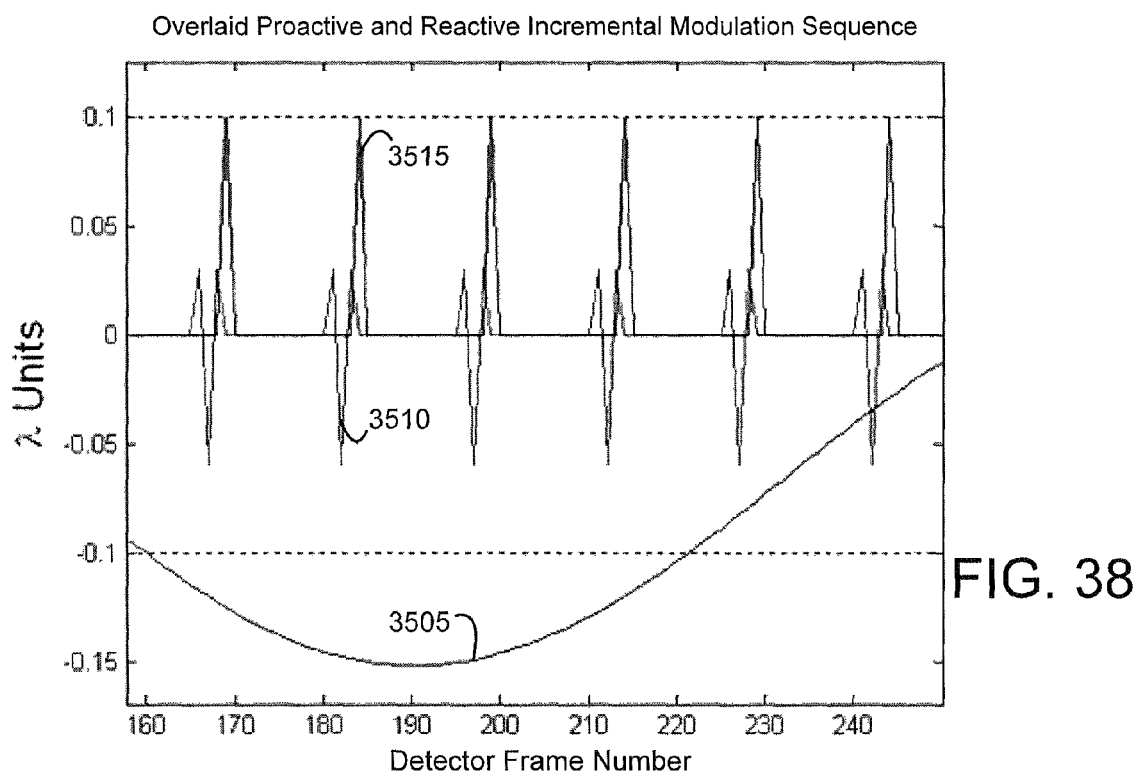

FIG. 38 zooms in on roughly the same segment as FIG. 36 so that the various signals involved can be more clearly discerned. As shown in FIG. 38, tip WFE component 3505 is traveling outside the one-tenth wavelength range near the bottom of the graph. Proactive modulation increments 3510 proceed in an attempt to provide useful measurements of WFE so that focusing system 200 recognizes that the WFE component is drifting out of range and can apply reactive modulation increments 3515 to counteract the drift.

Figure 39:
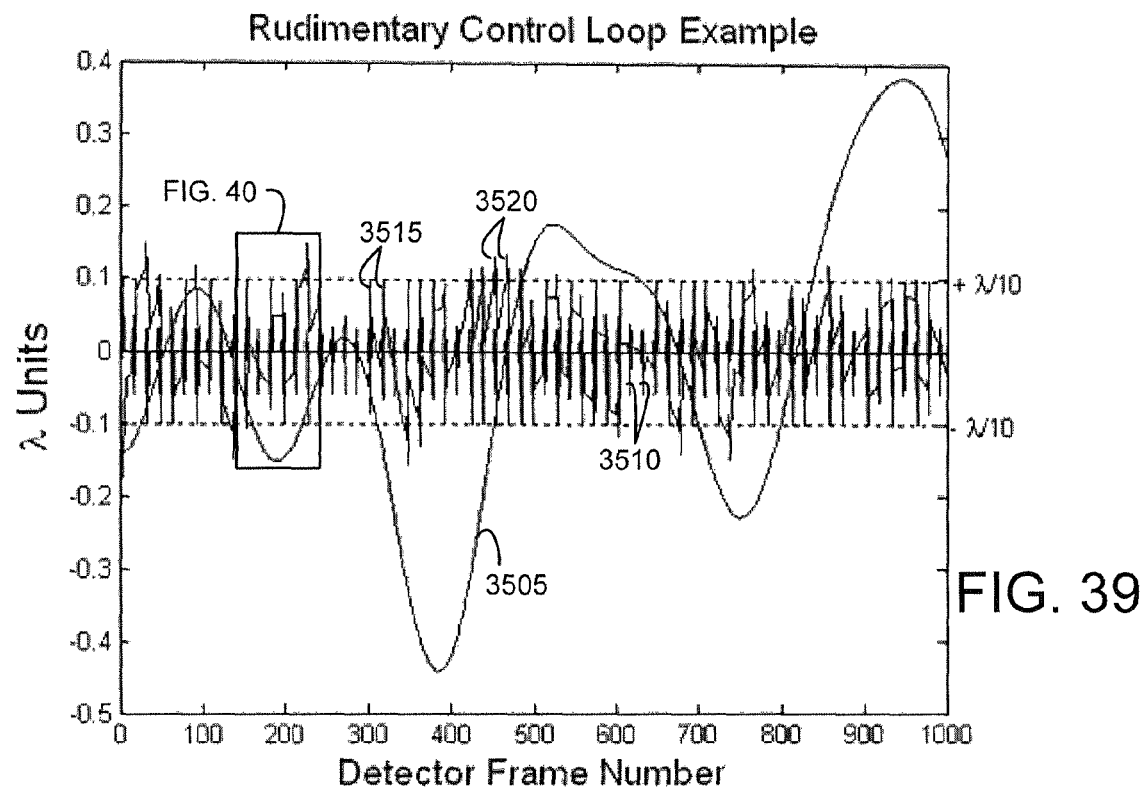
FIGS. 39 and 40 are graphs depicting a post-actuated time evolution of the tip component of FIGS. 35-38 generated by the method of FIG. 34 in response to the reactive modulation increments shown in FIGS. 37 and 38.

FIG. 39 builds on top of FIG. 37 and shows an example of a resultant post-actuated TTP component time-sequence 3520 (e.g., the post-actuated tip WFE component), showing the effects of reactive modulation increments 3515 attempting to keep that TTP component in focus.

Figure 40:
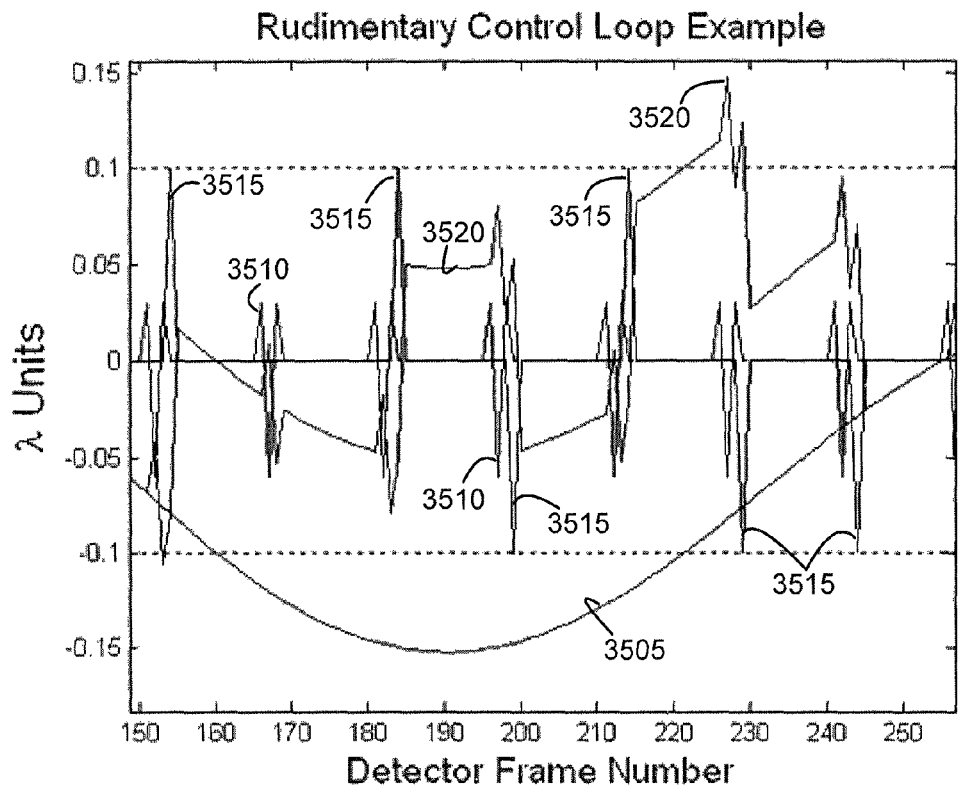

FIG. 40 zooms in on roughly the same region as FIGS. 36 and 38. As shown in FIG. 40, reactive modulation increments 3515 are actively moving post-actuated tip WFE component 3520 in an attempt to keep it roughly in the one-tenth wavelength range. FIG. 40 is a strictly logical figure. An actual focusing system 200 would not have such sharp transitions.

Figure 41:
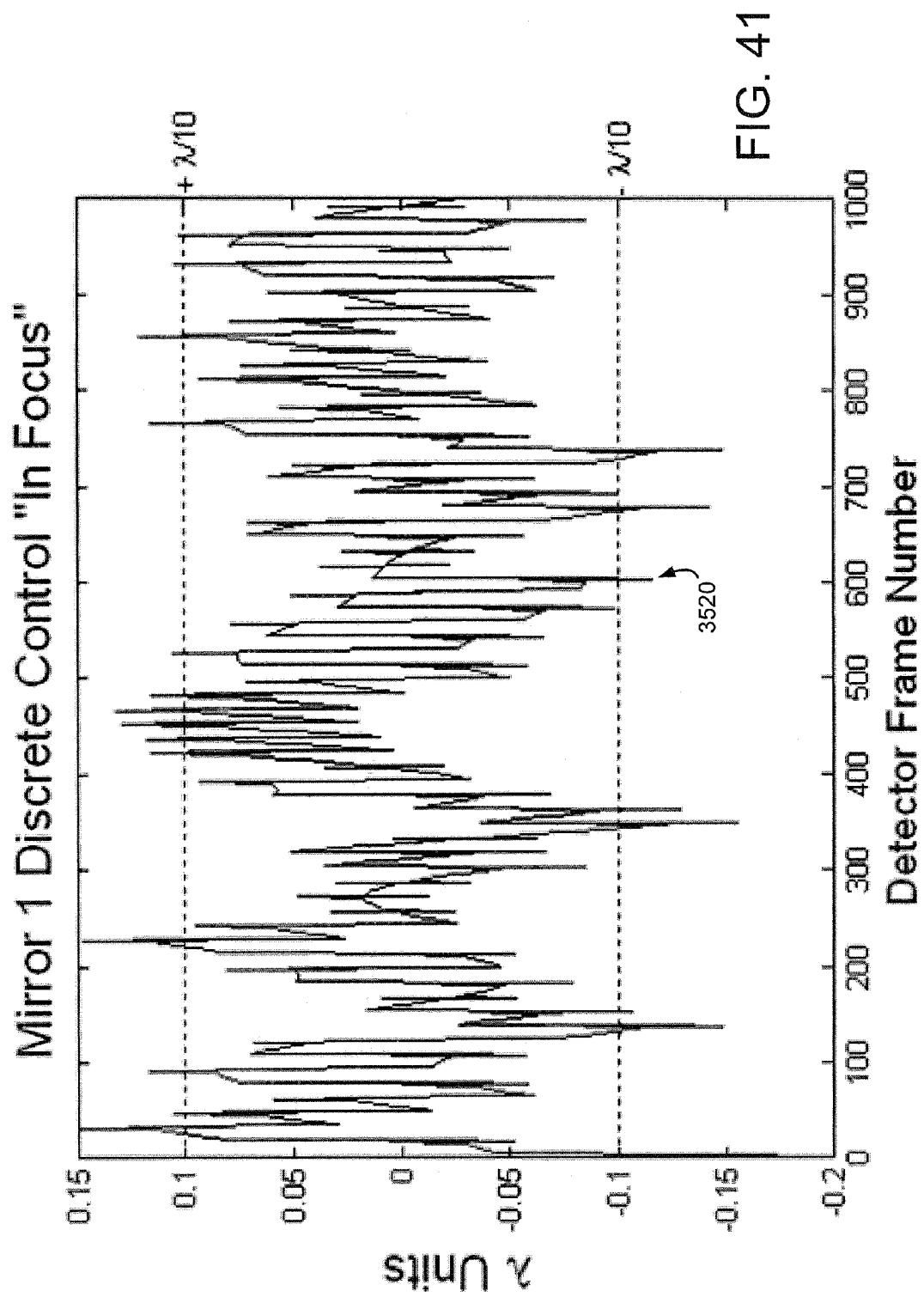
FIG. 41 is a graph depicting an example of a post-actuated time evolution of a tip component in response to proactive and reactive modulation increments generated by the method of FIG. 34.

FIG. 41 isolates post-actuated tip WFE component 3520 after proactive modulation increments 3510 and reactive modulation increments 3515 have been applied. Again, this is an idealized logical diagram as opposed to a picture of how a large vibrating and noisy segmented optic telescope would actually behave. Nevertheless, the control-system regimen is well represented.

TTP-Ensemble-State Diagrams

Figure 42:
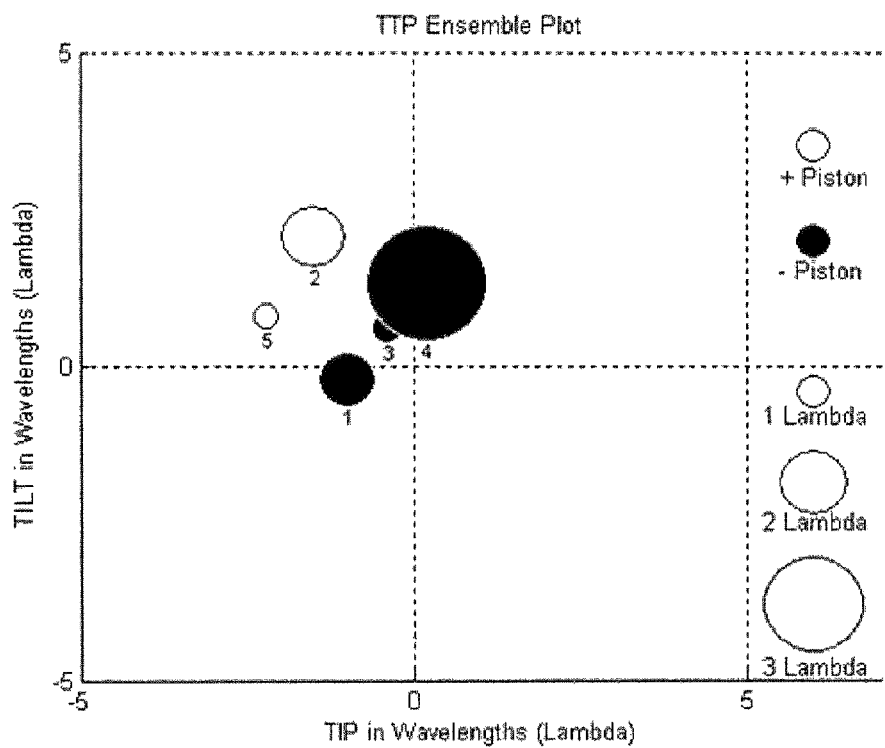
FIG. 42 is an example state diagram depicting tip, tilt, and piston components of a WFE associated with each pupil plane of a five-mirror pupil plane.

FIG. 42 introduces a more compact graphic depiction of TTP ensembles than the earlier "intuitive" graphics utilized in FIGS. 12-29. FIG. 42 illustrates TTP ensembles for a five-primary-mirror segmented optic telescope, with each mirror separately depicted. The tip and tilt WFE components of each mirror define its respective x and y position on the ensemble plot. The piston component of each mirror defines its respective diameter on the ensemble plot, and a filled-in circle versus an open circle defines whether the piston component is negative or positive, respectively. The plots depicting an instantaneous TTP ensemble of a telescope will be used in the later discussions on focus control loop methods.

Figure 43:
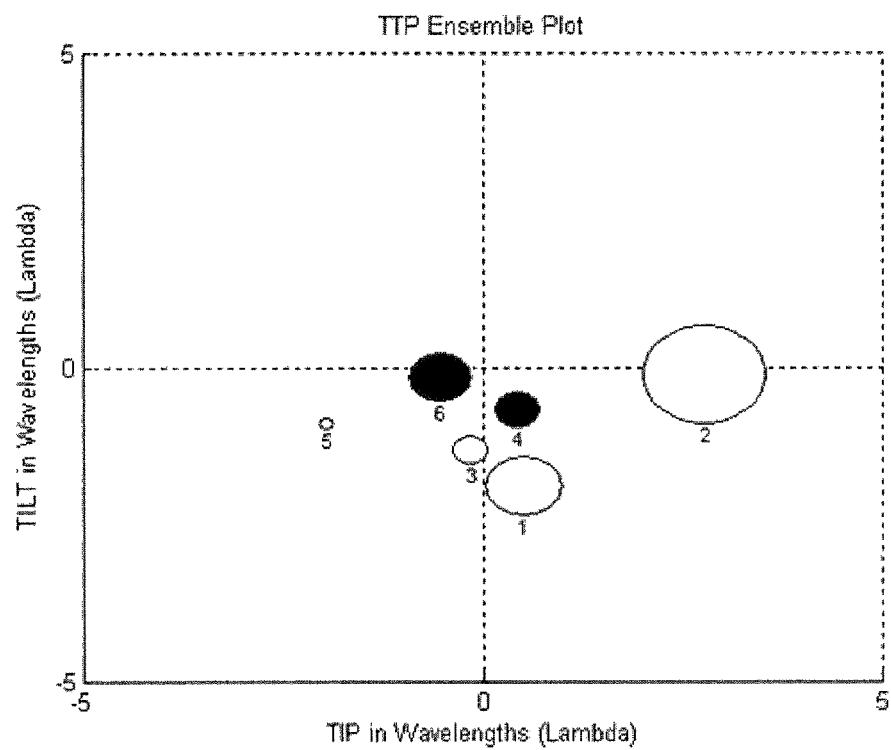
FIG. 43 is an example state diagram depicting tip, tilt, and piston components of a WFE associated with each pupil plane of a six-mirror pupil plane.

FIG. 43 illustrates a TTP ensemble state diagram for a six-primary-mirror segmented optic telescope, without showing the legend on the right-hand side. Thus, FIG. 43 illustrates various instants of tip-tilt-piston states for each of the six mirrors. The enumeration of the mirrors proceeds around the circle of primary mirrors, and hence mirror 1 is opposite to and symmetric with mirror 4, mirror 2 is opposite to and symmetric with mirror 5, and mirror 3 is opposite to and symmetric with mirror 6. For the purposes of keeping segmented optic telescopes in focus, it will be seen that this symmetry is a good thing because it reduces by nearly one-half the effective number of TTP modes that need to be incrementally modulated, measured, and actuated. For example, phasor-spin is identical for symmetric TTP modes of even-numbered mirror, symmetric telescopes. Asymmetric modes of segmented optic telescopes are vastly more important than symmetric modes, relative to the ultimate metric of image data detail and high-frequency fidelity.

Figure 44:
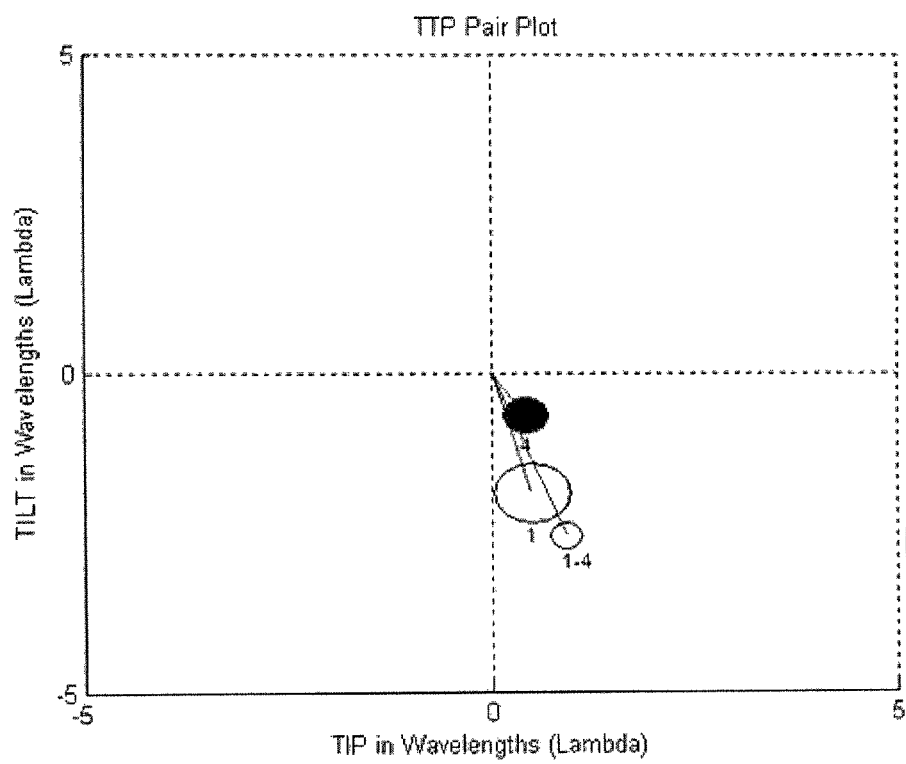
FIGS. 44-47 are example composite state diagrams depicting tip, tilt, and piston components associated with the symmetric pupil plane pairs of FIG. 43.
Figure 45:
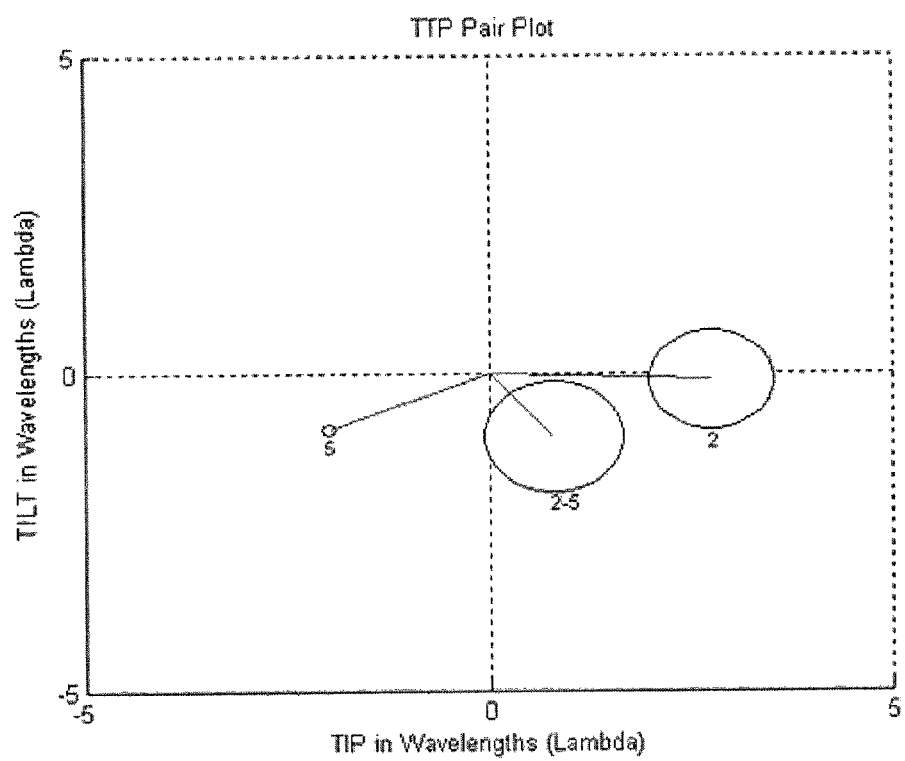
Figure 46:
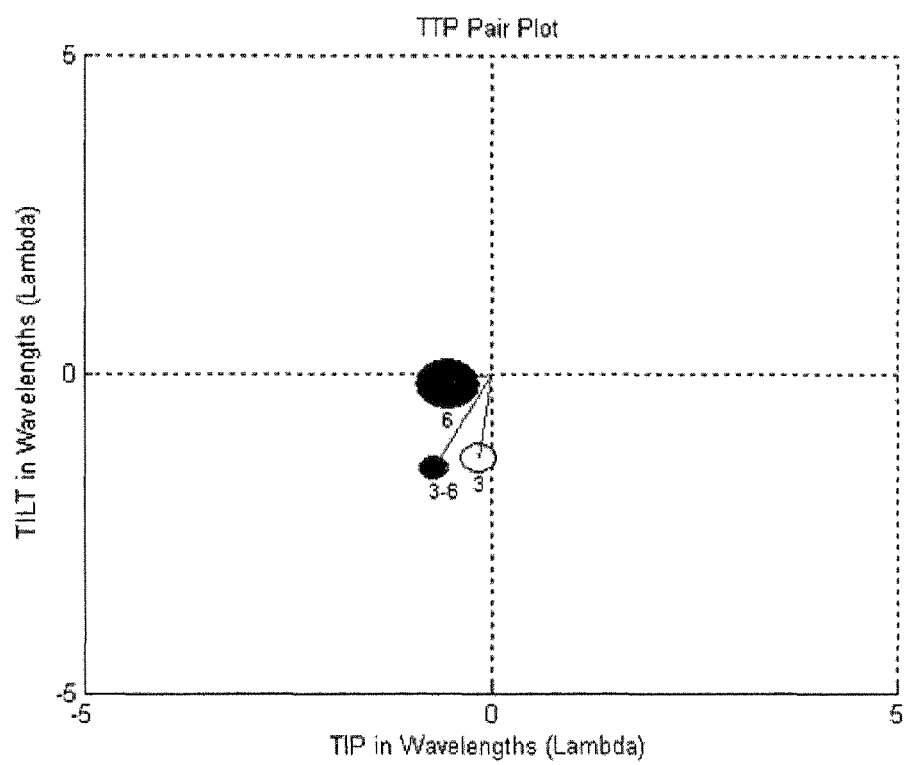

FIGS. 44-46 isolate the three symmetric pairs discussed with reference to FIG. 43. FIGS. 44-46 also depict a composite asymmetric component of the mirror-pairs (e.g., the additional circle labeled with both underlying mirror-pair numbers). The composite asymmetric component is derived by combining the TTP WFE components of each of the mirrors in the pair. According to one embodiment, the control loop concentrates on the composite asymmetric component of the mirror-pairs to keep the overall telescope in focus.

Figure 47:
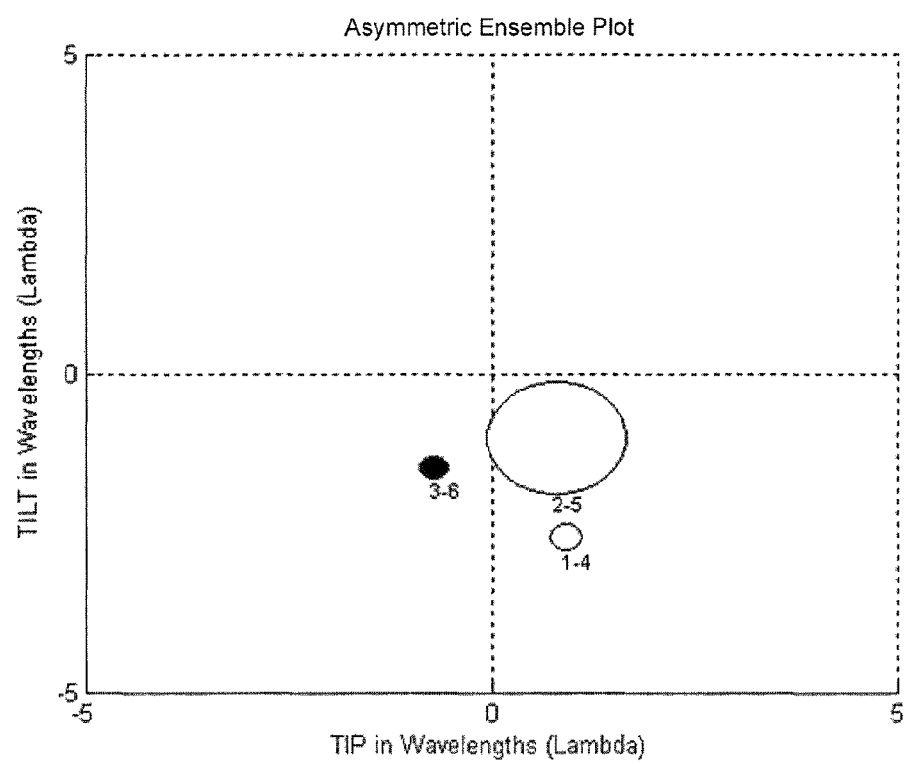

FIG. 47 represents the composite asymmetric components of FIGS. 44-46 as a group. According to one embodiment, the control loop will mainly concentrate on the state diagram depicted in FIG. 47 for symmetric telescopes. For asymmetric telescopes (i.e., telescopes with an odd number of segments), the control loop will concentrate on a state diagram similar to FIG. 42. The control loop will spend most of its time trying to bring the circles toward the origin and reducing the diameters of the circles. The control loop does so via the modulation increment-measure-and-actuate approach discussed with reference to FIGS. 34-41 and which will be discussed in more detail below.

Establishing Focus

Using FIGS. 13-47 and a few more as guides, various related and complimentary approaches to establishing and maintaining focus in segmented optic telescopes will be explored.

Establishing and maintaining focus can be divided into two steps: (1) incoherent light steps to establish focus; and (2) coherent light steps to maintain focus. The word "coherent" is at least a two-headed creature. This disclosure will adopt a more colloquial use of "incoherent" and "coherent," where incoherent refers to the situation in which inter-segment piston misalignment is at least many wavelengths, giving rise to essentially lower resolution overlapping images on the primary detector, as though the different segment-trains were fully separate telescopes, while "coherent" refers to the situation in which inter-segment piston alignment is getting into the single and sub-wavelength region where cross-segment "light phasing" begins to manifest itself in the raw data. Interferometer operators would recognize this as "beating" and are well familiar with this notion of coherency and the need to attain this state.

According to one embodiment, establishing focus is divided into two independent requirements: (1) intra-segment alignment; and (2) inter-segment alignment. Because the underlying hardware supporting the mirrors and the detector(s) has a certain degree of rigidity and associated hysteresis properties, each individual segment of a multi-segment telescope can be initially focused as though it were an independent telescope. Then, together as a set of segments bound together by some rigid structure, the segments need to be adjusted with respect to one another until the segments roughly focus the same object onto the same location of the primary detector.

Figure 48:
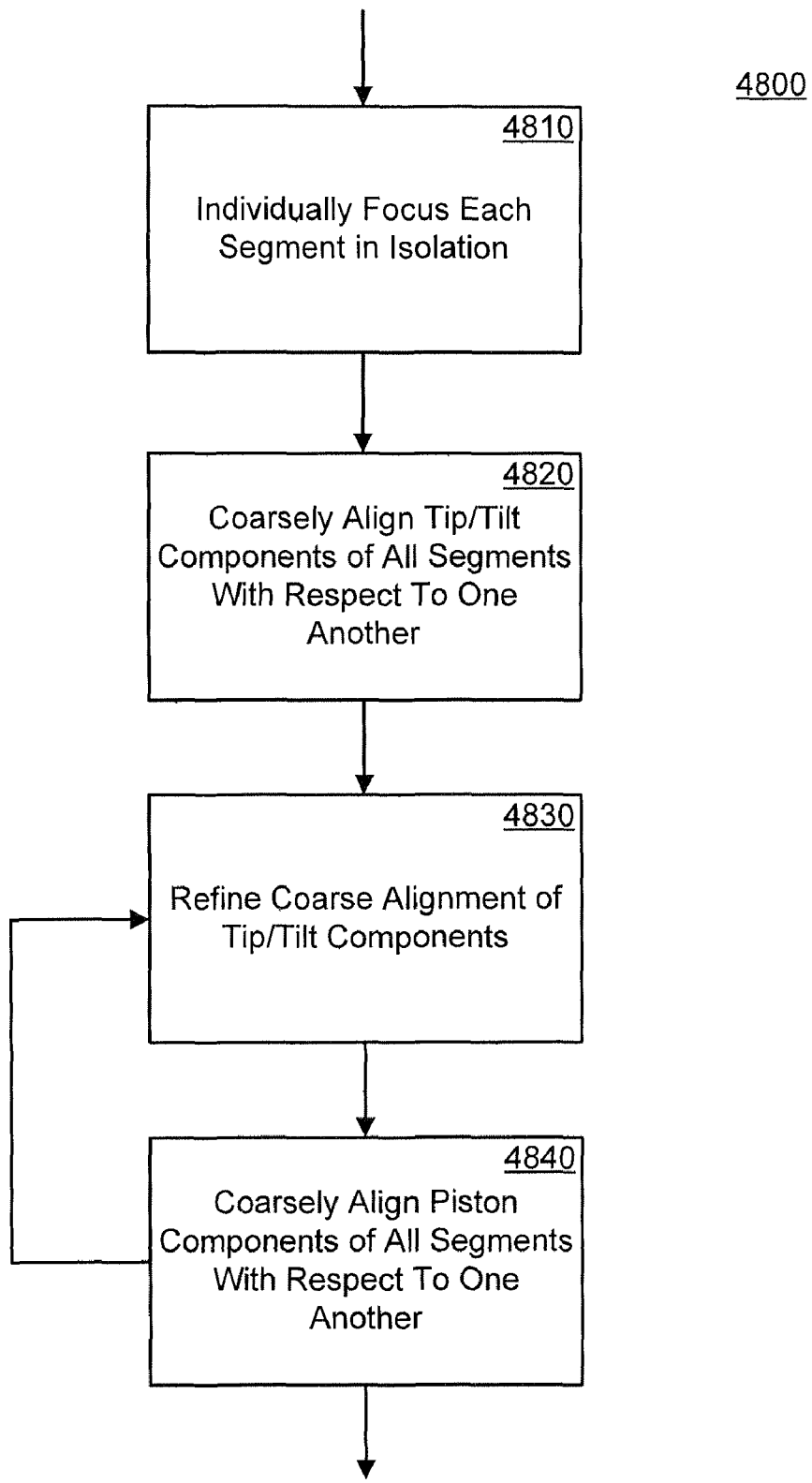
FIG. 48 is a high-level flowchart illustrating a method for establishing focus of a segmented optic system, according to one embodiment.

FIG. 48 is a high-level flowchart illustrating a method 4800 for establishing focus of a segmented optic system, according to one embodiment. Each of the steps will be briefly introduced and then explored in more detail in additional figures. As alluded to in the previous paragraph, the method 4800 starts at step 4810 with intra-segment alignment and continues with inter-segment alignment in steps 4820, 4830, and 4840. At step 4810, each of the segments is individually focused in isolation. Step 4810 may result in inter-segment misalignments on the order of approximately 300 wavelengths. Step 4820 attempts to bring tip and tilt inter-segment misalignments to a few wavelengths by coarsely aligning the tip and tilt components of all segments with respect to one another. The coarse tip and tilt alignment is refined at step 4830 in an attempt to bring the tip and tilt inter-segment misalignments to approximately one wavelength. At step 4840, the piston components of all segments are coarsely aligned with respect to one another in an attempt to bring piston inter-segment misalignments to a few wavelengths. To aid with the coarse piston alignment, step 4830 may be continually repeated during step 4840. Of course, the inter-segment misalignments after each of steps 4810-4840 may vary. After the completion of step 4840, the telescope is initially calibrated and the nominal loop 240 takes over to maintain focus, unless the telescope needs to be recalibrated.

Single Segment Focus

Figure 49:
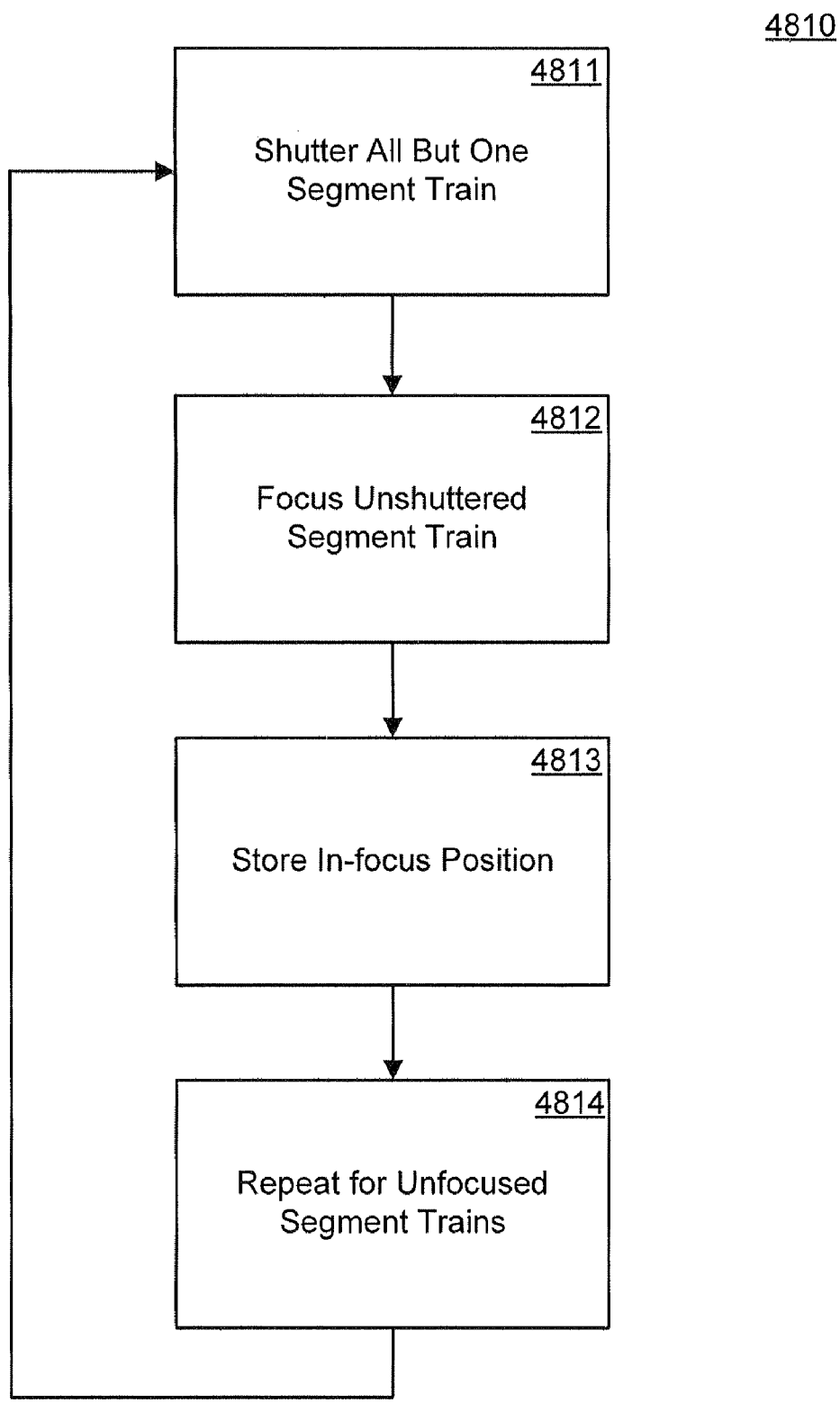
FIG. 49 is a high-level flowchart illustrating a method for individually focusing each segment of a segmented optic system, according to one embodiment.

FIG. 49 is a high-level flowchart illustrating one example of implementing step 4810 with the goal of focusing each individual segment train, one by one. Step 4810 begins by isolating a segment train at substep 4811 and then focusing the isolated segment train at substep 4812. For example, with reference to FIG. 42, the piston component of the isolated segment train may be adjusted to reduce the diameter of the circle corresponding to the isolated segment train and the tip and tilt components may be adjusted to align the center of the circle with the origin. At substep 4813, the in-focus position of the isolated segment train is stored in a memory associated with actuator controller 250. The remaining unfocused segment trains are then focused at substep 4814 by repeating substeps 4811 through 4813.

There are many approaches to isolating individual segment trains, and the approach generally depends upon the specific design of the telescope. For example, isolating a segment trains may entail shuttering all but the isolated segment train if shutters are included. By way of another example, isolating one segment may be accomplished by deliberately keeping the other segment trains well out of focus.

Given common depth-of-field consideration for high f-number imaging systems, "in focus" can be on the order of a millimeter or more, which is three orders of magnitude larger than the scale of visible light wavelengths. Thus, clearly, step 4810 does not come close to the desired level of focus, but it does perform the pre-requisite yeoman's task of setting up the system to produce usable data. While one example of implementing step 4810 has been described, there are many other ways to implement step 4810.

Coarse Tip-Tilt Alignment of All Segments

With crude focus achieved on all N number of individual segments, and in an unshuttered situation where all segments are reflecting light onto the primary detector, step 4820 starts out with N number of shifted and overlapped images on detector 70. Step 4820 attempts to coarsely align the N number of images into one lower resolution but brighter image, achieving an initial coarse pointing or tip-tilt alignment of the segments. The reference to lower resolution acknowledges that inter-segment piston alignment remains perhaps orders of magnitude off (e.g., tens or hundreds of wavelengths of light), one segment to the next, and hence it can be expected that no cross-segment higher frequency image content will begin to appear.

Figure 50:
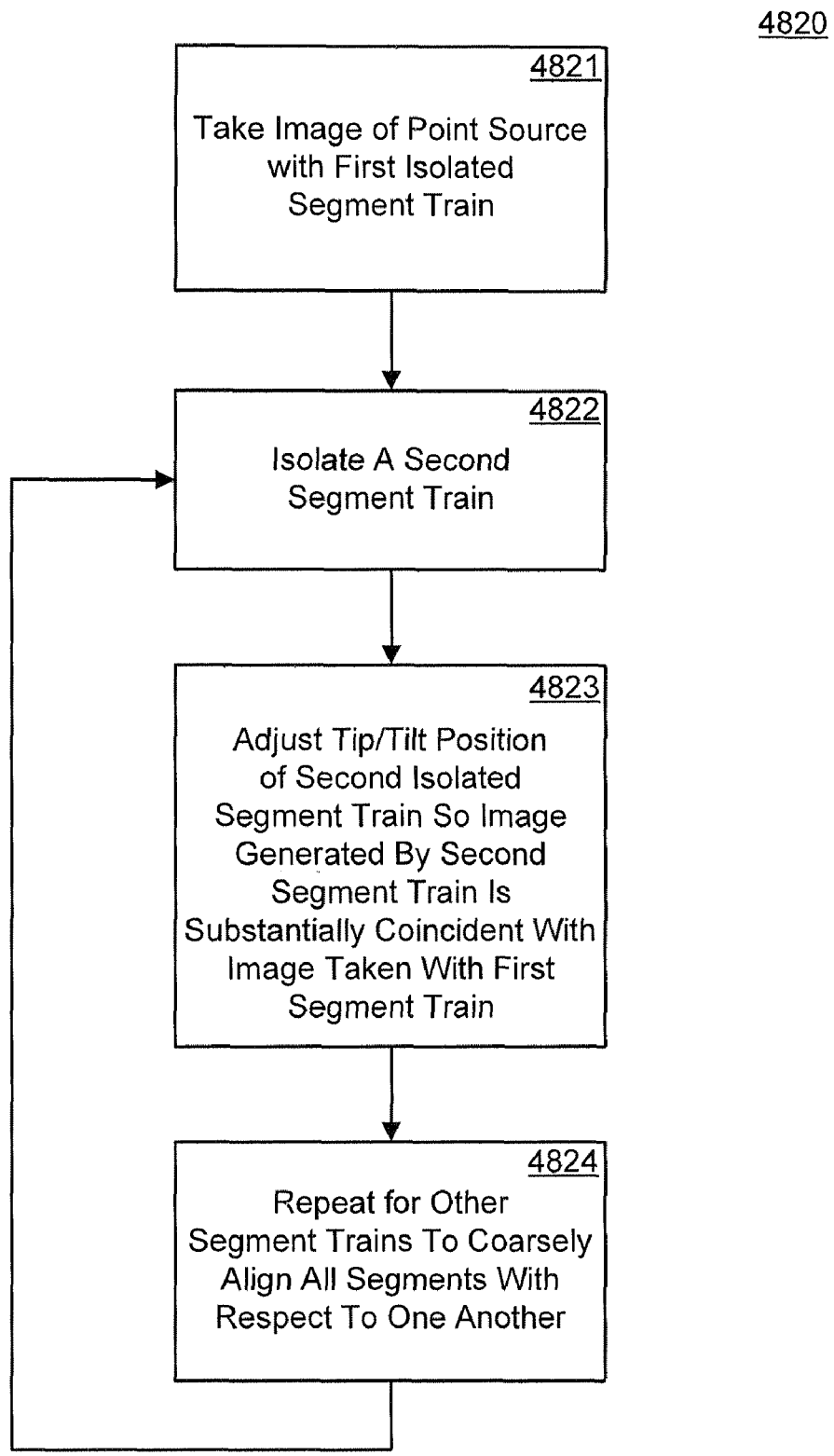
FIG. 50 is a high-level flowchart illustrating a method for coarsely aligning tip and tilt components of all segments of a segmented optic system, according to one embodiment.

FIG. 50 is a high-level flowchart illustrating one example of coarsely aligning tip and tilt components of all segments. Step 4820 first captures an image of a point source with a first isolated segment train at substep 4821 and then isolates a second segment train at substep 4822 (e.g., shutters the other segment trains). Then, at substep 4823, the tip and tilt components of the second segment train are adjusted until an image of the point source generated by the second segment train is substantially coincident with the image of the point source taken with the first isolated segment train. Substeps 4822 and 4823 are repeated N-2 times (after images generated by a first pair of segment trains are substantially concident) for an N segment telescope so that all the segments are coarsely aligned with respect to one another.

While utilizing point sources greatly assists the underlying alignment algorithms, other scenes with readily identifiable features may be used. As described with reference to step 4810, there are many ways to isolate segment trains. For example, a segment train may be isolated by shuttering all other segment trains. By way of another example, all but one segment can be deliberately de-focused.

The methods of coarsely aligning tip and tilt components are plentiful and driven by specific telescope designs and the availability of object/scene types. For example, a segment train can be isolated and an image of a given point source or other scene can be centered on the detector using tip-tilt actuation of the isolated segment or by gross pointing of the telescope itself and repeated for the other segments. By way of another example, images can be captured with each segment isolated and compared with respect to one another to calculate the necessary actuator adjustments.

Structure rigidity and hysteresis represent and define the ultimate alignment precision floors that can be achieved with step 4820. After step 4820, inter-segment tip-tilt misalignments may be on the order of a few wavelengths or pixels or more. However, it is possible that certain designs (and their rigidity/hysteresis) can achieve alignment on the order of a single digit wavelength misalignment.

Taken together, steps 4810 and 4820 are emphatically meant to be "engineering phase" or "calibration stage" steps that are repeated only as often as a system may drift out of (or initially not be in) nominal mechanical tolerances for standard operation.

Incoherent Fine-Scale Tip-Tilt Alignment

Figure 51:
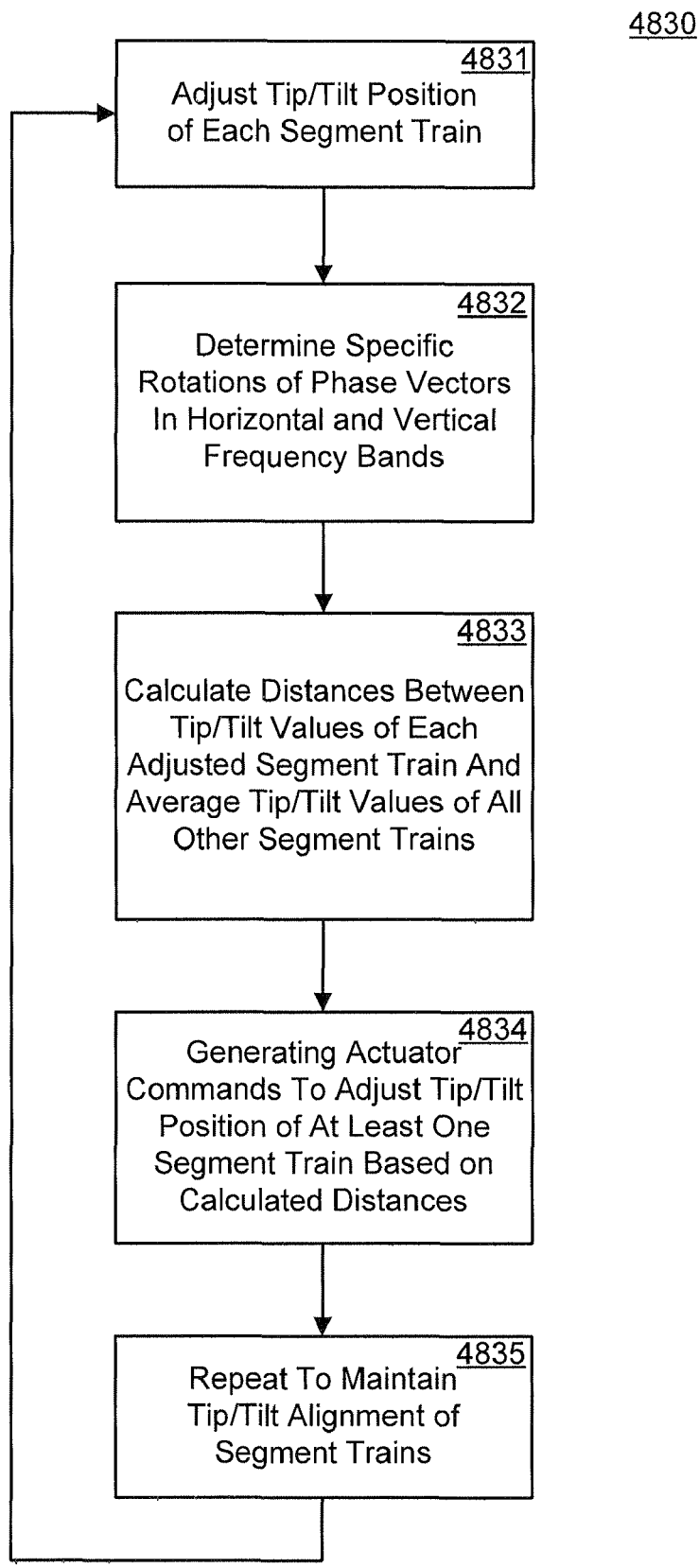
FIG. 51 is a high-level flowchart illustrating a method for refining a coarse alignment tip and tilt components of all segments of a segmented optic system, according to one embodiment.

FIG. 51 is a high-level flowchart illustrating one example of implementing step 4830 with the goal of moving from a tip-tilt alignment in step 4820 largely based on the rigidity of a structure and defocusing all but the segment being aligned, to a finer alignment based on ongoing data gathering of primary detector 70 while all segments are in nominal focus (relative to their innate depth of field). Thus, step 4830 attempts achieve a tip-tilt inter-segment alignment to a single wavelength of light (or other electromagnetic radiation) or thereabouts, which is the equivalent of two separate images being formed by two separate segments at the common primary detector 70 aligning to within about a pixel (then repeated in a pair-wise fashion to all N segments).

While many telescope designs and their hardware may be capable of achieving half-wave, quarter-wave, or even better alignments using just step 4830, this disclosure will not make this assumption and will instead seek to get the alignment to within one or two pixels during step 4830. Nominal loop 240, described in more detail below, is intended to close the gap between near-focus and in-focus and attempts to achieve a better than one wavelength alignment.

To the extent that steps 4810 and 4820 are largely engineering/calibration stage steps not needing to be performed too often (e.g., once an hour, day, or month depending on the design), step 4830 may be required on the order of every minute or so for segmented optic designs of less rigidity than a typical ground-based telescope design. For this reason, step 4830 ought to be able to work and finish in only a few seconds, even on a telescope having ten or twenty segments. Thus, the framing-rate of detector 70 may need to perform at a rate much faster than one frame per second. However, if the framing-rate of detector 70 is slower than one frame per second, the execution times for step 4830 may scale slower. Thus, the practical goal is to perform step 4830 quickly.

The preferred embodiment of step 4830 presumes gross inter-segment piston misalignment. Put another way, step 4830 attempts to actively align N number of independent images of the same scene all initially overlapping one another and offset from one another by several or even several tens of pixels. To the extent one segment and another segment by random chance happen to be close in their piston alignments is fine and even good, but it ironically begins to represent the performance limits of using just step 4830 (i.e., inter-segment tip-tilt alignment within a few wavelengths or sub-wavelength) and illustrates why the later "coherent" steps are used. In short, step 4830 is, therefore, meant to be an incoherent approach and its job is to simply assist in getting the tip-tilt alignments well into the near-focus range. Performance any better than this represents extra benefit.

Referring now to FIG. 51, an example of implementing step 4830 will be briefly presented and followed by a more detailed investigation of the various substeps. At substep 4831, one or both of a tip position and a tilt position of each segment train are adjusted to generate horizontal and vertical shifts of the image (e.g., that of a bright star) on detector 70. Images captured before and after the adjustments will be subtly different, which generates measurable Fourier phase-spins in the lower frequency bands (e.g., by analyzing 2D fast Fourier transform (FFT) phase plots of the images). Thus, substep 4832 determines specific rotations of phase vectors in the horizontal frequency bands corresponding to the horizontal shifts and vertical frequency bands corresponding to the vertical shifts. Fourier phase is analyzed at substep 4832 instead of Fourier magnitude because images of a point source before and after a lateral shift will have the same Fourier magnitudes but will have different phases.

As will be explored in more detail below, the rotations of phase vectors in the horizontal and vertical frequency bands are probative of a distance between a tip-tilt value of an incrementally modulated segment and an average of the tip-tilt values of the other segments. Thus, substep 4833 calculates distances between tip-tilt values of each adjusted segment train and average tip-tilt values of all other segment trains based on the phase-spin determined at substep 4832. Based on the calculated distances, actuator commands are generated at substep 4834 to adjust a tip-tilt position of at least one segment train in an attempt to bring the segment trains into closer alignment. Substeps 4831 through 4835 can then be repeated to maintain the tip-tilt alignment of the segment trains.

For discussion purposes, step 4830 will be described assuming the telescope is viewing a point source, such as a bright star. However, step 4830 will function equally well when the telescope is viewing any arbitrary scene.

Figure 52:
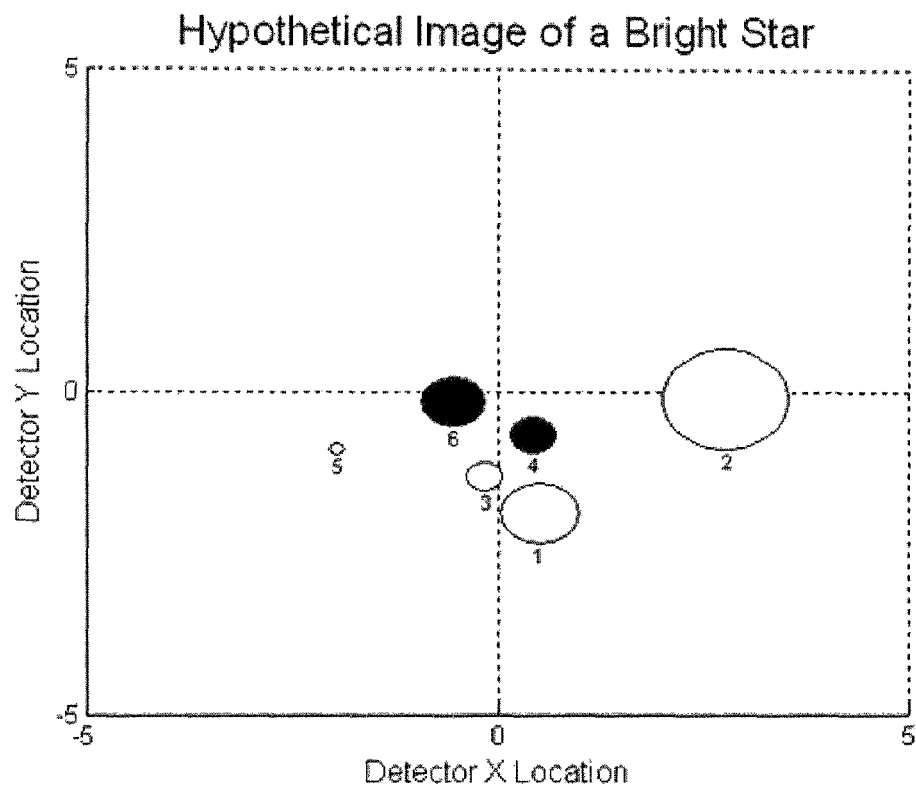
FIG. 52 is the example state diagram of FIG. 43 relabeled to illustrate what an image of a bright start might look like at a focal plane if the optic system had the tip, tilt, and piston WFE components depicted in FIG. 43.

One of the subtle benefits of FIGS. 42 and 43, previously described, is that both figures crudely approximate what an image of a bright star might look like if indeed the telescope is in the TTP ensemble state so depicted. The size of the circle would approximate a slight blur of the star, and there would of course be no distinction between out of focus in one direction versus the other direction. Hence, the open-circle, filled-circle distinction does not carry over. The scale on the x and y axes would, of course, be in pixels. FIG. 52 is simply FIG. 43 so relabeled, without worrying about the open-circle, closed-circle subtlety, nor the "depth-of-field" subtlety wherein all six "segment images" of the same star would essentially look the same. If anything, keeping the circles with their differing radial sizes illustrates that the piston alignments among segments can be quite different from one another immediately after performing step 4820.

Figure 53:
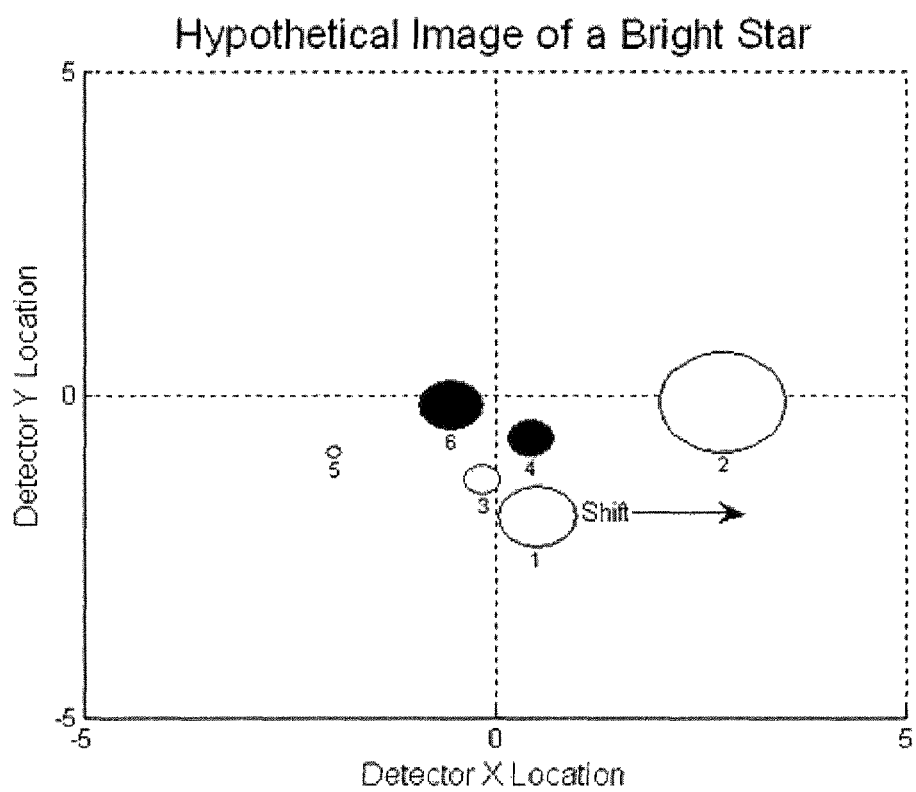
FIGS. 53-55 are example state diagrams illustrating proactive horizontal shifts and/or vertical shifts of various segments shown in FIG. 52.

As previously described with reference to substep 4831, a tip-tilt position, of each segment train is adjusted to generate horizontal and vertical shifts of the bright star on detector 70. FIG. 53 illustrates proactive incremental modulation of mirror 1 that shifts its image by some generally known amount, in this case roughly two pixels. If only one shift occurred in each data frame, capture of 2N+1 data frames would be needed to determine the horizontal and vertical frequency phase-spins (e.g., an unshifted data frame plus two data frames similar to FIG. 53 to horizontally and vertically shift each mirror).

Figure 54:
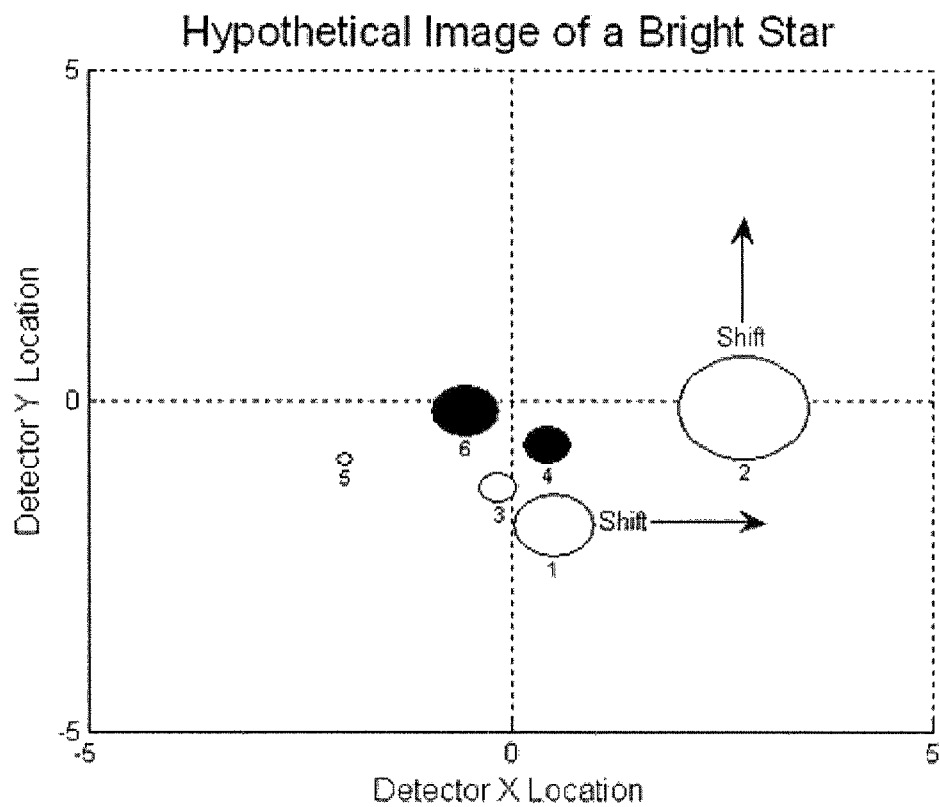
Figure 55:
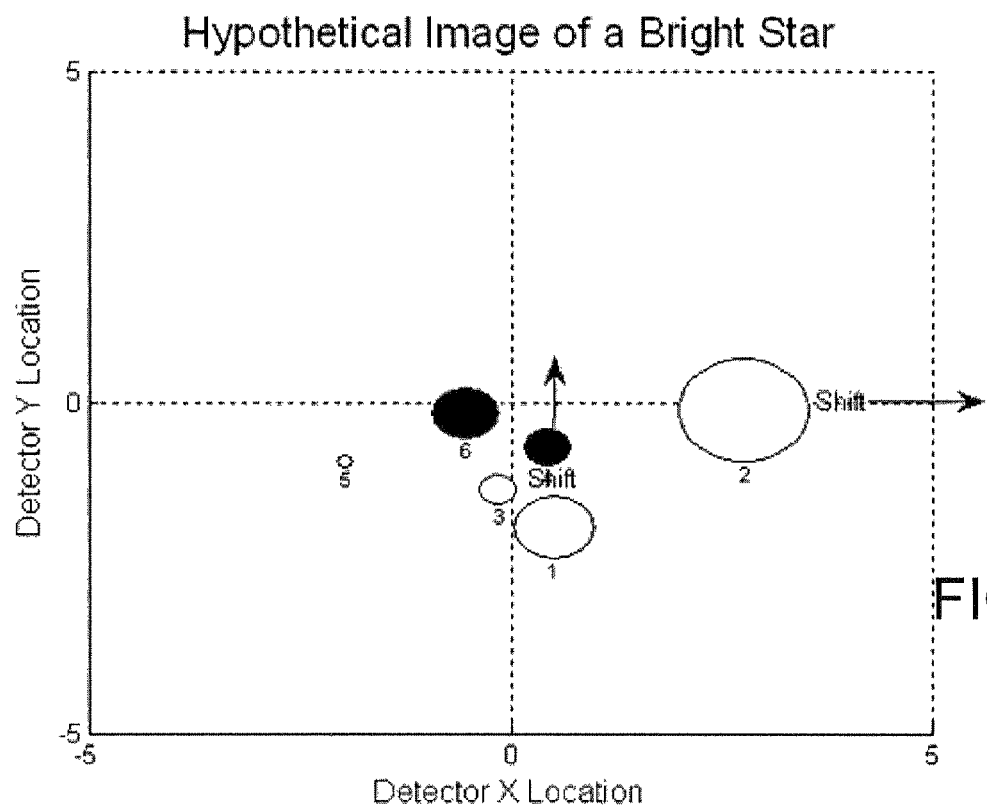

A preferred embodiment reduces the frame count to N+1 frames, thereby reducing the processing time, by shifting two mirrors concurrently in orthogonal directions. For example, as depicted in FIG. 54, two shifts are made concurrently—mirror 1 is shifting to the right and mirror 2 is shifting upwards. FIG. 55 then represents one new image data capture, where the same mirrors have been shifted in opposite directions orthogonally (e.g., mirror 1 is shifted upwards while mirror 2 is shifted to the right).

Thus, the preferred embodiment captures a first data frame in the state of FIG. 52 (e.g., unshifted), a second data frame in the state of FIG. 54 (e.g., two mirrors shifted in orthogonally opposite directions), a third data frame in the state of FIG. 55 (e.g., the same two mirrors having the shift axes switched), fourth and fifth data frames capturing shifts of mirrors 3 and 4 (first in one orthogonal set of directions and then the other), and sixth and seventh data frames capturing shifts of mirrors 5 and 6 (first in one orthogonal set of directions and then the other). In total, N+1 data frames will be captured for an N segment telescope.

If the frame-rate of primary detector 70 is N+1 frames per second or greater, then generally speaking step 4830 can take place within one second because the processing requirements are rather modest. The expected accuracy and precision of step 4830 depend on several factors, such as the set of mirror configuration criteria, the number, N, of segments, the detector characteristics, and scene characteristics. An alignment of one or two wavelengths (e.g., one or two pixels) is achievable across most multi-segment designs using common modest-contrast white-light scenes.

The data frames captured after performing the shifts indicated in FIGS. 54 and 55 would be subtly different from the unshifted version (e.g., FIG. 52), and give rise to measurable Fourier phase shifting concentrated in the lower spatial frequencies of the Fourier domain data. In other words, the shifts in the images corresponding to known shifts in tip-tilts of selected mirrors give rise to specific rotations of phase vectors in the horizontal frequency band for horizontal shifts and the vertical frequency band for vertical shifts. The rotations of phase vectors themselves, say for the very low horizontal frequency band, form a nearly linear sequence going from the first horizontal frequency (in a discrete FFT) outward. This linear pattern itself is a direct function of, for example, the difference of the tip value of the incrementally modulated mirror from the average of all other mirror tip values. By measuring the linear pattern (to within basic limits of sensor noise), a slope value can be derived that is indicative of the difference between the tip value of the mirror and the average tip values of all other mirrors. By cycling through all N+1 images, a set of linear equations can be formed and then solved, giving the positions of all N mirrors tip-tilt values relative to the N-mirror average. It is indeed a noise-prone process, but it works and can be repeated continually where and when noise issues dominate.

Figure 56:
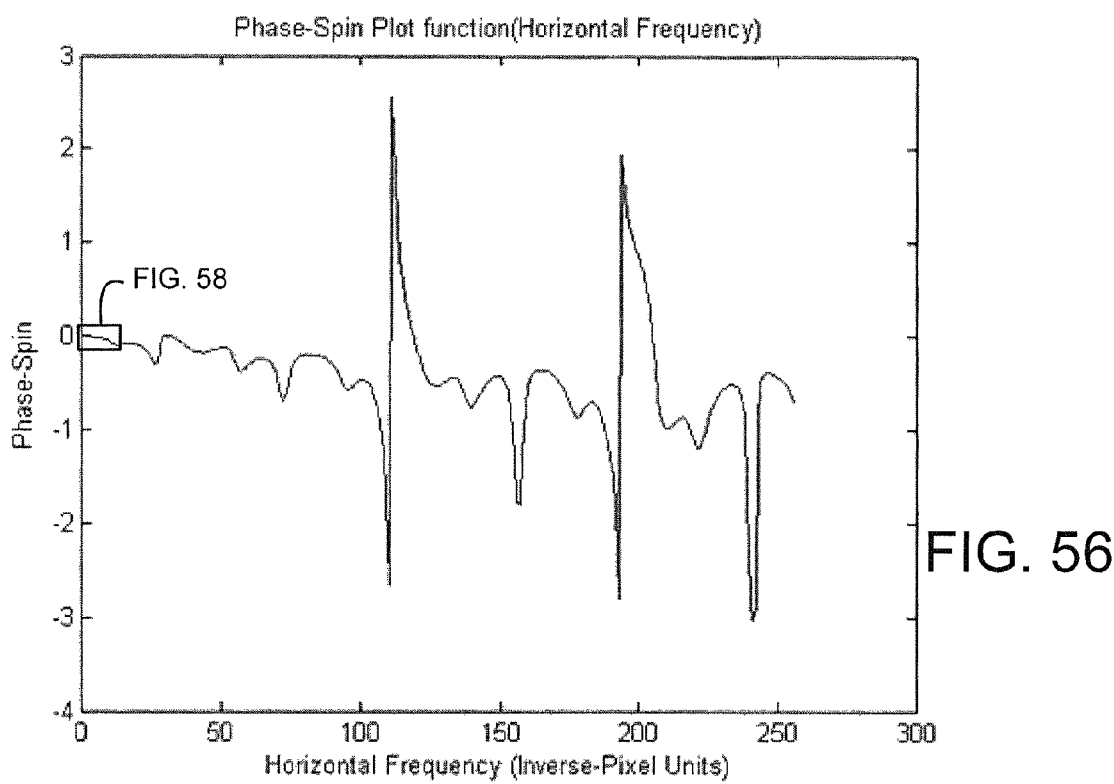
FIG. 56 is an example graph illustrating a phase-spin in a horizontal frequency band between 2D fast Fourier transforms (FFT) of FIGS. 52 and 53.
Figure 57:
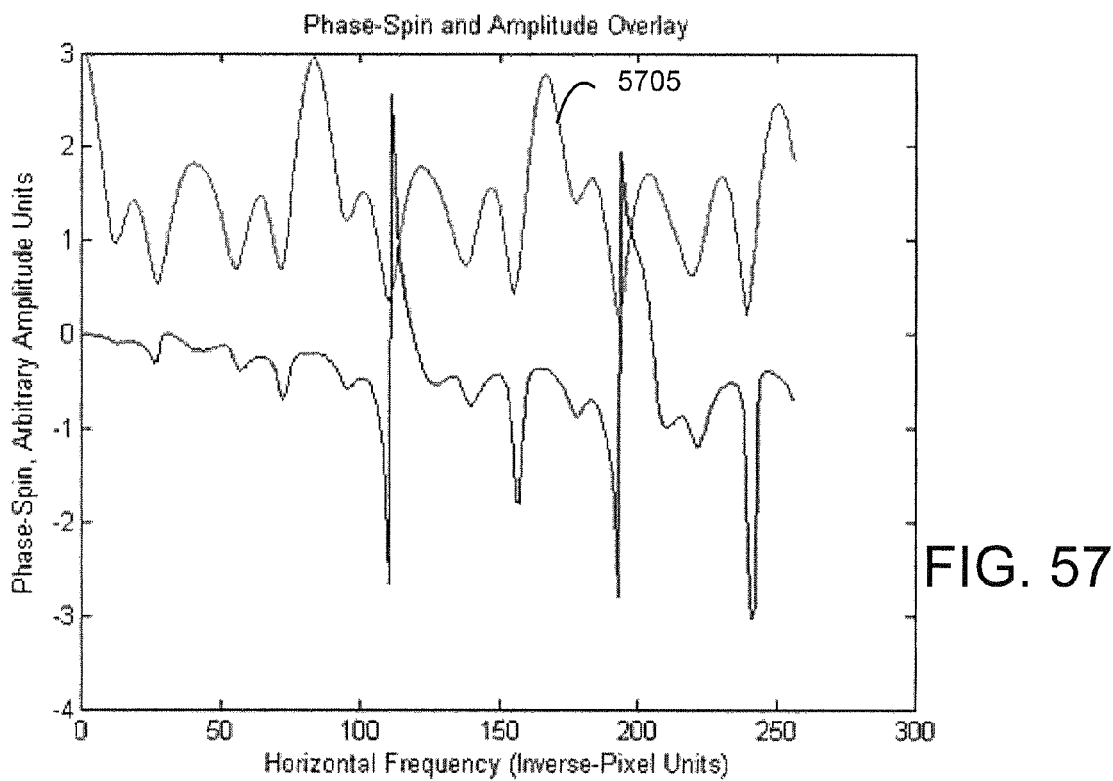
FIG. 57 is an example graph illustrating a Fourier amplitude signal overlaid on the phase-spin plot of FIG. 56.

FIG. 56 illustrates an example plot of the phase-spin of the horizontal frequency band in a 2D FFT of an image such as that in FIG. 52, where the spin is the difference between a phase value corresponding to the unshifted image and a phase value corresponding to the shifted image (e.g., the shift illustrated in FIG. 53). The random horizontal placement of the point sources gives rise to a generally complicated phase spin when tracked all the way to the diffraction limit (e.g., 256 frequencies if the detector is 512 pixels in horizontal extent). FIG. 57 overlays a Fourier amplitude signal 5705 on the phase spin plot for reference. It too is generally complicated.

Figure 58:
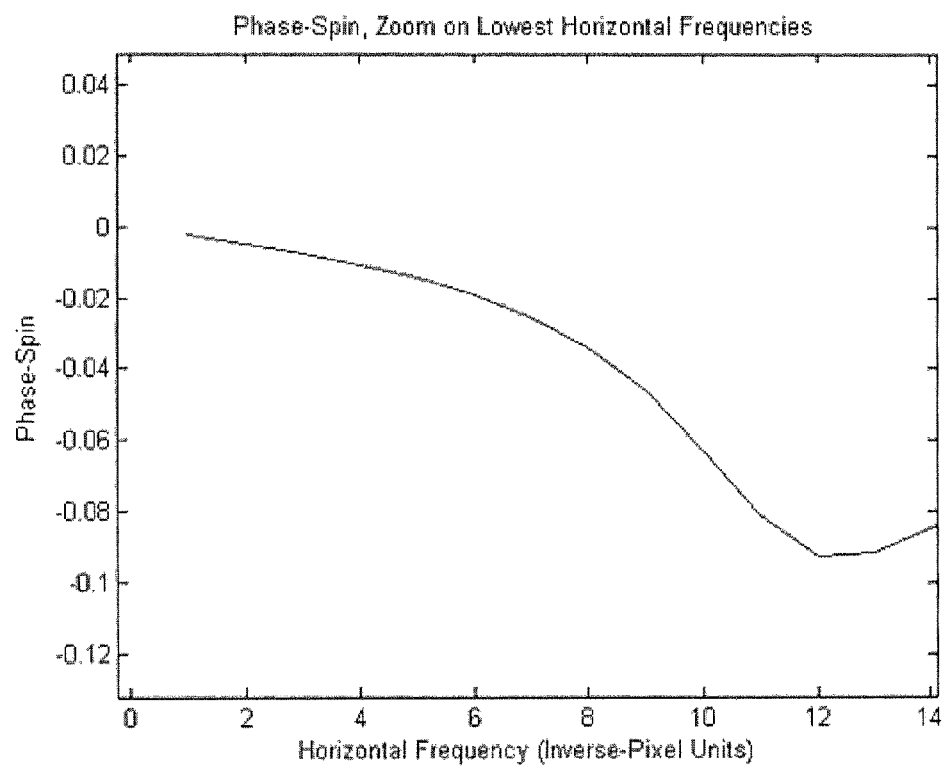
FIG. 58 is an example graph illustrating the phase-spin in the first fourteen frequencies of FIG. 56.

FIG. 58 zooms in on just the lowest horizontal frequencies, in this case the first 14 lowest frequencies out of 256. The lower frequencies contain a measurable signal in the spin values for any system looking at either point source(s) or any arbitrary, reasonable contrast scene. There is pseudo-linear behavior out to about the sixth or seventh horizontal frequency.

Figure 59:
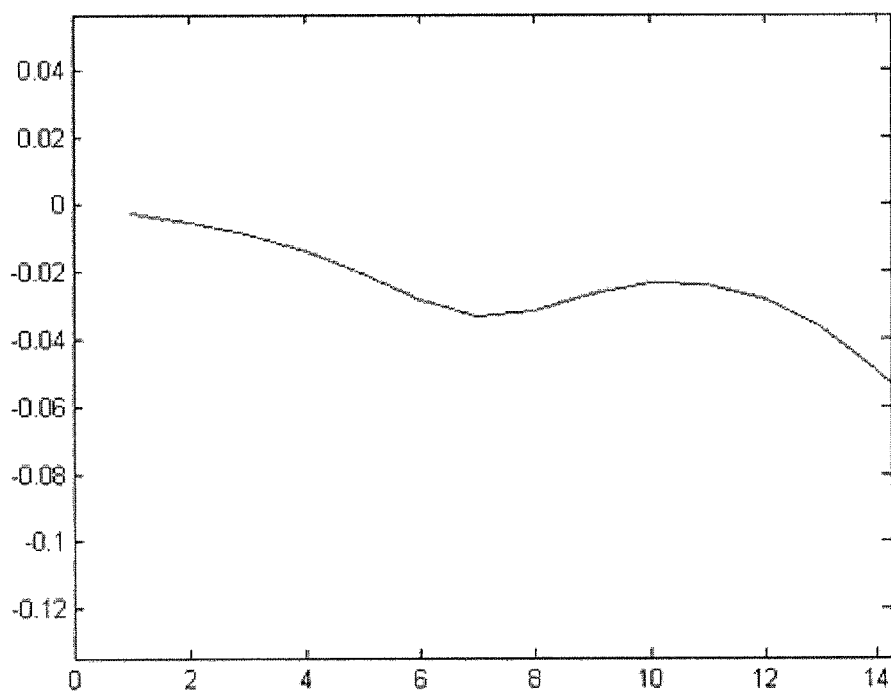
FIG. 59 is another example graph illustrating the phase-spin in the first fourteen frequencies corresponding to a different set of state diagrams.

FIG. 59 has the same zoom enlargement as that of FIG. 58, but on a different random example of tip-tilt values for a six mirror system. The form of the curve is slightly different, and the slope of the line in the lowest frequencies is also different. The difference in slope for the lowest frequencies is directly related to the distance of the tip value of the incrementally modulated mirror from the average of the tip values of all the other mirrors. Thus, a good measurement of the slope in the lower frequencies translates to a good measurement of how far off the tip of the incrementally modulated mirror is from all the other tip values combined as an average.

FIGS. 60-63 demonstrate why the approach taken in step 4830 works and points toward precisely how it works. FIGS. 60-63 are scatter plots of 2000 random hypothetical trials of tip-tilt values for six mirrors, akin to FIG. 52. The root mean square deviation of each trial and all trials together was set to be about 10 pixels, i.e., the point sources used would have random x-y positions ranging in about ±10 pixels, using a Gaussian random generator function.

Figure 60:
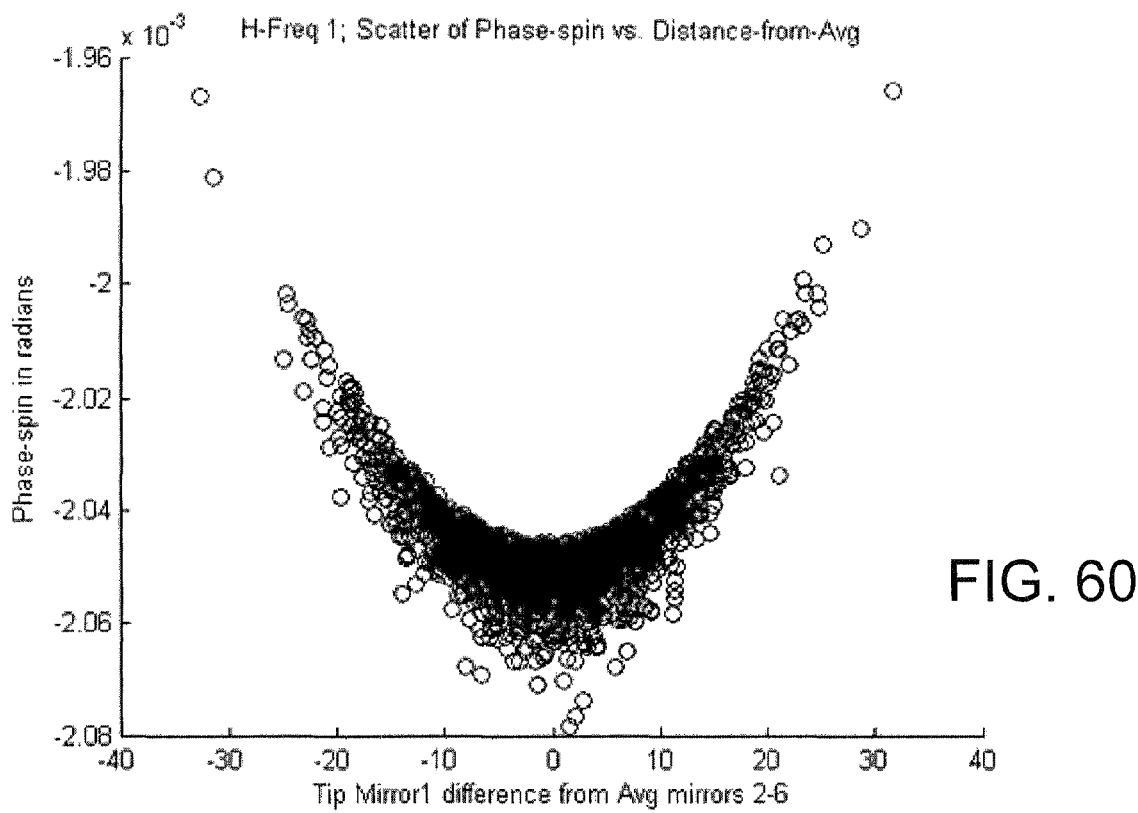
FIGS. 60-63 are example scatter graphs plotting phase-spin versus an underlying difference between a tip position of a segment and an average of tip positions of all other segments for 2000 hypothetical shifts.

FIG. 60 isolates the first and lowest horizontal frequency across all 2000 trials, plotting the amount of phase spin that the operation in FIG. 53 produced (in this case one pixel of shift) at its location in the Fourier plane, against the underlying difference between a mirror's tip position and the average of all other mirrors. The x-axis is thus represented by Equation 1:

$$x = tip_1 - \frac{\sum_{N=2}^{6} tip_N}{5} \qquad \text{Equation 1}$$

Figure 61:
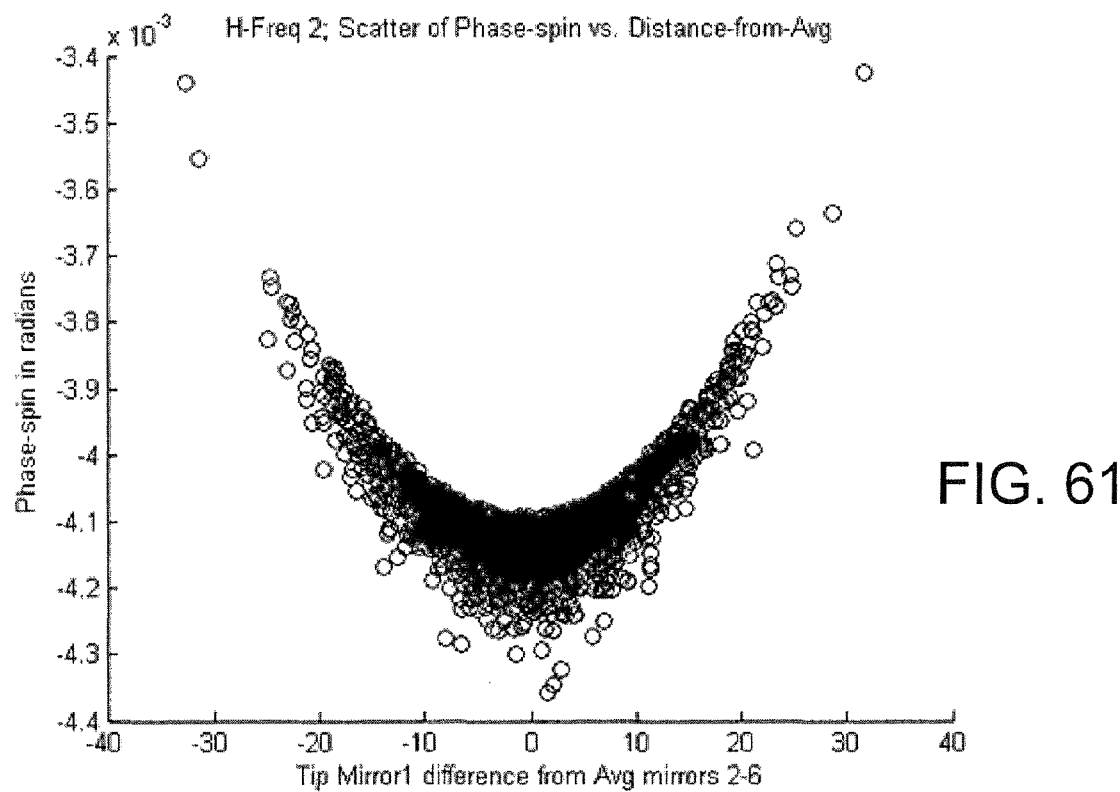
Figure 62:
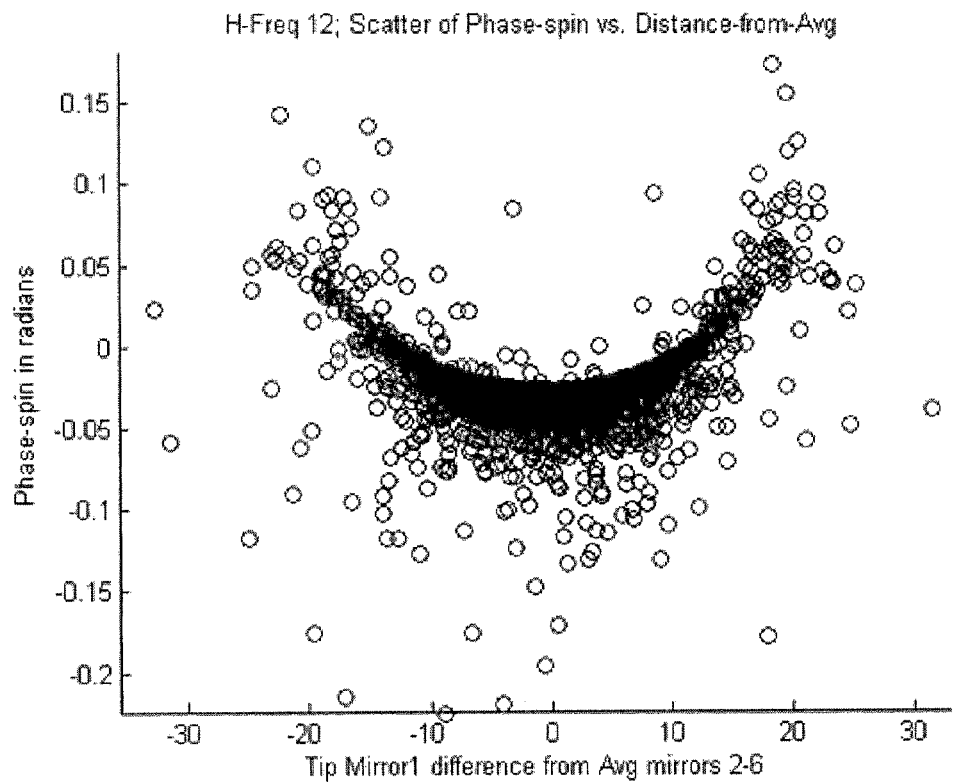
Figure 63:
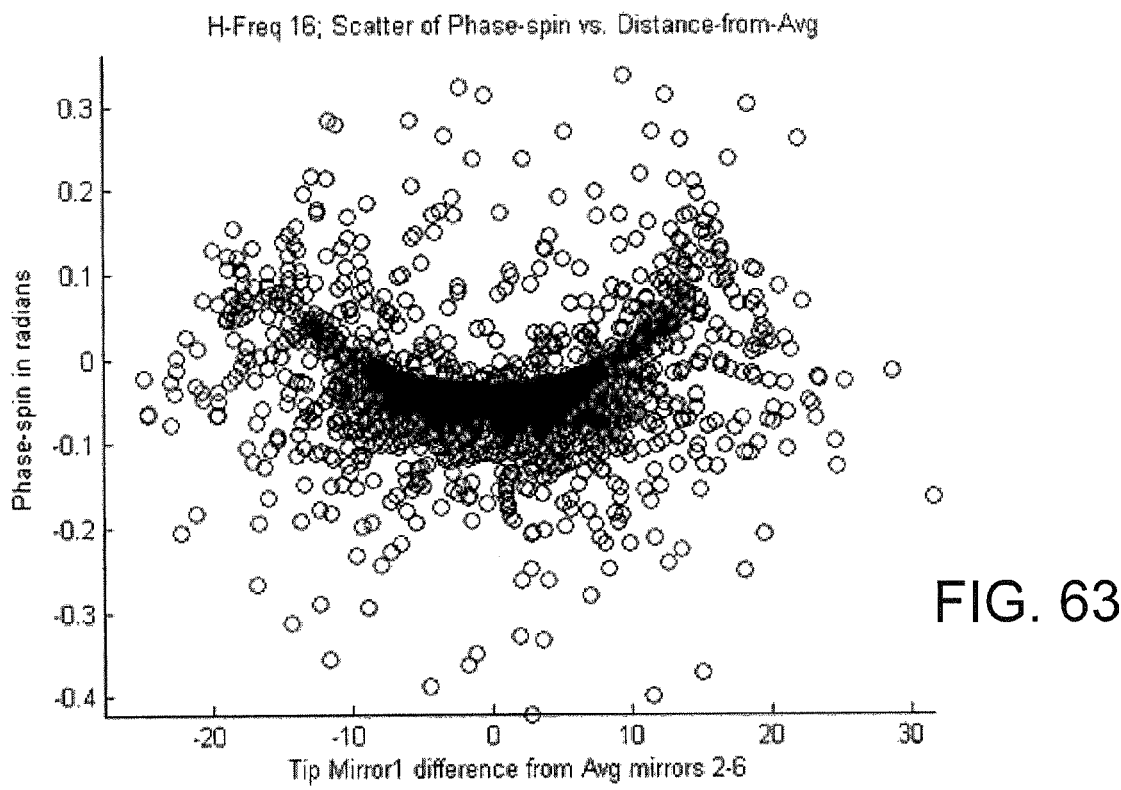

FIG. 61 has the second horizontal frequency phase-spin value across all 2000 hypothetical trials, showing the same general form but have roughly twice the phase-spin values (see the y-axis) as FIG. 60. FIG. 62 shows the twelfth horizontal frequency, and FIG. 63 shows the sixteenth horizontal frequency, where the general form of FIG. 60 is still retained, but there is a noticeable increase in outliers.

The upshot of the scatter diagrams depicted in FIGS. 60-63 is that by measuring the phase-spin values on the lower horizontal frequencies between two images as produced by the approach of either FIG. 53 (e.g., a lateral shift of one mirror) or FIG. 54 (e.g., orthogonal lateral shifts of two mirrors), underlying distances of a mirror between one or both of its tip value and tilt value and the group tip-tilt averages can be deduced. The raw phase-spin gives approximately the absolute value of the distances, while looking at increase or decrease in amplitude of the horizontal frequency component yields the polarity of the distance of Equation 1.

In summary, N number of shifts are performed and N+1 number of data frames (e.g., an unshifted data frame and N data frames containing shifts of two mirrors in orthogonal directions) are captured for a N segment telescope, according to the preferred embodiment. Comparing the Fourier transform of each shifted image to the Fourier transform of the unshifted image yields N number of phase-spin measurements in the horizontal frequency band and N number of phase-spin measurements in the vertical frequency band (e.g., assuming two orthogonal shifts are packed into one framepair, as shown in FIGS. 54 and 55). The slopes of the lines in the lowest frequencies roll up into 2N linear equations with 2(N−1) unknowns, in a full rank matrix equation. There are 2(N−1) unknowns because one mirror segment can be treated as a kind of master mirror segment that arbitrarily defines the desired pointing angle of the telescope. The solutions to the linear equations become actuation signals to the non-master mirrors, which will bring the non-masters mirrors into better tip-tilt alignment with the entire group. Step 4830 can be repeated many times to help maintain the tip-tilt alignment to within a few pixels.

Three possible limitations to step 4830 include the basic noise on the measurements elucidated above, potential "coherent beating" phenomena if the pistons happen to be very close between several segments, and structural rigidity and hysteresis effects that take place over the N+1 frame captures. It is with these error sources in mind that the very conservative goal of aligning tips and tilts to within one or two wavelengths suffices for step 4830. Further steps in the nominal loop 240 will hone the tips and tilts into sub-wavelength alignment. According to certain embodiments, the error sources may not be significant and sub-wavelength accuracies may be obtained with step 4830 itself.

There are, are of course, other approaches that may achieve the same goal. However, the other approaches may be significantly slower, have higher processing requirements (keeping in mind that space-bound processors are typically several generations behind due to design requirements for harsh space radiation environments), or both. For example, one alternative embodiment uses iterative refinement to enhance signal to noise ratios on measurements and help smooth out distortion effects in measurements to the extent those distortions can be accurately captured in a modeling step. Iterative refinement entails utilizing a group of Fourier domain frequencies that go beyond just the horizontal and vertical axes. As its name implies, iterative refinement entails iteration, where an initial estimate is taken from examining and measuring only the horizontal axes values for determining the tip and only the vertical axes values for determining the tilt, then using these initial values to "model" the expected signals across a broader range of frequencies, followed by generating a difference signal between what the model predicts and what the data contain. The underlying and initial tip-tilt values first estimated are incrementally modulated according to the derived difference signal, and the model/difference methods are repeated.

Two other alternative embodiments that will be discussed are more brute force in nature. One alternative embodiment entails incrementally modulating segments until aligned without knowing or measuring the misalignments. For example, with reference to FIG. 52, a misaligned N segment telescope effectively has N number of shifted versions of the same low resolution image all sitting on top of one another (e.g., the point-source depicted in FIG. 52). To align the segments, each segment is incrementally modulated until the "shifted" images line up. Using a crisp and clean point source as a scene will help by serving as an "algorithmic beacon" that can be shifted about by one mirror in a segment and identified as to a given segment's version on a primary detector. Then, relative shifts between the segments can be determined in a sequential manner. With non-point source scenes, things are a bit more tricky but similar "controlled jostling and subsequent identification of shifting features" can be employed.

Yet another brute force method includes proactively blurring N−1 segments as an image is formed with a given segment and repeating the blurring/image capture across all N segments. Image registration methods can then be used to line up the segment images and produce actuation signal values for the tip-tilts of all segments. This approach works well for calibration-stage steps and provides a nice parallel and/or redundant check on the preferred embodiment described above. Two possible limitations of this approach include the additional time needed to perform and the reliance on tame hysteresis/rigidity of a structure because mirror segment pistons are moved quite a bit.

Coarse Inter-Segment Piston Alignment

Figure 64:
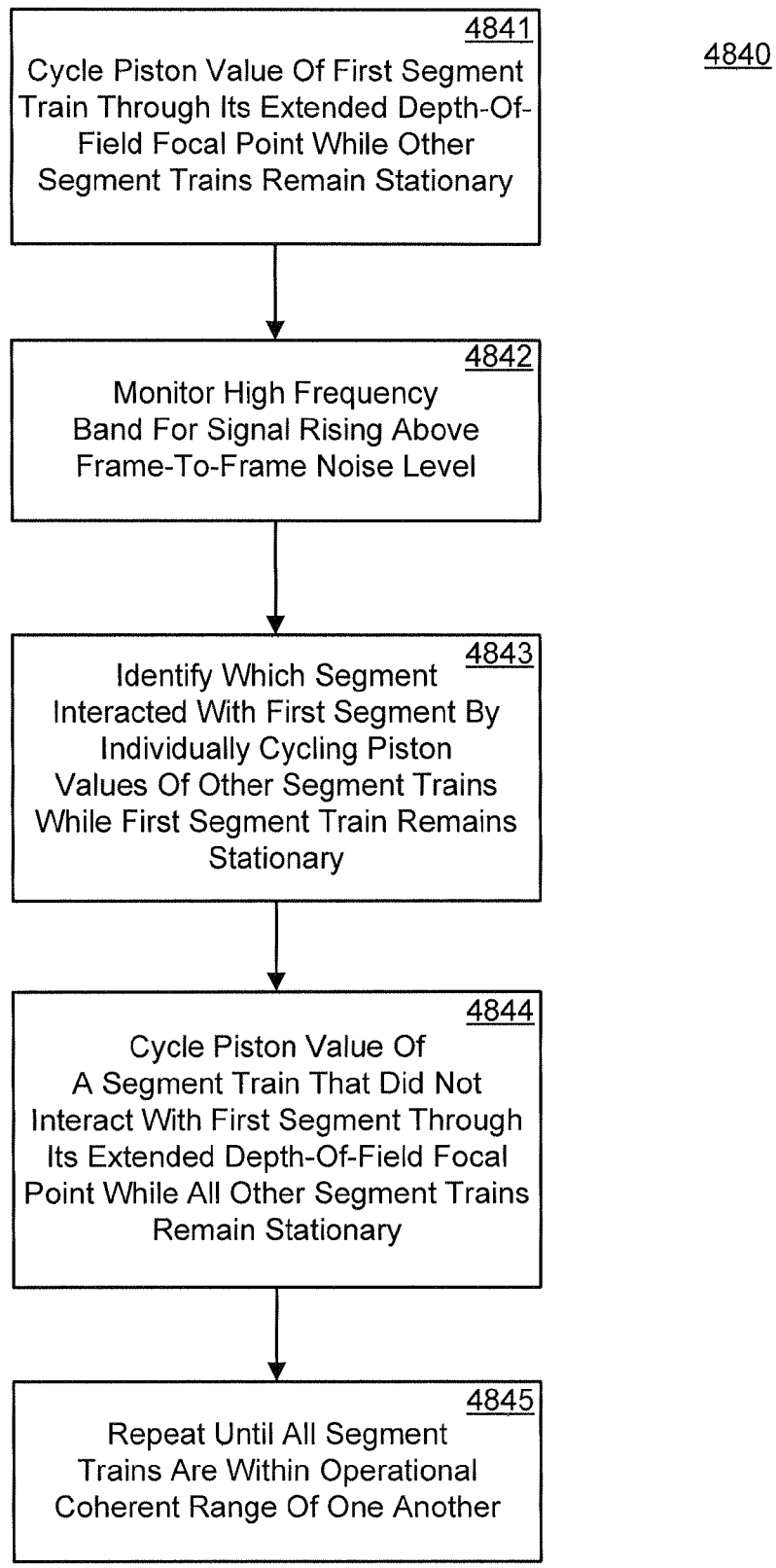
FIG. 64 is a high-level flowchart illustrating a method for coarsely aligning piston components of all segments of a segmented optic system, according to one embodiment.

FIG. 64 is a high-level flowchart illustrating one example of implementing step 4840 with the goal of bringing to within a few wavelengths of light of one another the piston values of all N segments. The initial assumption is that piston values may be up to a millimeter or more off from one another, which is a substantial search range relative to sub-micron wavelengths of light.

While step 4830 can be deployed in an operational setting, step 4840 is generally performed during off-line engineering calibration time. Thus, the execution speed is less of an issue with step 4840, so aligning inter-segment piston values to within a few wavelengths may take up to a minute or even more. Later steps will hone in on the operational necessities of keeping inter-segment piston values in alignment ("maintaining focus"). While step 4840 attempts to achieve a piston WFE misalignment in the low-single-digit wavelengths, the later coherent steps may have a "capture range" (a term well known in the art) a few times (e.g., 3× or 4×) larger than the expected WFE resulting from step 4840 to accommodate for the structural stability (rigidity and hysteresis characteristics) of the telescope.

Before delving into the details of step 4840, various assumptions and alternatives relative to the spectral bandwidth/bandpass of light (or other electromagnetic radiation) falling onto primary detector 70 will be discussed. As mentioned in the overview section, focusing system 200 attempts to provide a "white light" solution to the task of focusing telescopes. White light generally refers to a rather broad spectrum of light falling onto the primary detector, taken literally, implying light with wavelengths from 400 nm (blue) to 700 nm (red). This spectral breadth translates to a very short range of piston alignment between segments, wherein the imagery being formed on primary detector 70 exhibits higher resolution coherent behavior as opposed to the lower resolution overlapping-images behavior seen in steps 4810, 4820, and 4830. For practical purposes, spectral bandpass considerations indicate that step 4840 ought to aim for getting piston alignments to within a single-digit-wavelength range.

Because step 4840 is generally an engineering calibration stage step with only modest requirements for execution speed, inserting a switchable narrow-band filter prior to primary detector 70 would help speed up step 4840. For example, a narrow-band filter having on the order of 20 nm to 30 nm spectral bandpass centered upon any nominal wavelength would be reasonable. If a narrow-band filter is already present within a multi-spectral or color-band camera, step 4840 can use one of those channels or redundantly several of those channels. If 300 nm is all that a given design allows, then step 4840 may take more time to perform because the "coherent capture range" between all segments will be very small (a few microns) and of low signal to noise ratio quality. To complicate matters, the tip-tilt alignment of step 4830 may have residual errors on the order of a wavelength or more, making the search for piston-phasing more difficult.

A preferred embodiment of step 4840 entails keeping N−1 segment piston values fixed and cycling the piston value of one segment in and around its extended depth-of-field focal point while at the same time monitoring for the vaguest of hints of signal in the higher frequency bands of the Fourier domain of the primary detector data. Another embodiment of step 4840 entails letting all N segment piston values roam about (random walk) through the extended depth-of-field focal regions of each segment while looking for the same indication of signal in the higher frequencies. According to one embodiment, step 4830 is routinely performed in parallel while searching for piston alignment in an attempt to maintain near-wavelength alignment on the tip-tilt modes of the segments, thus resulting in the highest probability that some signal can show up in the higher frequency bands when the piston of each of two segments pass each other.

The phrase "extended depth-of-field focal range" refers to the notion of focal depth-of-field (i.e., a given segment's piston range over which its own lower resolution image projected onto primary focal plane detector 70 is essentially in focus). As mentioned earlier, this focal range can be on the order of one millimeter or larger for high f-number optics. The further use of the word "extended" is carefully used as well, since the precise calibration of the effective focal length of any given isolated segment relative to any given other segment cannot be assumed to be excellent. In other words, segment C may have an out-of-the-box focal length of 10.00 meters while segment D might have an out-of-the-box focal length of 10.01 meters, a difference of one centimeter. This is over four orders of magnitude greater than the wavelength of visible light, and quite possibly greater than the classic depth-of-field for some given f-number.

Referring now to FIG. 64, at substep 4841, a piston value of a first segment is cycled in and around its extended depth-of-field focal point while the other segment trains remain stationary. The preferred embodiment of step 4840 assumes an initial state where the moving piston is not near the piston value of any other segment (also referred to as equivalent optical path lengths), and hence no signal is being detected in higher frequencies of the Fourier domain as the piston is moved around. However, from the act of pure searching, an instance arises in which the piston value of a given mirror comes within coherent range of the piston of some random segment (e.g., the optical path lengths of the two segments are within a couple wavelengths of each other, subject to the earlier discussion about bandpass), and a faint signal is detected in the integrated high frequencies of the Fourier domain. Thus, substep 4842 monitors the high frequency bands for a signal rising above the frame-to-frame noise level. The details of the high frequency signal is itself a function of what scene is being imaged, but skilled persons can view this simply as looking for a signal that rises above the frame-to-frame noise level at the Fourier frequencies above the diffraction limit frequencies for a given segment.

Once this first high frequency signal has been detected, a short series of actuations in and around the piston point may be performed in an attempt to maximize the signal. Although the signal has been detected, it is not known which of the other N−1 segments interacted with the moving segment. Thus, substep 4843 identifies which segment interacted with the first moving segment by individually cycling piston values of the other N−1 segment trains while the first segment train remains stationary until the integrated high frequency signal emerges again. For example, assume that segment 1 is the "moving segment" and it has randomly interacted with segment 4 of a segmented telescope. For the time being, it can be assumed based on structural rigidity and hysteresis arguments that the pistons of segment 1 and segment 4 are now aligned to within a few wavelengths of light.

According to one embodiment, a background procedure not only continuously repeats step 4830, but also continuously makes small modulation increments to the piston values of aligned segments in an attempt to keep them aligned. Returning to the previous example, during the rest of the execution of step 4840, small modulation increments are continually applied to the piston values of one or both of segment 1 and segment 4 while trying to keep a small signal level in the higher frequency region of the Fourier domain to ensure that the piston values of segments 1 and 4 remain aligned to this few-wavelength level (later steps will attempt to bring about sub-wavelength alignment).

At substep 4844, the piston value of a segment train that did not interact with first segment is cycled through its extended depth-of-field focal point as all other segment trains remain stationary while looking for faint measurable signals to appear in the higher frequencies of the Fourier domain. For example, the piston value of segment 2 can be cycled while segments 1 and 4 remain stationary until segment 2 coherently interacts with both segments 1 and 4. All the while the expanded background routine is continuously cycling step 4830 and the piston alignment of mirror 1 and mirror 4.

When segment 2 interacts with segments 1 and 4, the high frequency region where the signal is first detected is a bit different from what, and even much larger than, it was with just segments 1 and 4. The location difference of this signal results from the interaction of various mirrors differentially affecting various specific frequencies in the Fourier domain. This knowledge could have been used earlier when segments 1 and 4 first interacted to provide an indication that segment 4 was the coherent segment in question, but this disclosure tends toward the more conservative view that it is simply best to perform an independent cycling as described, to avoid any equivocation arising from relative low signal levels in the Fourier domain. The general increase in the number of locations where the signal starts to appear results from the interaction of three segment pairs (e.g., segment pairs 1-2, 1-4, and 2-4), instead of just one interacting pair of segments (e.g., segment pair 1-4).

At substep 4845, substep 4844 is repeated until all segment trains have substantially identical optical path lengths. For example, the piston value of segment 3 can be cycled while segments 1, 2, and 4 remain stationary until segment 3 coherently interacts with segments 1, 2, and 4. After segments 1, 2, 3, and 4 are aligned, the piston value of segment 5 can be cycled while segments 1, 2, 3, and 4 remain stationary until segment 5 coherently interacts with segments 1, 2, 3, and 4. If the telescope has five segments, all of the segments are now aligned to within a few wavelengths.

The end-state of step 4840 is a function of the structural rigidity and hysteresis properties of any given telescope design. Nevertheless, this disclosure will err toward the conservative view that all segment piston values have been found wherein the optical path length differences between one segment and any other segment are somewhere in the single-digit wavelength range. In other words, between the finishing of step 4830 and the finishing of step 4840 (which included the ongoing background functioning of step 4830), method 4800 has found the near-focus point for the telescope, where the tip-tilt-piston modes of all segments are generally in the five wavelength range or better. This may be called near-focus, but judging from actual imagery this state may try to produce, the imagery will be very blurry indeed. There is still more focusing work to be done.

Maintaining Focus

Focusing system 200 has now arrived at the point where it can activate nominal loop 240, which can be thought of as a framework and associated toolbox for automatically maintaining focus of segmented optic telescopes and monolithic telescopes that are producing frame-sequential primary data. As the previous section already explained, steps 4810, 4820, 4830, and 4840 have all been geared toward engineering/calibration stage procedures. The remaining steps of focusing are primarily geared toward ongoing operations of the telescopes, as the telescopes are collecting imagery. In other words, it is time for the telescope to start taking pictures and for a control loop process to keep the telescope in focus as it does so.

As previously discussed, FIG. 42 graphically summarizes one example of the tip-tilt-piston ensemble state of a telescope at some particular instant following the successful completion of steps 4810, 4820, 4830, and 4840. The particular instant assumes an "all quiet" dynamic state of the telescope where certainly circuits are functioning but the actuation system, pointing system, and any macro-mechanical system whatsoever are in a quiescent state. What remains is an emphatically generic model of how the tip-tilt-piston ensemble state might progress.

Figure 65:
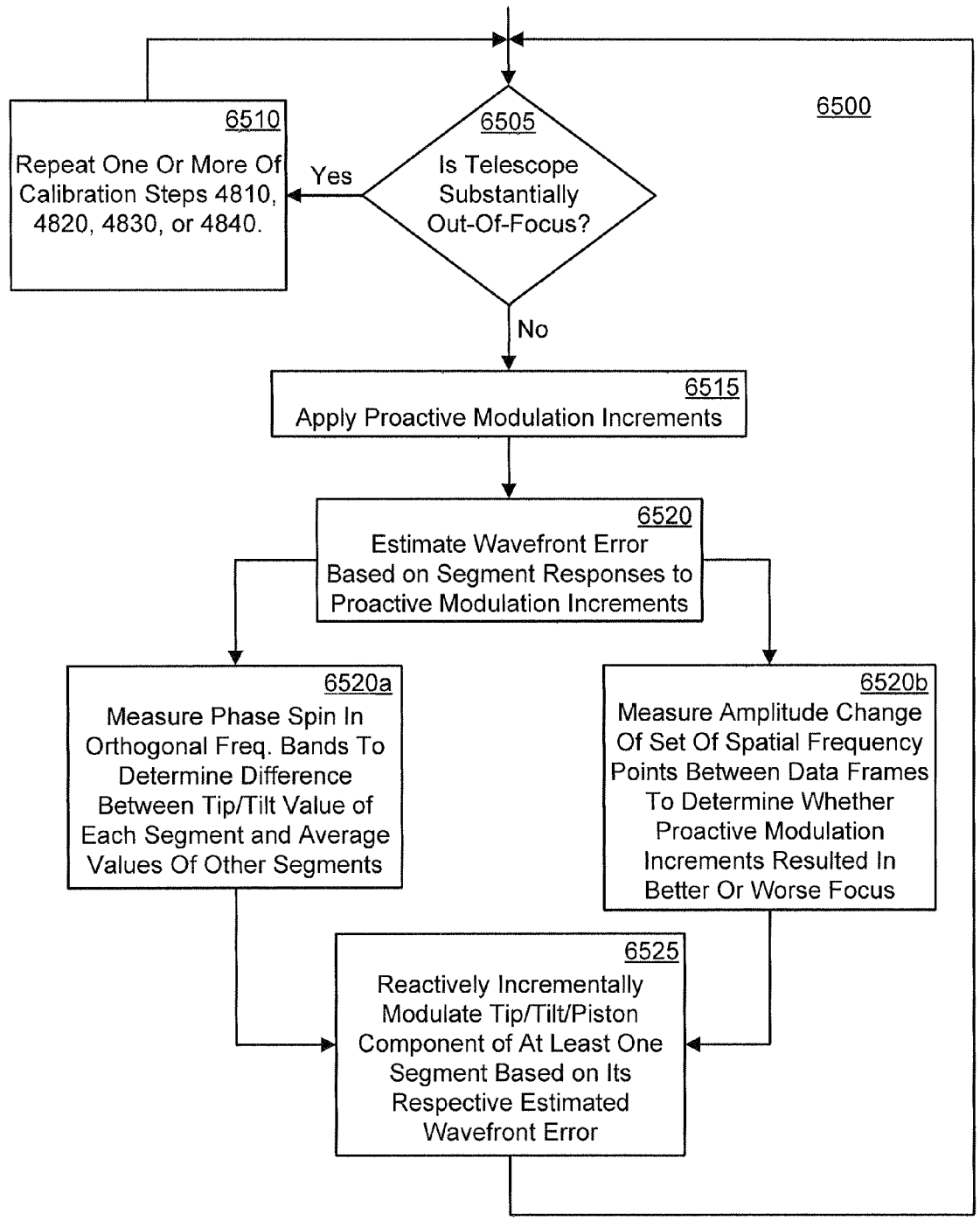
FIG. 65 a high-level flowchart illustrating a method for maintaining focus of a segmented optic system, according to one embodiment.

FIG. 65 a high-level flowchart illustrating a method 6500 for maintaining focus of a segmented optic system, according to one embodiment. From time-to-time, a telescope may drift from an in-focus state to the near-focus state or out-of-focus state. Thus, method 6500 determines at step 6505 whether the telescope is substantially out-of-focus, and, if so, may call one or more of steps 4810, 4820, 4830, or 4840 to bring the telescope back into the near-focus state at step 6510.

Method 6500 then proactively incrementally modulates TTP components of a mirror in each segment at step 6515 and estimates TTP WFE components for each segment based on the response of the segment to the proactive modulation increment at step 6520. Various techniques may be used to measure or estimate the TTP WFE components. For example, at step 6520a, method 6500 may measure phase spin in the horizontal and vertical frequency bands to determine a difference between the tip-tilt value of each segment and an average tip-tilt value of the other segments in a manner similar to that previously described with reference to step 4830. By way of another example, at step 6520b, method 6500 may measure amplitude change of a set of spatial frequency points between data frames to determine whether the proactive modulation increments resulted in better focus, worse focus, or the same level of focus. Additional details of step 6520b will be described in more detail below. Although FIG. 65 shows steps 6520a and 6520b operating in parallel, certain embodiments may use only one or the other to estimate the wavefront error. In addition, hybrids of steps 6520a and 6520b may be used.

After estimating the wavefront error, at step 6525, method 6500 reactively incrementally modulates a tip component, a tilt component, a piston component, or a combination thereof, of at least one mirror in at least one segment based on the estimated WFE for the respective segment. For example, as shown in FIG. 40, post-actuated tip WFE component 3520 starts drifting outside of the one-tenth wavelength range somewhere around data frame 220. Method 6500 detects this drift via the system response to proactive modulation increments 3510 and applies reactive modulation increment 3515 somewhere around data frame 230 to return post-actuated tip WFE component 3520 back to within the one-tenth wavelength range. Method 6500 continually repeats steps 6505 through 6525 to maintain focus of the telescope.

Phasor-spin maps and amplitude-modulation maps directly associated with each and every tip, tilt and piston (TTP) of each of the N mirrors may be used to measure or estimate the TTP WFE components in a process known as temporal phase diversity. In gross summary, phasor-spin measurements are an ongoing process of keeping track of the most important frame-to-frame distortions and providing feedback to actuation controls meant to counteract those distortions, while amplitude-change measurements are likewise an ongoing process that is more tied to proactive actuations, seeking to determine whether a given modulation increment to the system puts it into better focus or worse focus.

FIGS. 66-69 are example amplitude maps that can be used to determine whether a telescope is drifting out of focus, moving back into focus, or is already essentially in focus. The center of the UV plane is located at the center of the black and white maps. The u-axis runs left to right through the center and represents the horizontal component of frequency. The v-axis runs top to bottom through the center and represents the vertical component of frequency. Lower frequencies are located near the origin, while high frequencies are located further from the origin.

Figure 66:
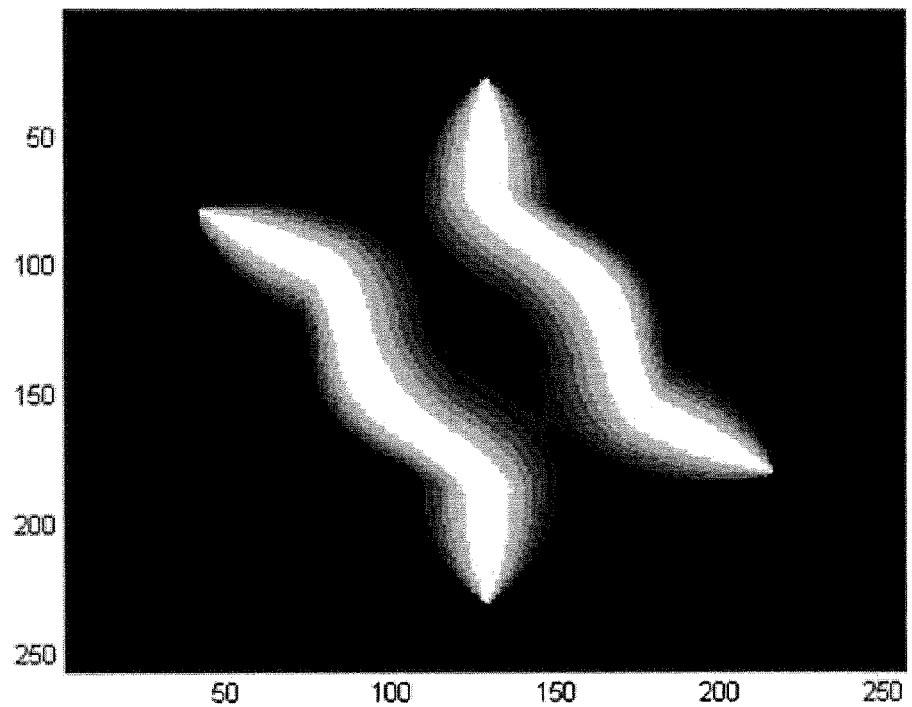
FIGS. 66-69 are example amplitude maps illustrating a change in magnitude between an in-focus three segment optical system and the same optical system having a tip, tilt, and/or piston component of a segment incrementally modulated from focus.
Figure 67:
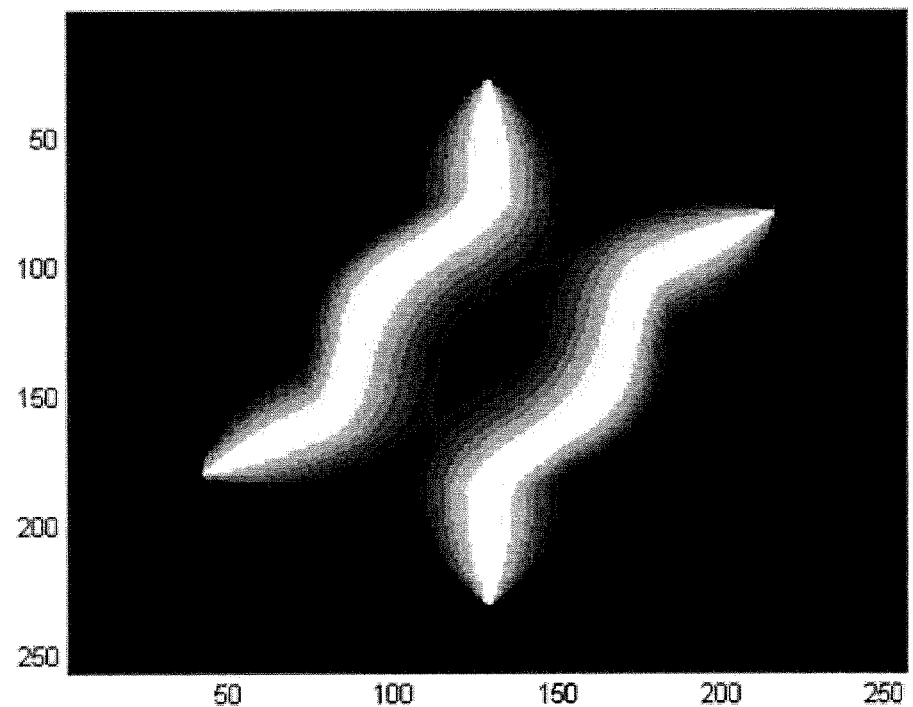
Figure 68:
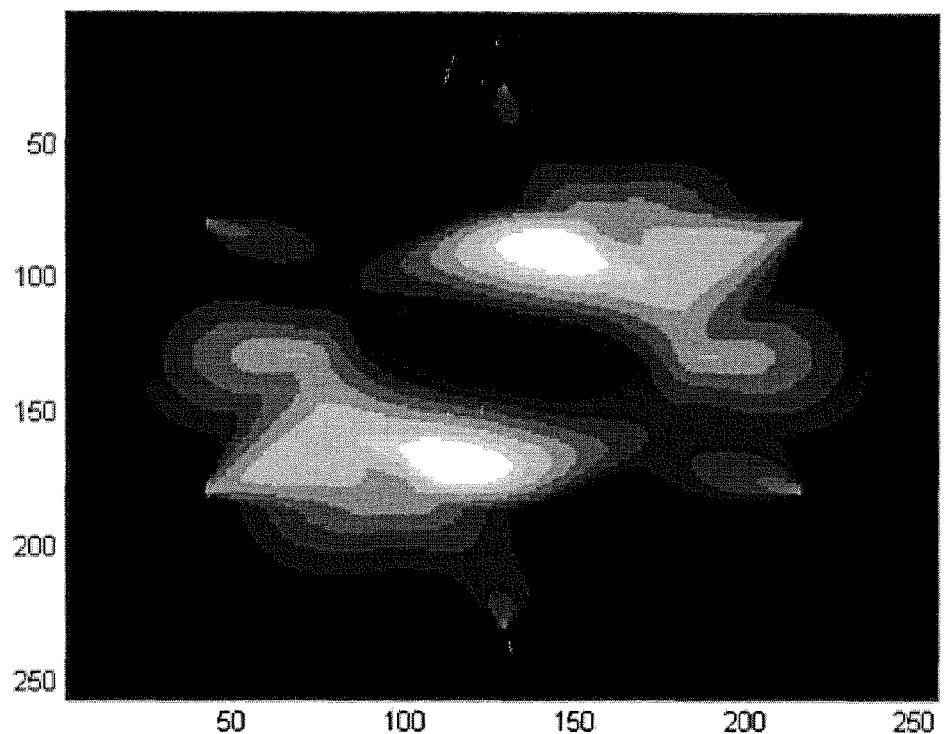
Figure 69:
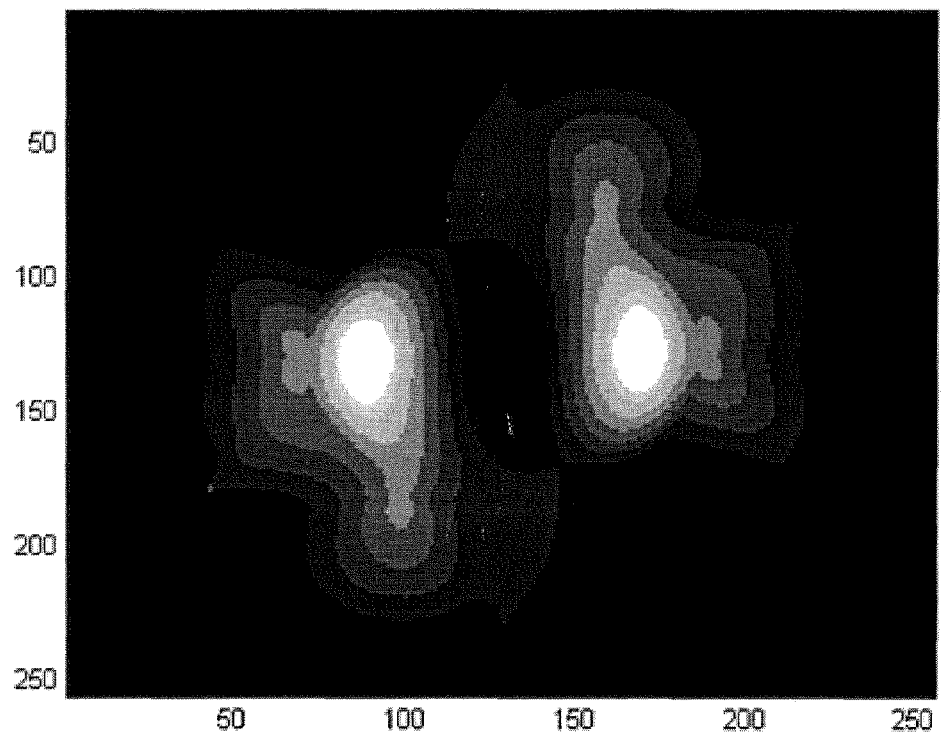

The amplitude map depicted in FIG. 66 corresponds to a three circular mirror telescope, in which one of the mirrors has had its piston value incrementally modulated slightly from perfect focus, and the percentage change in the Fourier magnitude (a.k.a. amplitude) values between the perfect system and the incrementally modulated system is displayed. It can be seen that this is a rather unique shape, even for a very simple telescope system such as a three-circular mirror arrangement. FIG. 67 shows a piston amplitude map of another mirror, also in the three-circular mirror telescope example. FIG. 67 can be seen as a 60 degree rotated version of FIG. 66. The amplitude maps depicted in FIGS. 68 and 69 correspond to the same three circular mirror telescope of FIG. 66, but where one of the mirrors has had its respective tip and tilt values incrementally modulated.

The amplitude maps depicted in FIGS. 66-69 are unique to the specific mirror and the specific incremental modulation mode of that mirror. Thus, the non-linear properties and behavior of the amplitude maps in response to various mirror-mode incremental modulation may change from one telescope to another.

There are several ways to create and exploit the amplitude maps. One way to create the amplitude maps is through the incremental modulation approach described above. However, the amplitude maps can be created in other ways. For example, the amplitude maps may be created by viewing a scene, incrementally modulating mirrors accordingly, and storing the difference results or the percentage-difference results of the Fourier amplitude values. Another approach is to simply use the magnitude of the associated phasor-spin maps.

Typically, the Fourier plane has thousands if not hundreds of thousands of spatial frequency points. Measuring the magnitude at some given point in one data frame, measuring the same point in a sequential data frame, and comparing the difference in magnitudes yields a very small amount of information about the focusing trends. If the amplitude decreases for a given point, the focus is worsening from the perspective of that point. Similarly, if the amplitude increases for a given point, the focus is improving from the perspective of that point. If the amplitude remains the same for a given point, the focus is staying essentially the same. Thus, comparing the difference in magnitudes for a given point can be viewed as a vote as to whether the telescope is drifting out of focus, moving back into focus, or is already essentially in focus.

The method 6500 can gain an aggregation of many thousands of independent votes to answer the singular question of "better" or "worse" focus by totaling up votes across all Fourier frequency points (e.g., UV plane points) and weighting them not only by the amplitude maps but also on the innate amplitude of that UV plane point.

Referring again to FIG. 38, method 6500 applies proactive modulation increments to mirrors in such a way that the amplitude map of one mirror is largely different from the map of another mirror. Then the votes are collected as described above, and the reactive modulation increments are calculated and applied as actuations. As the incremental modulation process is repeated, method 6500 can simply following the "better" answer with an associated reactive modulation increment heading in the same direction, until such time that a "same" answer starts to appear or the eventual "worse" answers appear.

A preferred embodiment goes beyond the simple "better-worse" result of collective voting and attempts to use the overall voting total as a form of variable to feed into an actuation control loop. In other words, if the vote total is higher for a given frame to frame difference, then the actuation system will produce a higher than usual reactive modulation increment, and a lower vote count from one frame to the next would gauge toward a lower actuation signal. The non-linearities of the vote total may be implemented as damping factors on the actuation drive signal.

In summary, the amplitude-change measurements for a TTP component in combination with a measured TTP value from the phasor-spin measurements (e.g., a procedure similar or identical to step 4830 may be used to generate a "better-worse" result) form a useful (albeit noisy) estimate of the absolute positive or negative value of the TTP position.

While this disclosure has discussed establishing and maintaining focus in segmented-optic telescopes, the systems and methods described herein are equally applicable to non-segmented telescopes (e.g., monolithic telescopes). In short, the central role of "tip-tilt-piston" in segmented-optic telescopes can be replaced by principle structural Zernike modes in monolithic optic designs.

The methods and systems described herein may be implemented in or by any suitable hardware, software, firmware, or combination thereof. Accordingly, as used herein, a component, module, or engine may comprise one or more of hardware, software, and firmware (e.g., self-contained hardware or software components that interact with a larger system). A software module, component, or engine may include any type of computer instruction or computer executable code located within a memory device or transmitted as electronic signals over a system bus or wired or wireless network. A software module, component, or engine may, for instance, comprise one or more physical or logical blocks of computer instructions, which may be organized as a routine, program, object, component, or data structure that performs one or more tasks or implements particular abstract data types.

In certain embodiments, a particular software module, component, or engine may comprise disparate instructions stored in different locations of a memory device, which together implement the described functionality of the module. Indeed, a module may comprise a single instruction or many instructions, and may be distributed over several different code segments, among different programs, and across several memory devices.

Embodiments may include various steps, which may be embodied in machine-executable instructions to be executed by a processor. Alternatively, the steps may be performed by hardware components that include specific logic for performing the steps or by a combination of one or more of hardware, software, and firmware. A result or output from any step, such as a confirmation that the step has or has not been completed or an output value from the step, may be stored, displayed, printed, and transmitted over a wired or wireless network. For example, a imagery 130 may be stored, displayed, or transmitted over a network.

Embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

It will be obvious to those having skill in the art that many changes may be made to the details of the above-described embodiments without departing from the underlying principles of the invention. The scope of the present invention should, therefore, be determined only by the following claims.

The invention claimed is:

1. A multi-aperture interferometric optical system formed of multiple mirror segment trains cooperating to focus incident electromagnetic radiation at a focal plane, the optical system comprising:
   a set of spaced-apart segment trains arranged around a region on a focal plane and configured to generate a diffraction pattern at the focal plane, each segment train comprising a set of mirrors configured to reflect incident electromagnetic radiation toward the focal plane;
   a detector positioned at the focal plane and configured to generate data for focusing the optical system and forming an image from the diffraction pattern;
   multiple mirror actuators associated with the segment-train mirrors, the multiple mirror actuators configured to respond to actuator commands by moving respective segment-train mirror positions; and
   a controller configured to, based on the data from the detector, estimate a bias representing a misalignment of the optical system, and, based on the estimated bias, generate actuator commands for controlling the multiple mirror actuators to establish and maintain focus of the optical system.

2. The system of claim 1, wherein the multiple mirror actuators are associated with at least one mirror in each segment train.

3. A method of establishing and maintaining focus of a multi-aperture interferometric optical system formed of multiple mirror segment trains cooperating to focus electromagnetic radiation on a detector positioned at a focal plane, the method comprising:

calibrating each segment train such that images formed on the detector by each segment train are substantially coincident and the segment trains are within operational coherent range of one another, thereby establishing focus of the optical system; and maintaining focus of the optical system by imparting incremental modulations to each segment train, estimating a wavefront error corresponding to each segment train over multiple data frames based on differences between spatial-spectral transforms of a set of sequential data frames corresponding to images formed on the detector by the respective segment train in response to the incremental modulations, and applying reactive modulation increments to at least one segment train based on the respective estimated wavefront error.

4. The method of claim 3, wherein calibrating each segment train comprises individually focusing each segment train in isolation.

5. The method of claim 3, wherein calibrating each segment train such that images formed on the detector by each segment train are substantially coincident comprises:

(a) capturing a data frame corresponding to an unshifted image of a scene;

(b) capturing a data frame corresponding to a shifted image of the scene on the detector resulting from an adjustment of a tip position of a mirror in one of the segment trains;

(c) comparing the data frame corresponding to the shifted image of the scene to the data frame corresponding to the unshifted image of the scene to determine specific rotations of phase vectors in a first frequency band;

(d) calculating a distance between a tip value of the adjusted mirror and an average tip value of the corresponding mirrors in the other segments based on the determined specific rotations of phase vectors in the first frequency band;

(e) repeating steps (b), (c), and (d) for a mirror in every other segment train, thereby yielding calculated distances for all segments; and (f) adjusting a tip position of at least one mirror based on the calculated distances.

6. The method of claim 5, further comprising:

(a) capturing a data frame corresponding to a second shifted image of the scene on the detector resulting from an adjustment of a tilt position of a mirror in one of the segment trains;

(b) comparing the data frame corresponding to the second shifted image of the scene to the data frame corresponding to the unshifted image of the scene to determine specific rotations of phase vectors in a second frequency band;

(c) calculating a distance between a tilt value of the adjusted mirror and an average tilt value of the corresponding mirrors in the other segments based on the determined specific rotations of phase vectors in the second frequency band;

(d) repeating steps (a), (b), and (c) for a mirror in every other segment train, thereby yielding calculated distances for all segments; and (f) adjusting a tilt position of at least one mirror based on the calculated distances.

7. The method of claim 5, further comprising:

adjusting a tip position of a mirror in one of the segment trains and a tilt position of a mirror in different one of the segment trains; and capturing a data frame corresponding to an image of the scene shifted in first and second orthogonal directions on the detector in response to the tip and tilt position adjustments.

8. The method of claim 5, wherein the specific rotations of phase vectors in the first frequency band form a substantially linear sequence in a low frequency portion of the first frequency band and the distance between the tip value of the adjusted mirror and the average tip value of the corresponding mirrors in the other segments is calculated by measuring a slope of a line corresponding to the linear sequence.

9. The method of claim 5, further comprising:

forming a set of linear equations corresponding to the calculated distances for each of the segments; and solving the set of linear equations to determine actuator commands for adjusting the tilt position of at least one mirror.

10. The method of claim 5, further comprising:

storing the calculated distances for all segments; and deblurring images formed on the detector using the stored calculated distances to generate a substantially diffraction-limited image.

11. The method of claim 3, wherein calibrating each segment train such that images formed on the detector by each segment train are substantially coincident comprises:

(a) capturing a data frame corresponding to a first image of a scene formed on the detector by a first isolated segment train;

(b) isolating a second segment train;

(c) adjusting a tip position, a tilt position, or both, of the second isolated segment train so that an image generated by the second segment train is substantially coincident with the first image; and (d) repeating steps (b) and (c) N−2 times for an optical system with N segment trains, thereby coarsely aligning N images.

12. The method of claim 3, wherein calibrating each segment train such that the segment trains are within operational coherent range of one another comprises cycling from one data frame to the next a piston value of one of the segment trains in and around an extended depth-of-field focal point of the segment train while the other segment trains are stationary until a signal rising above a frame-to-frame noise level is detected in a high frequency band.

13. The method of claim 12, wherein the segment trains are repeatedly aligned with respect to one another so that images formed on the detector by each segment train are substantially coincident while the piston value is cycled.

14. The method of claim 12, wherein a narrow-band filter is inserted into the path of the electromagnetic radiation before the detector.

15. The method of claim 3, wherein imparting incremental modulation comprises:

adjusting a tip position of a mirror in each of the segment trains by sequentially increasing the tip position by a first amount, decreasing the tip position by a second amount, increasing the tip position by the second amount, and decreasing the tip position by the first amount over four data frames.

16. The method of claim 3, wherein estimating a wavefront error corresponding to each segment train over multiple data frames comprises calculating differences between a Fourier transform of one data frame and a Fourier transform of the next sequential data frame.

17. The method of claim 3, wherein the reactive modulation increments are calculated based on phasor-spin measurements.

18. The method of claim 3, further comprising:
determining whether the incremental modulations resulted in better focus, worse focus, or the same level of focus by calculating a difference in magnitude values between a set of Fourier-plane spatial frequency points derived from one data frame in a sequence of data frames and a corresponding set of Fourier-plane spatial frequency points derived from the next data frame in the sequence, and wherein the reactive modulation increments are calculated based the determination of whether the incremental modulations resulted in better focus, worse focus, or the same level of focus.

19. The method of claim 18, further comprising:
aggregating the calculated differences for each point in the set; and
scaling the reactive modulation increments based on a change in the aggregate from one set of data frames to the next set of data frames.

20. A method of generating actuation commands for establishing focus of a segmented optical system formed of multiple mirror segments cooperating to focus electromagnetic radiation on a detector positioned at a focal plane, the method comprising:
shifting an image of a scene in first and second orthogonal directions on the detector by adjusting a tip and tilt position, respectively, of at least one mirror in each of the segments;
for each adjusted mirror, determining specific rotations of phase vectors in first and second orthogonal frequency bands resulting from the respective shift in the first and second orthogonal directions by comparing an image of the scene after the respective shifts in the first and second orthogonal directions to an unshifted image of the scene;
for each adjusted mirror, calculating a distance between tip and tilt values of the adjusted mirror and average tip and tilt values of the corresponding mirrors in the other segments based on the determined specific rotations of phase vectors in the first and second orthogonal frequency bands, respectively, thereby yielding calculated distances for each of the segments; and
generating actuator commands for adjusting a tip position, a tilt position, or both, of at least one mirror based on the calculated distances.

21. The method of claim 20, wherein the scene comprises a point source.

22. A non-transitory machine-readable medium on which are stored computer program instructions for performing a method of generating actuation commands for establishing focus of a segmented optical system formed of multiple minor segments cooperating to focus electromagnetic radiation on a detector positioned at a focal plane, the instructions comprising:
instructions for shifting an image of a scene in first and second orthogonal directions on the detector by adjusting a tip and tilt position, respectively, of at least one minor in each of the segments;
instructions for determining, for each adjusted mirror, specific rotations of phase vectors in first and second orthogonal frequency bands resulting from the respective shift in the first and second orthogonal directions by comparing an image of the scene after the respective shifts in the first and second orthogonal directions to an unshifted image of the scene;
instructions for calculating, for each adjusted mirror, a distance between tip and tilt values of the adjusted minor and average tip and tilt values of the corresponding minors in the other segments based on the determined specific rotations of phase vectors in the first and second orthogonal frequency bands, respectively, thereby yielding calculated distances for each of the segments; and
instructions for generating actuator commands for adjusting a tip position, a tilt position, or both, of at least one mirror based on the calculated distances.

23. A method of generating actuation commands for maintaining focus of a segmented optical system formed of multiple mirror segments cooperating to focus electromagnetic radiation on a detector positioned at a focal plane, the method comprising:
generating actuator commands for incrementally modulating a tip component, a tilt component, a piston component, or a combination thereof, of a mirror in each segment;
for each incrementally modulated mirror, estimating a wavefront error corresponding to the tip component, the tilt component, and the piston component of the mirror over multiple data frames based on a response of the mirror to the incremental modulation; and
generating actuation commands for applying reactive modulation increments to the tip component, the tilt component, the piston component, or a combination thereof, of at least one mirror based on the respective estimated wavefront error.

24. The method of claim 23, further comprising:
storing the estimated wavefront errors for all segments; and
deblurring images formed on the detector using the stored estimated wavefront errors to generate a substantially diffraction-limited image.

25. The method of claim 23, wherein the wavefront error is estimated using phasor-spin measurements.

26. The method of claim 23, wherein the wavefront error is estimated by determining whether the incremental modulations resulted in better focus, worse focus, or the same level of focus by calculating a difference in magnitude values between a set of Fourier-plane spatial frequency points derived from one data frame in a sequence of data frames and a corresponding set of Fourier-plane spatial frequency points derived from the next data frame in the sequence, and wherein the actuation commands for applying reactive modulation increments to the tip component, the tilt component, the piston component, or a combination thereof, are generated based the determination of whether the incremental modulations resulted in better focus, worse focus, or the same level of focus.

27. A non-transitory machine-readable medium on which are stored computer program instructions for performing a method of generating actuation commands for maintaining focus of a segmented optical system formed of multiple minor segments cooperating to focus electromagnetic radiation on a detector positioned at a focal plane, the method comprising:
instructions for generating actuator commands for incrementally modulating a tip component, a tilt component, a piston component, or a combination thereof, of a mirror in each segment;
instructions for estimating, for each incrementally modulated mirror, a wavefront error corresponding to the tip component, the tilt component, and the piston component of the mirror over multiple data frames based on a response of the mirror to the incremental modulation; and
instructions for generating actuation commands for applying reactive modulation increments to the tip component, the tilt component, the piston component, or a combination thereof, of at least one mirror based on the respective estimated wavefront error.

* * * * *